US008976178B2

(12) United States Patent
Nakamura et al.

(10) Patent No.: US 8,976,178 B2
(45) Date of Patent: Mar. 10, 2015

(54) DISPLAY SWITCHING APPARATUS, DISPLAY SWITCHING METHOD, AND DISPLAY SWITCHING PROGRAM

(75) Inventors: Nobuyuki Nakamura, Kanagawa (JP);
Wataru Kawamata, Kanagawa (JP);
Nobuyuki Yasue, Kanagawa (JP);
Hiroyuki Anase, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 13/492,313

(22) Filed: Jun. 8, 2012

(65) Prior Publication Data
US 2012/0313946 A1 Dec. 13, 2012

(30) Foreign Application Priority Data

Jun. 13, 2011 (JP) ................................ 2011-131406

(51) Int. Cl.
*G06T 15/50* (2011.01)
*G06F 3/0481* (2013.01)
*H04M 1/725* (2006.01)

(52) U.S. Cl.
CPC ........ *G06F 3/04815* (2013.01); *G06F 3/04817* (2013.01); *H04M 1/72544* (2013.01)
USPC ............................ 345/426; 345/419; 345/427

(58) Field of Classification Search
USPC ........................................ 345/419, 426, 427
See application file for complete search history.

(56) References Cited

U.S. PATENT DOCUMENTS

| 2007/0202949 A1* | 8/2007 | Kawade et al. ................. 463/32 |
| 2011/0074769 A1* | 3/2011 | Takayama ..................... 345/419 |
| 2011/0244956 A1* | 10/2011 | Sakakibara et al. ............ 463/31 |

FOREIGN PATENT DOCUMENTS

JP 2011-66850 3/2011

OTHER PUBLICATIONS

949paintball. "Tron: Evolution—Online Grid Match (Light Cycle Battle)." Dec. 2010.*

* cited by examiner

*Primary Examiner* — Maurice L McDowell, Jr.
(74) *Attorney, Agent, or Firm* — Frommer Lawrence & Haug LLP; William S. Frommer; Ellen Marcie Emas

(57) ABSTRACT

Provided is a display switching apparatus including an operation unit used to instruct a display unit to switch a display of a display image having a background image, and a control unit that, when instructed to switch the display of the display image via the operation unit, exercises control so that the display of the display image on the display unit is switched to the display image having the background image in a visible state indicating whether the display is switchable.

7 Claims, 30 Drawing Sheets

1 DISPLAY SWITCHING APPARATUS

EXTERNAL CONFIGURATION OF MOBILE TERMINAL

CONFIGURATION OF CENTER HOME IMAGE

CONFIGURATION OF FIRST RIGHT-SIDE HOME IMAGE

CONFIGURATION OF SECOND RIGHT-SIDE HOME IMAGE

CONFIGURATION OF FIRST LEFT-SIDE HOME IMAGE

CONFIGURATION OF SECOND LEFT-SIDE HOME IMAGE

SWITCHING OF DISPLAY OF HOME IMAGE

CONFIGURATION OF FOREGROUND IMAGE FOR ARTIST LIST IMAGE

SCROLLING OF FOREGROUND IMAGE IN ARTIST LIST IMAGE

HIERARCHICAL IMAGE DISPLAY SWITCHING PROCESSING PROCEDURE

SCROLL DISPLAY PROCESSING PROCEDURE

MODIFICATION OF TWO-DIMENSIONAL BACKGROUND IMAGE

DISPLAY SWITCHING APPARATUS, DISPLAY SWITCHING METHOD, AND DISPLAY SWITCHING PROGRAM

BACKGROUND

The present technology relates to a display switching apparatus, a display switching method, and a display switching program and is suitably applied to, for example, a mobile terminal using a GUI (Graphical User Interface) for user's operation.

If a full-function display button arranged in a home screen is selected by a user in the home screen displayed on a touch screen in a conventional information communication terminal, the display of the home screen is switched to a full-function display screen.

In this case, a plurality of shortcut buttons to activate all functions such as the camera function, mail function, browsing function of web pages, and motion picture playback function possessed by the information communication terminal is arranged in the full-function display screen.

Then, if a short-cut button is selected in the full-function display screen displayed on the touch screen, the information communication terminal activates the application program corresponding to the selected shortcut button.

In this manner, the information communication terminal realizes various functions according to application programs (see, for example, Japanese Patent Application Laid-Open No. 2011-66850 (P. 10, FIG. 9)).

SUMMARY

If it is difficult, with an increasing number of functions, to arrange all shortcut buttons in one full-function display screen, the information communication terminal prepares a plurality of full-function display screens and appropriately switches and displays the full-function display screen in accordance with the user's operation to allow the user to select the shortcut button of a desired function.

When the display of the full-function display screen is switched, however, a problem of difficulty in causing the user to make full use of switching of the display is posed if it is difficult to cause the user to easily recognize whether the full-function display screen after the switching can further be switched.

The present technology is developed in view of the above problem and proposes a display switching apparatus capable of causing the user to make full use of switching of the display of display images, a display switching method, and a display switching program.

According to the present technology to solve the problem, a display switching apparatus is provided with an operation unit used to instruct a display unit to switch a display of a display image having a background image and a control unit that, when instructed to switch the display of the display image via the operation unit, exercises control so that the display of the display image on the display unit is switched to the display image having the background image in a visible state indicating whether the display is switchable.

Therefore, when the display of the display image on the display unit is switched, the display switching apparatus according to the present technology can cause a user to easily recognize whether the display of the display image after the switching is switchable based on the visible state of the background image possessed by the display image after the switching.

Also according to the present technology, a display switching method is provided with a control step that, when instructed to switch a display of a display image via an operation unit used to instruct a display unit to switch the display of the display image having a background image, exercises control so that the display of the display image on the display unit is switched to the display image having the background image in a visible state indicating whether the display is switchable.

Therefore, when the display of the display image on the display unit is switched, the display switching method according to the present technology can cause a user to easily recognize whether the display of the display image after the switching is switchable based on the visible state of the background image possessed by the display image after the switching.

Further, according to the present technology, a display switching program causes a computer to execute a control step that, when instructed to switch a display of a display image via an operation unit used to instruct a display unit to switch the display of the display image having a background image, exercises control so that the display of the display image on the display unit is switched to the display image having the background image in a visible state indicating whether the display is switchable.

Therefore, when the display of the display image on the display unit is switched, the display switching program according to the present technology can cause a user to easily recognize whether the display of the display image after the switching is switchable based on the visible state of the background image possessed by the display image after the switching.

According to the present technology, a display switching apparatus capable of causing a user to easily recognize whether a display of a display image after switching is switchable based on a visible state of a background image held by the display image after the switching and therefore, causing the user to make the most of switching of the display of the display image if the display of the display image in a display unit is switched by exercising control so that the display of the display image on the display unit is switched to the display image having the background image in the visible state indicating whether the display is switchable when switching of the display of the display image is instructed via an operation unit used to instruct switching of the display of the display image having the background image on the display unit, a display switching method, and a display switching program can be realized.

DETAILED DESCRIPTION OF THE EMBODIMENTS

Figure 1:
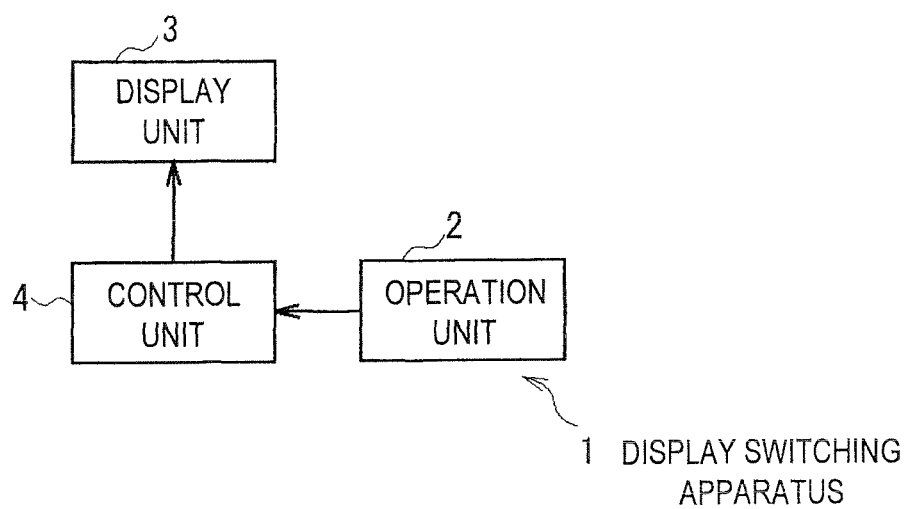
FIG. 1 is a block diagram providing an overview of the configuration of a display switching apparatus according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments (hereinafter, also referred to as embodiments) to carry out the present technology will be described using the drawings. The description thereof will be provided in the following order: 1. Embodiment, 2. Modification <1. Embodiment>

[1-1. Overview of Configuration of Display Switching Apparatus According to Embodiment]

First, an overview of the present embodiment will be provided. After the overview being provided, concrete examples of the present embodiment will be shown. In FIG. 1, reference numeral 1 is a display switching apparatus according to the present embodiment.

In the display switching apparatus 1, an operation unit 2 is used to instruct a display unit 3 to switch the display of a display image with a background image.

Incidentally, the display switching apparatus 1 may be provided with the display unit 3 internally or externally.

In the display switching apparatus 1, when switching of the display of the display image is instructed via the operation unit 2, a control unit 4 exercises control so that the display of a display image on the display unit 3 is switched to a display image with the background image in a visible state indicating whether the display is switchable.

Thus, if the display of the display image on the display unit 3 is switched, the display switching apparatus 1 can cause a user to easily recognize whether the display of the display image after the switching is switchable based on the visible state of the background image held by the display image after the switching. Accordingly, the display switching apparatus 1 can cause the user to make full use of switching of the display of the display image.

[1-2. External Configuration of Mobile Terminal According to Embodiment]

Figure 2:
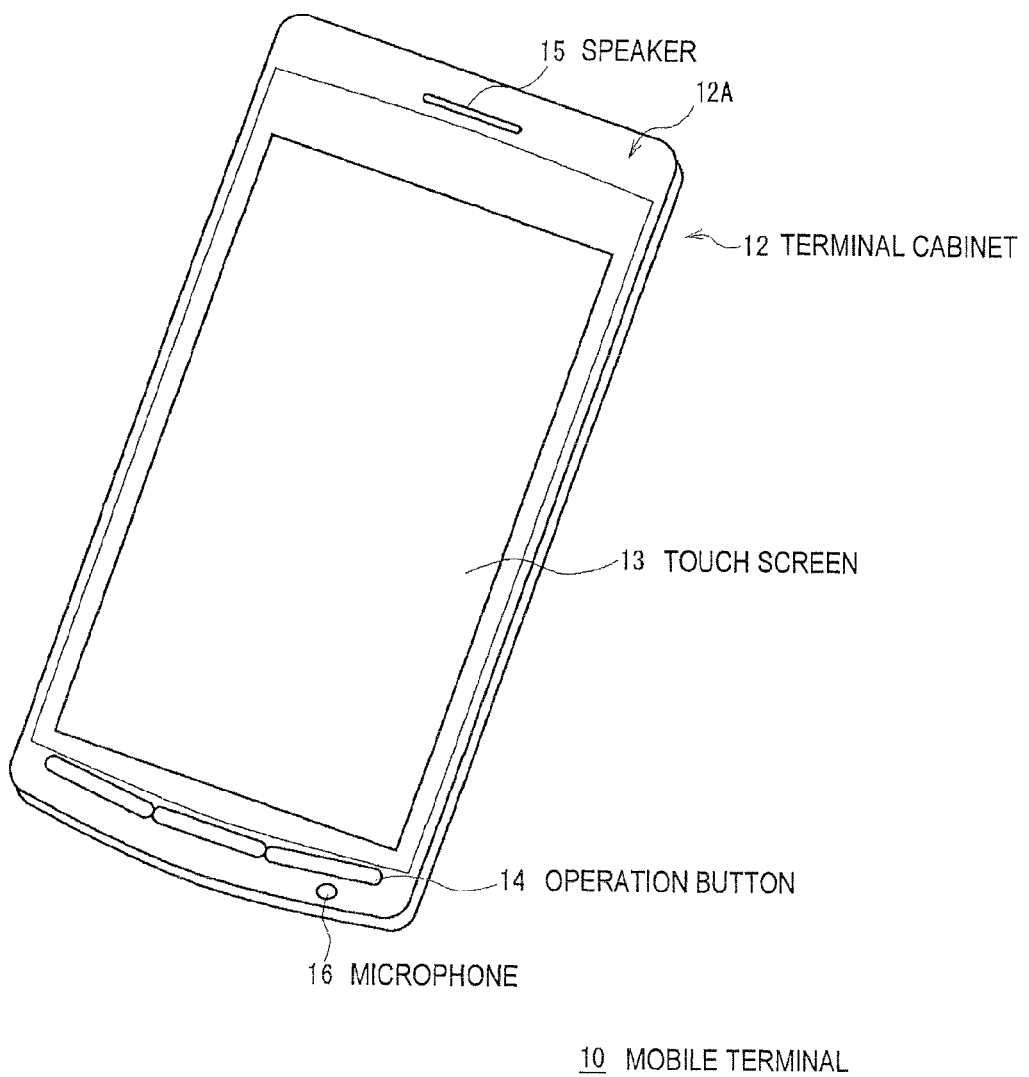
FIG. 2 is an approximate perspective view showing an external configuration of a mobile terminal, which is a concrete example of the display switching apparatus according to the present embodiment.

In FIG. 2, reference numeral 10 as a whole shows an external configuration of a mobile terminal 10 called a smart phone, which is a concrete example of the display switching apparatus 1 shown in the above overview. The mobile terminal 10 has a terminal cabinet 12 in a substantially flat rectangular shape.

Incidentally, in the description that follows, the longitudinal direction of the terminal cabinet 12 is also called a cabinet longitudinal direction and a width direction orthogonal to the longitudinal direction of the terminal cabinet 12 is also called a cabinet width direction.

Also in the description that follows, one end of the terminal cabinet 12 in the cabinet longitudinal direction is also called a cabinet upper end and the other end in the cabinet longitudinal direction is also called a cabinet lower end.

Further in the description that follows, one end of the terminal cabinet 12 in the cabinet width direction is also called a cabinet left end and the other end in the cabinet width direction is also called a cabinet right end.

A touch screen 13 formed by a transparent touch panel being attached as if to cover an entire display surface is arranged on the display surface in a rectangular shape of the display in a center portion on a front surface 12A of the terminal cabinet 12.

The display surface is arranged so as to be visible from outside via the touch panel on the front surface 12A of the terminal cabinet 12 in an actual display by making the longitudinal direction of the display surface parallel to the cabinet longitudinal direction and the width direction orthogonal to the longitudinal direction of the display surface parallel to the cabinet width direction.

In the description that follows, the longitudinal direction of the display surface in the display is also called a display surface longitudinal direction and the width direction of the display surface is also called a display surface width direction. The display is a liquid crystal display, organic EL (Electro Luminescence) display or the like.

Accordingly, the mobile terminal 10 displays various display images in a rectangular shape on the touch screen 13 in the display by making an image vertical direction parallel to the display surface longitudinal direction and an image horizontal direction parallel to the display surface width direction.

Then, the mobile terminal 10 can present information in various display images by showing such display images displayed in the display via a transparent touch panel.

The mobile terminal 10 can allow the user to perform a touch operation on the surface of the touch panel by using a finger, stylus pen or the like to input various directives or instructions in a state in which, for example, various display images are displayed on the touch screen 13 in the display.

In addition, a plurality of operation buttons 14 is arranged in a row, for example, along the cabinet width direction in a lower end portion of the cabinet on the front surface 12A of the terminal cabinet 12.

Accordingly, in addition to the touch operation on the surface of the touch panel, the mobile terminal 10 can also allow the user to perform a pressing operation of the plurality of operation buttons 14 to input various directives or instructions.

Further, on the front surface 12A of the terminal cabinet 12, a speaker 15 is provided in an upper end portion of the cabinet and a microphone 16 is provided in the lower end of the cabinet.

Accordingly, the mobile terminal 10 can output (emit) sound via the speaker 15 and also collect sound via the microphone 16.

[1-3. Circuit Configuration of Mobile Terminal]

Figure 3:
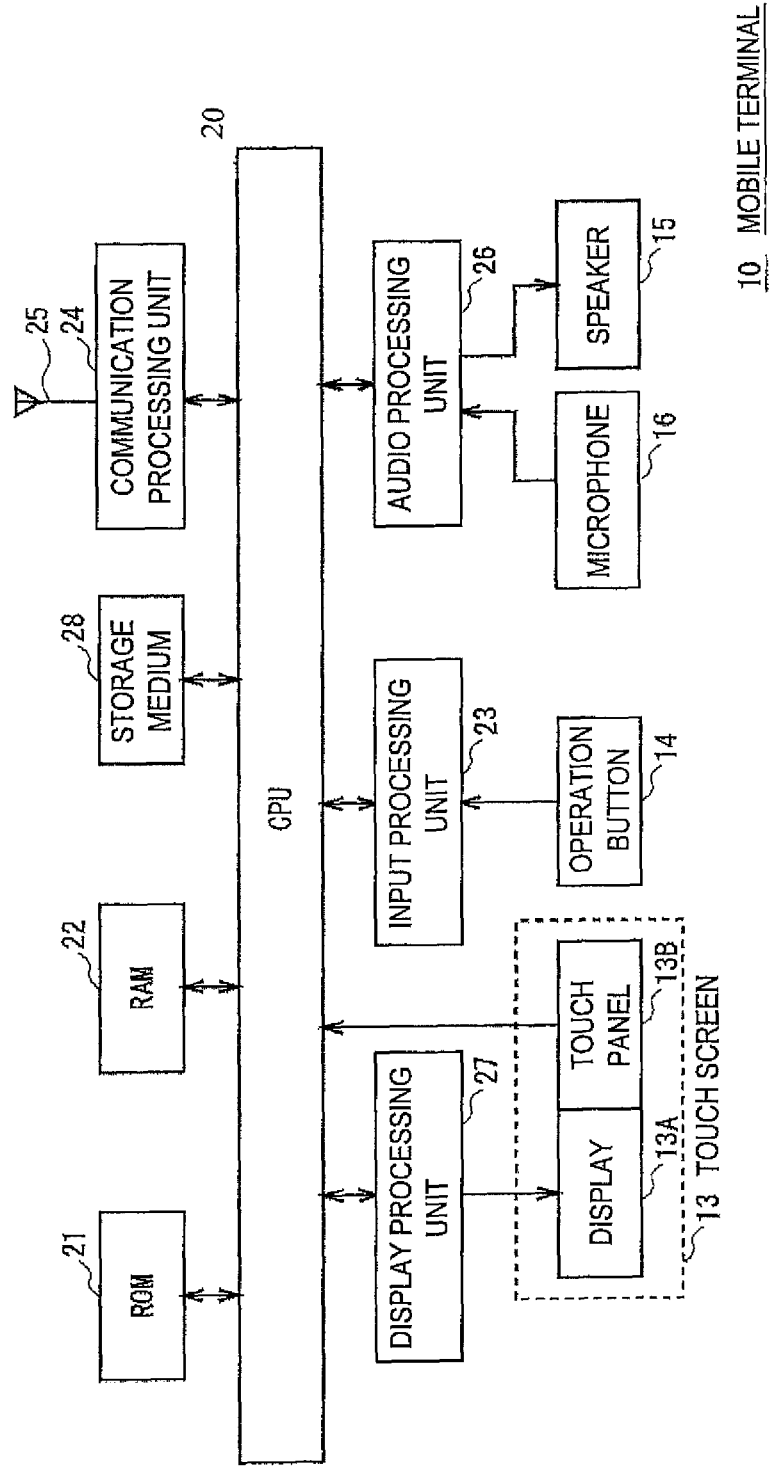
FIG. 3 is a block diagram showing a circuit configuration of the mobile terminal, which is a concrete example of the display switching apparatus according to the present embodiment.

Next, the circuit configuration of the mobile terminal 10 will be described by using FIG. 3. The mobile terminal 10 has a central processing unit (CPU) 20.

The CPU 20 reads various programs such as a basic program, a display switching program, and an application program like a communication processing program stored in a ROM (Read Only Memory) 21 in advance into a RAM (Random Access Memory) 22.

Then, the CPU 20 controls the whole mobile terminal 10 (that is, each unit inside the mobile terminal 10) according to various programs expanded on the RAM 22 and also performs predetermined arithmetic processing and various kinds of processing in accordance with the user's operation.

If a pressing operation of one of the above various operation buttons 14 is performed by the user, the mobile terminal 10 sends out an operation input signal corresponding to the pressing operation to an input processing unit 23.

The input processing unit 23 converts the operation input signal supplied from the operation button 14 into an operation command by performing predetermined processing on the operation input signal and sends out the operation command to the CPU 20.

Accordingly, if the operation button 14 is pressed by the user, the CPU 20 performs various kinds of processing in accordance with the operation command provided by the input processing unit 23 in accordance with the pressing operation.

Incidentally, as described above, the touch screen 13 is constituted of a display 13A and a touch panel 3B.

Touch operations on the surface of the touch panel 13B include an operation in which the fingertip of a finger or the pen point of a stylus is caused to touch almost a point on the surface of the touch panel 13B and immediately separated.

Such touch operations also include an operation in which a desired line drawing such a straight line and a circle is created by moving the fingertip of a finger or the pen point of a stylus (that is, the fingertip or the like is slid on the surface) while being kept in touch with the surface of the touch panel 13B.

In the description that follows, the touch operation in which the fingertip of a finger or the pen point of a stylus is caused to touch almost a point on the surface of the touch panel 13B and immediately separated is particularly called a tap operation.

The tap operation is, for example, an operation performed to select a selection item such as an icon or a button on a display image displayed in the display 13A.

Also in the description that follows, the touch operation in which a desired line drawing is created by moving the fingertip of a finger or the pen point of a stylus while being kept in touch with the surface of the touch panel 13B is also called a slide operation.

The slide operation is, for example, an operation performed to drag (that is, move) a movable item such as an icon on a display image displayed in the display 13A to a desired position.

Also the slide operation is, for example, an operation performed to input an instruction in accordance with the position of the slide operation on a display image displayed in the display 13A or the shape of a line drawing created by the slide operation.

If it is not necessary to distinguish the tap operation and the slide operation performed by causing the fingertip or the like to touch the surface of the touch panel 13B in the description that follows, the both operations will be called touch operations.

Incidentally, if a touch operation is performed on the surface of the touch panel 13B, the touch panel 13B detects the touch position at fixed time intervals of by far a short time like a few [μsec] as coordinates of the pixel position on the display surface of the display 13A between the start and end of the touch operation.

Each time the touch panel 13B detects the touch position, the touch panel 13B sends out touch position information indicating the detected touch position to the CPU 20.

If the touch position information from the touch panel 13B is provided, for example, the CPU 20 detects the time during which the touch position information is provided as a time in which a touch operation from the start to the end of the touch operation is performed (hereinafter, also called a touch operation time).

Based on the touch position information, the CPU 20 detects, in addition to the touch position, an amount of displacement and a displacement direction thereof as touch position displacement information indicating how the touch position is displaced from which position from the start to the end of the touch operation.

Then, based on the touch operation time and touch position displacement information, the CPU 20 discriminates the type (that is, which of the tap operation and the slide operation) of the touch operation.

Thus, if a touch operation is performed on the surface of the touch panel 13B as a user's operation, the CPU 20 performs various kinds of processing in accordance with the type of the touch operation performed on the surface of the touch panel 13B and touch position displacement information.

In this manner, the CPU 20 can realize the call function, acquisition function of audio data, photo image data, and video data, and playback function of the audio data, photo image data, and video data according to various programs expanded on the RAM 22.

The CPU 20 can also realize various functions such as the acquisition function of various application programs and execution function of acquired application programs according to various programs expanded on the RAM 22.

Actually, the mobile terminal 10 is provided with a communication processing unit 24 and an antenna 25 to communicate with a base station of a telephone network managed and operated by a telephone company.

The communication processing unit 24 performs predetermined transmission processing on transmission data based on the wireless communication standards applied to base stations of the telephone network and also performs predetermined reception processing on data received by the antenna 25.

The antenna 25 transmits data on which the transmission processing has been performed by the communication processing unit 24 based on the wireless communication standards applied to base stations of the telephone network to the base station and also receives data transmitted from the base station.

If the call function is selected by the user via the operation button 14 or the touch panel 13B, the CPU 20 enters a call mode.

If, in this state, the phone number of the remote party is input by the user via the operation button 14 or the touch panel 13B and subsequently a call origination instruction is input, the CPU 20 generates call origination data by using the phone number.

The CPU 20 transmits the call originating data from the antenna 25 to the base station via the communication processing unit 24.

Accordingly, the CPU 20 transmits the call origination data to a call device (not shown) of the remote party by way of the telephone network to notify the remote party of call origination from the user via the call device.

If, as a result, the remote party permits a call and communication is established with the call device of the remote party, the CPU 20 collects the voice of the user by the microphone 16 and generates calling audio data by processing an obtained audio signal through an audio processing unit 26.

Then, the CPU 20 transmits the calling audio data from the antenna 25 to the base station via the communication processing unit 24.

Accordingly, the CPU 20 transmits the calling audio data of voice of the user to the call device of the remote party by way of the telephone network.

If calling audio data transmitted from the call device of the remote party is received by the antenna 25, the CPU 20 incorporates the calling audio data via the communication processing unit 24 and sends out the calling audio data to the audio processing unit 26.

The audio processing unit 26 processes the calling audio data provided by the CPU 20 and outputs an obtained audio signal from the speaker 15 as the voice of the remote party.

In this manner, if a communication connection is established with the call device of a remote party in response to a call request from a user in call mode, the CPU 20 can allow the user and the remote party to converse by transmitting/receiving calling audio data of voices of the user and the remote party.

If incoming call data transmitted from the call device of the remote party is received by the antenna 25, the CPU 20 incorporates the incoming call data via the communication processing unit 24 regardless of the function being executed.

Based on the incoming call data, the CPU 20 outputs a ring tone from, for example, the speaker 15 to notify the user of an incoming call from the remote party.

As a result, if the call is permitted by the user via the operation button 14 or the touch panel 13B and a communication connection with the call device of the remote party is established, the CPU 20 generates calling audio data by the microphone 16 and the audio processing unit 26 in the same manner as described above.

Then, the CPU 20 transmits the calling audio data from the antenna 25 to the base station via the communication processing unit 24.

Accordingly, the CPU 20 transmits the calling audio data of voice of the user to the call device of the remote party by way of the telephone network.

If calling audio data transmitted from the call device of the remote party is received by the antenna 25, the CPU 20 incorporates the calling audio data via the communication processing unit 24 and sends out the calling audio data to the audio processing unit 26.

Then, the audio processing unit 26 processes the calling audio data provided by the CPU 20 and outputs an obtained audio signal from the speaker 15 as the voice of the remote party.

In this manner, if a communication connection is established with the call device of the remote party in response to a call request from the remote party, the CPU 20 can also allow the user and the remote party to converse by transmitting/receiving calling audio data of voices of the user and the remote party.

Incidentally, if the acquisition function of audio data is selected by the user via the operation button 14 or the touch panel 13B, the CPU 20 enters an audio acquisition mode.

In this case, the CPU 20 accesses an audio delivery apparatus (not shown) in the Internet (not shown) by way of the base station sequentially via the communication processing unit 24 and the antenna 25.

Accordingly, the CPU 20 receives page image data of an audio selection page image transmitted from the audio delivery apparatus by way of the base station by the antenna 25 and incorporates the page image data via the communication processing unit 24.

Then, the CPU 20 performs decoding processing of the page image data and sends out the processed page image data to the display 13A via a display processing unit 27 to display an audio selection page image based on the page image data in the display 13A.

If, in this state, desired audio data on the audio selection page image is selected by the user via the touch panel 13B, the CPU 20 generates audio request data to request the selected audio data in accordance with the selection.

The CPU 20 transmits the audio request data to the base station from the antenna 25 via the communication processing unit 24 to transmit the audio request data to the audio delivery apparatus in the Internet by way of the base station.

As a result, if the audio data selected by the user is transmitted together with attribute data indicating attribute information of the audio data from the audio delivery apparatus by way of the base station, the CPU 20 receives the data by the antenna 25 to incorporate the data via the communication processing unit 24.

In the description that follows, attribute information of audio data is also called audio attribute information and attribute data indicating the audio attribute information is also called audio attribute data.

Then, the CPU 20 sends out the audio data and audio attribute data thereof to a storage medium 28 contained in the mobile terminal 10 or removably provided to associate and store the audio data and audio attribute data in the storage medium 28.

In this manner, each time the acquisition of audio data is requested by the user, the CPU 20 can acquire the audio data by using the audio delivery apparatus.

The audio data is generated by, for example, converting music into digital data. The audio attribute data indicates identification information capable of identifying the audio data individually (hereinafter, referred to as audio identification information) as audio attribute information of the corresponding audio data.

Further, the audio attribute data also indicates the music title of music, artist names of artists, the album name of an album in which the music is contained, the genre name of the genre to which the music belongs and so on based on the audio data as audio attribute information of the corresponding audio data.

Further, the audio attribute data also includes data of a jacket image (hereinafter, referred to as jacket image data) of an album in which music based on the audio data is contained as audio attribute information of the corresponding audio data.

If audio attribute data is stored in the storage medium 28 together with audio data, the CPU 20 creates various lists for management of the audio data based on the audio attribute data and updates the various lists each time new audio data is stored in the storage medium 28.

Actually, the CPU 20 classifies a plurality of pieces of audio data by genre name to create a list of genre names classifying the plurality of pieces of audio data for management of the audio data.

The CPU 20 also classifies a plurality of pieces of audio data classified for each genre name obtained by classifying the plurality of pieces of audio data by artist name to create a list of the genre names for management of the audio data.

Further, the CPU 20 also classifies a plurality of pieces of audio data classified for each artist name obtained by classifying the plurality of pieces of audio data by album name to create a list of the album names for management of the audio data.

Further, the CPU 20 also creates a list of music titles of a plurality of pieces of audio data classified for each album name obtained by classifying the plurality of pieces of audio data for management of the audio data.

Then, in this case, the CPU 20 sets the list of genre names as the highest-level management information and associates each genre name of the list with the list of artist names as management information one level lower than the genre name.

The CPU 20 also associates each artist name in the list of artist names with the list of album names as management information one level lower than the artist name.

Further, the CPU 20 also associates each album name in the list of album names with the list of music titles as management information one level lower than the album name.

In this manner, the CPU 20 hierarchically associates the lists of genre names, artist names, album names, and music titles so that the hierarchical classification from the genre name to the music title for a plurality of audio data can sequentially be followed.

In addition, the CPU 20 classifies a plurality of pieces of audio data by artist name excluding the genre name to create a list of artist names classifying the plurality of pieces of audio data for management of the audio data.

The CPU 20 also classifies a plurality of pieces of audio data classified for each artist name obtained by classifying the plurality of pieces of audio data by album name to create a list of the album names for management of the audio data.

Further, the CPU 20 also creates a list of music titles of a plurality of pieces of audio data classified for each album name obtained by classifying the plurality of pieces of audio data for management of the audio data.

Then, in this case, the CPU 20 sets the list of artist names as the highest-level management information and associates each artist name of the list with the list of album names as management information one level lower than the artist name.

The CPU 20 also associates each album name in the list of album names with the list of music titles as management information one level lower than the album name.

In this manner, the CPU 20 hierarchically associates the lists of artist names, album names, and music titles so that the hierarchical classification from the artist name to the music title for a plurality of audio data can also sequentially be followed.

Besides, the CPU 20 classifies a plurality of pieces of audio data by album name excluding the genre name and the artist name to create a list of album names classifying the plurality of pieces of audio data for management of the audio data.

The CPU 20 also creates a list of music titles of a plurality of pieces of audio data classified for each album name obtained by classifying the plurality of pieces of audio data for management of the audio data.

Then, in this case, the CPU 20 sets the list of album names as the highest-level management information and associates each album name of the list with the list of music titles as management information one level lower than the album name.

In this manner, the CPU 20 hierarchically associates the lists of album names and music titles so that the hierarchical classification of the album name and the music title described above for a plurality of audio data can sequentially be followed.

In addition, the CPU 20 creates a list of music titles of a plurality of pieces of audio data without classifying the plurality of pieces of audio data by genre name, artist name, and album name for management of the audio data.

In this manner, the CPU 20 creates various lists and also associates some of these lists hierarchically for management of the plurality of pieces of audio data stored in the storage medium 28.

Then, the CPU 20 sends out these various lists to the storage medium 28 for storage therein and thereafter, uses these various lists to allow the user to select audio data to be played back when the audio data is played back.

That is, if the playback function of audio data is selected by the user via the operation button 14 or the touch panel 13B, the CPU 20 enters an audio playback mode.

In this case, the CPU 20 uses various lists for management of audio data stored in the storage medium 28 to create and display a display image for selection of audio data in the display 13A via the display processing unit 27.

Accordingly, the CPU 20 uses the display image as a GUI (Graphical User Interface) along with the touch panel 13B to allow the user to select audio data to be played back on the display image via the touch panel 13B.

Then, if the audio data to be played back is selected on the display image by the user, the CPU 20 reads the selected audio data from the storage medium 28 and also sends out the read audio data to the audio processing unit 26.

The audio processing unit 26 performs predetermined playback processing like decoding processing on the audio data provided by the CPU 20 and outputs the obtained audio signal as music via a speaker or a headphone (not shown).

In this manner, the CPU 20 plays back the audio data selected by the user to be played back to allow the user to listen to music based on the audio data.

If the acquisition function of photo image data is selected by the user via the operation button 14 or the touch panel 13B, the CPU 20 enters a photo image acquisition mode.

In this case, the CPU 20 accesses a photo image delivery apparatus (not shown) in the Internet (not shown) by way of the base station sequentially via the communication processing unit 24 and the antenna 25.

Accordingly, the CPU 20 receives page image data of a photo image selection page image transmitted from the photo image delivery apparatus by way of the base station by the antenna 25 to incorporate the page image data via the communication processing unit 24.

Then, the CPU 20 performs decoding processing of the page image data and sends out the processed page image data to the display 13A via the display processing unit 27 to display a photo image selection page image based on the page image data in the display 13A.

If, in this state, desired photo image data on the photo image selection page image is selected by the user via the touch panel 13B, the CPU 20 generates photo image request data to request the selected photo image data in accordance with the selection.

The CPU 20 transmits the photo image request data to the base station from the antenna 25 via the communication processing unit 24 to transmit the photo image request data to the photo image delivery apparatus in the Internet by way of the base station.

As a result, if the photo image data selected by the user is transmitted together with attribute data indicating attribute information of the photo image data from the photo image delivery apparatus by way of the base station, the CPU 20 receives the data by the antenna 25 to incorporate the data via the communication processing unit 24.

In the description that follows, attribute information of photo image data is also called photo image attribute information and attribute data indicating the photo image attribute information is also called photo image attribute data.

Then, the CPU 20 sends out the photo image data and photo image attribute data thereof to the storage medium 28 to associate and store the photo image data and photo image attribute data in the storage medium 28.

In this manner, each time the acquisition of photo image data is requested by the user, the CPU 20 can acquire the photo image data by using the photo image delivery apparatus.

The photo image attribute data indicates identification information capable of identifying the photo image data individually (hereinafter, referred to as photo image identification information) as photo image attribute information of the corresponding photo image data.

The photo image attribute data also indicates the photo image title or photographer of the photo image based on the photo image data, the genre (genre name) to which the photo image belongs and the like as photo image attribute information of the corresponding photo image data.

Further, the photo image attribute data also contains thumbnail image data generated by performing reduction processing like thinning of pixels on the photo image data as photo image attribute information of the corresponding photo image data.

Incidentally, a thumbnail image based on thumbnail image data has a smaller size than a photo image based on photo image data, but can be used as an index of the photo image because the thumbnail image has substantially the same pattern as the pattern of the photo image.

Even when photo image attribute data is stored in the storage medium 28 together with photo image data, like the case of audio data, the CPU 20 creates various lists for management of the photo image data based on the photo image attribute data and also associates some of these lists hierarchically.

Then, the CPU 20 updates the various lists each time new photo image data is stored in the storage medium 28.

If the CPU 20 creates various lists for management of a plurality of pieces of photo image data as described above, the CPU 20 sends out the various lists to the storage medium 28 for storage therein.

Accordingly, when photo image data is played back thereafter, the CPU 20 uses these various lists to allow the user to select photo image data to be played back.

That is, if the playback function of photo image data is selected by the user via the operation button 14 or the touch panel 13B, the CPU 20 enters a photo image playback mode.

In this case, the CPU 20 uses various lists for management of photo image data stored in the storage medium 28 to create and display a display image for selection of photo image data in the display 13A via the display processing unit 27.

Accordingly, the CPU 20 uses the display image as a GUI also in this case along with the touch panel 13B to allow the user to select photo image data to be played back on the display image via the touch panel 13B.

Then, if the photo image data to be played back is selected on the display image by the user, the CPU 20 reads the selected photo image data from the storage medium 28 and also performs predetermined playback processing such as decoding processing on the read photo image data.

Then, the CPU 20 sends out the photo image data on which the playback processing has been performed to the display 13A via the display processing unit 27 to display a photo image based on the photo image data in the display 13A.

In this manner, the CPU 20 plays back the photo image data selected by the user to be played back to allow the user to view a photo image based on the photo image data.

Incidentally, if the acquisition function of video data is selected by the user via the operation button 14 or the touch panel 13B, the CPU 20 enters a video acquisition mode.

In this case, like the above case of the acquisition of audio data or photo image data, the CPU 20 uses a video delivery apparatus in the Internet to acquire (store in the storage medium 28) video data together with attribute data indicating attribute information of the video data.

Even when attribute data is stored in the storage medium 28 together with video data, like the case of audio data, the CPU 20 creates various lists for management of the video data based on the attribute data.

Then, the CPU 20 sends out these various lists to the storage medium 28 for storage therein and thereafter, uses these various lists to allow the user to select video data to be played back when the video data is played back.

That is, if the playback function of video data is selected by the user via the operation button 14 or the touch panel 13B, the CPU 20 enters a video playback mode.

In this case, the CPU 20 uses various lists for management of video data stored in the storage medium 28 to create and display a display image for selection of video data in the display 13A via the display processing unit 27.

Accordingly, the CPU 20 uses the display image as a GUI along with the touch panel 13B to allow the user to select video data to be played back on the display screen.

Then, if the video data to be played back is selected on the display image by the user, the CPU 20 reads the selected video data from the storage medium 28 and also performs predetermined playback processing such as decoding processing on the read video data.

Then, the CPU 20 sends out dynamic image data of the dynamic image data and audio data constituting the video data on which the playback processing has been performed to the display 13A via the display processing unit 27 to display dynamic images based on the dynamic image data in the display 13A.

The CPU 20 also performs predetermined processing such as decoding processing on the audio data by the audio processing unit 26 to output the audio data via a speaker or a headphone (not shown) as an audio signal.

In this manner, the CPU 20 plays back the video data selected by the user to be played back to allow the user to view video (that is, dynamic images and audio) based on the video data.

If the acquisition function of an application program is selected by the user via the operation button 14 or the touch panel 13B, the CPU 20 enters a program acquisition mode.

In this case, the CPU 20 accesses a program delivery apparatus (not shown) in the Internet (not shown) by way of the base station sequentially via the communication processing unit 24 and the antenna 25.

Accordingly, the CPU 20 receives page image data of a program selection page image transmitted from the program delivery apparatus by way of the base station by the antenna 25 and incorporates the page image data via the communication processing unit 24.

Then, the CPU 20 performs decoding processing of the page image data and sends out the processed page image data to the display 13A via the display processing unit 27 to display a program selection page image based on the page image data in the display 13A.

If, in this state, a desired application program on the program selection page image is selected by the user via the touch panel 13B, the CPU 20 generates program request data to request the selected application program.

The CPU 20 transmits the program request data to the base station from the antenna 25 via the communication processing unit 24 to transmit the program request data to the program delivery apparatus in the Internet by way of the base station.

As a result, if the application program selected by the user is transmitted together with attribute data indicating attribute information thereof from the program delivery apparatus by way of the base station, the CPU 20 receives the program and data by the antenna 25 to incorporate the program and data via the communication processing unit 24.

In the description that follows, attribute information of an application program is also called program attribute information and attribute data indicating the program attribute information is also called program attribute data.

Then, the CPU 20 sends out the application program and program attribute data thereof to the storage medium 28 to associate and store the application program and program attribute data in the storage medium 28.

In this manner, each time the acquisition of an application program is requested by the user, the CPU 20 can acquire various application programs such as a game program and navigation program by using the program delivery apparatus.

The program attribute data indicates identification information capable of identifying the application program individually (hereinafter, referred to as program identification information) as program attribute information of the corresponding application program.

Further, the program attribute data indicates the program title of the corresponding application program, artist names of artists, the genre name of the genre to which the application program belongs and the like as program attribute information.

The program attribute data also includes as program attribute information an icon indicating the application program and generated as a secondary object or tertiary object.

If the execution function of an application program is selected by the user via the operation button 14 or the touch panel 13B, the CPU 20 enters a program execution mode.

In this case, the CPU 20 reads an application program stored in advance from the storage medium 28 and program attribute data of the application program acquired by using a program delivery apparatus.

The CPU 20 generates a display image based on, for example, icons contained in a plurality of pieces of program attribute data (that is, icons indicating corresponding application programs) and sends out the display image to the display 13A via the display processing unit 27.

Accordingly, the CPU 20 uses the display image as a GUI along with the touch panel 13B to allow the user to select the application program to be executed on the display screen as a corresponding icon.

Then, if the application program to be executed is selected on the display image by the user, the CPU 20 reads the selected application program from the storage medium 28 to expand the application program on the RAM 22.

Accordingly, the CPU 20 executes the application program expanded on the RAM 22 to allow the user to enjoy a game or acquire and play back audio data, photo image data, or video data as described above.

Incidentally, when performing various kinds of processing as described above, the CPU 20 generates and displays a display image corresponding to the processing in the display 13A.

By appropriately switching the display of the display image to the display 13A in accordance with a user's operation, the CPU 20 presents various kinds of information such as the progress of processing to the user via the display image.

In the present embodiment, switching of the display of a display image means changing display content by replacing a structural element of the display image, changing display content by scrolling the display image, and causing a transition of the display of the display image to the display of a different display image.

Then, while various display images are displayed in the display 13A, the CPU 20 uses the display image as a GUI along with the touch panel 13B to allow the user to input various instructions and directives on the display image.

Thus, various display images displayed in the display 13A by the CPU 20 will be described below.

If, for example, the mobile terminal 10 is activated by an activation instruction being input by the user via the operation button 14, the CPU 20 first generates, among various display images, a display image to be a reference for transition of the display (hereinafter, referred to particularly as a home image).

Actually, the CPU 20 reads the home image and background image data of a background image used as the background of other display images from, for example, the ROM 21.

Figure 4:
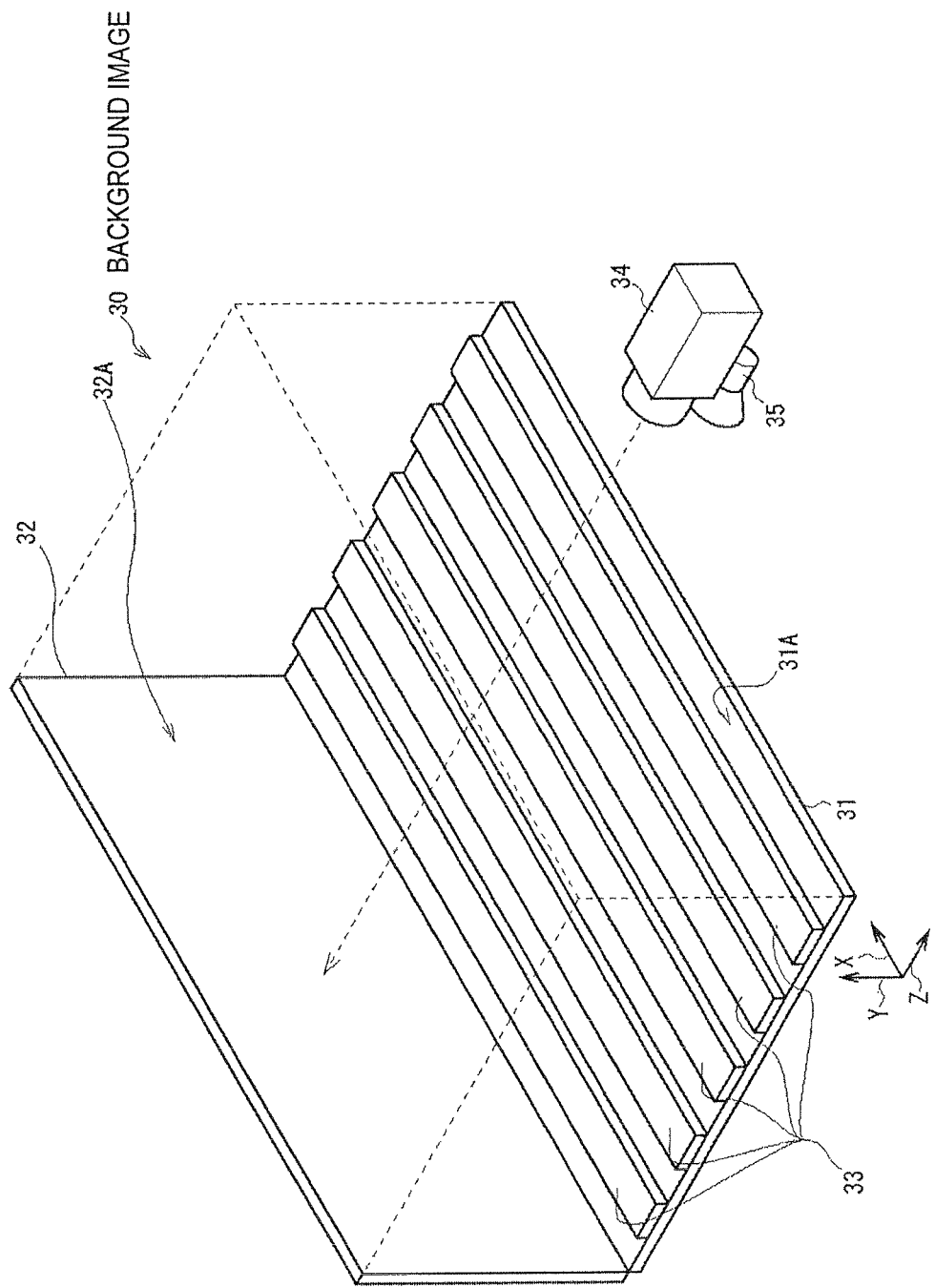
FIG. 4 is an approximate perspective view showing the configuration of a background image generated as a three-dimensional space image.

In this case, as shown in FIG. 4, a background image 30 based on background image data is generated as a three-dimensional space image in which various three-dimensional objects are arranged in a three-dimensional virtual space represented by a three-dimensional space coordinate system of the X axis, Y axis, and Z axis orthogonal to one another.

In the description that follows, the background image 30 generated as a three-dimensional space image is particularly also called as the three-dimensional background image 30.

In the description that follows, one direction of the one direction and the other direction parallel to the X axis and oriented in opposite directions in the three-dimensional background image 30 is also called an image left direction or simply as image left and the other direction is also called an image right direction or simply as image right.

Then, in the description that follows, if it is not necessary to specifically distinguish the image left direction and the image right direction oriented in opposite directions in the three-dimensional background image 30, these directions are also called together as image width directions.

Also in the description that follows, one direction of the one direction and the other direction parallel to the Y axis and oriented in opposite directions in the three-dimensional background image 30 is also called an image upper direction or simply as image up and the other direction is also called an image lower direction or simply as image down.

Then, in the description that follows, if it is not necessary to specifically distinguish the image upper direction and the image lower direction oriented in opposite directions in the three-dimensional background image 30, these directions are also called together as image height directions.

Further, in the description that follows, one direction of the one direction and the other direction parallel to the Z axis and oriented in opposite directions in the three-dimensional background image 30 is also called an image forward direction or simply as image forward and the other direction is also called an image backward direction or simply as image backward.

Then, in the description that follows, if it is not necessary to specifically distinguish the image forward direction and the image backward direction oriented in opposite directions in the three-dimensional background image 30, these directions are also called together as image depth directions.

Actually, the three-dimensional background image 30 includes a bottom plate object 31 as a three-dimensional object in a flat plate shape arranged in parallel with the image width direction and the image depth direction (that is, the X axis and the Z axis).

In the description that follows, a surface 31A on the upper side of the image of the bottom plate object 31 is also called the bottom plate one surface 31A and an edge on the forward side of the image of the bottom plate one surface 31A is also called a bottom plate forward edge.

In the three-dimensional background image 30, a deep wall object 32 as a three-dimensional object in a flat plate shape parallel to the image width direction and the image height direction (that is, the X axis and the Y axis) is arranged by bringing an end on the lower side of the image into contact with an end on the backward side of the image of the bottom plate object 31. In the description that follows, a surface 32A on the forward side of the image of the deep wall object 32 is also called the deep wall one surface 32A.

Further in the three-dimensional background image 30, a plurality of belt-like objects 33 as belt-like three-dimensional objects having the same width and length is arranged on the bottom plate one surface 31A of the bottom plate object 31 in such a way that the longitudinal direction thereof is parallel to the image width direction and the plurality of belt-like objects 33 is arranged in the image depth direction in spacing equal to the width thereof.

In the description that follows, an edge parallel to the image width direction in each of the belt-like objects 33 is also called an object edge.

Then, in the three-dimensional background image 30, the length of each of the bottom plate object 31, the deep wall object 32, and the plurality of belt-like objects 33 is chosen to be the same length, which is, for example, several times the length of the display image in the image horizontal direction.

That is, when the three-dimensional background image 30 is actually used as the home image or the background of other display images, the CPU 20 it is necessary to convert the three-dimensional background image 30 into a background image as a two-dimensional flat image (hereinafter, this is particularly also called a two-dimensional background image).

To actually convert the three-dimensional background image 30 into a two-dimensional background image, as described later, the CPU 20 sets the position and orientation of a virtual camera 34 and also sets the position and orientation of a virtual light 35.

Then, the CPU 20 converts the three-dimensional background image 30 into a two-dimensional background image by a perspective projection as if to photograph by the virtual camera 34 while the three-dimensional background image 30 is illuminated with the virtual light 35.

The CPU 20 generates, as will be described later, a plurality of home images having mutually different display content to make the display of the plurality of home images switchable.

Then, the CPU 20 changes the position and orientation of the virtual camera 34 and the virtual light 35 for each home image to generate two-dimensional background images obtained by changing the orientation and range in which the three-dimensional background image 30 is shown and the method of illumination.

That is, the CPU 20 generates the plurality of home images by using two-dimensional background images having different visible states of the three-dimensional background image 30.

Thus, the three-dimensional background image 30 is formed wider than home images so that even if the positions and orientations of the camera 34 and the light 35 are changed, the bottom plate one surface 31A and the deep wall one surface 32A do not swerve from the neighborhood of the optical axis of a lens of the camera 34 and the neighborhood of the optical axis of an emission surface of illumination light of the light 35.

In the description that follows, the optical axis of a lens of the camera 34 is also called a camera optical axis and the optical axis of the emission surface of illumination light of the light 35 is also called a light optical axis.

In the three-dimensional background image 30, the color, transparency, reflectance, and refractive index are appropriately chosen for each of the bottom plate object 31, the deep wall object 32, and the plurality of belt-like objects 33.

Accordingly, when the three-dimensional background image 30 is converted into a two-dimensional background image, the object edge of each of the belt-like objects 33 is more conspicuously generated than other portions of the belt-like objects 33, the bottom plate one surface 31A, and the deep wall one surface 32A.

When background image data is read from the storage medium 28, the CPU 20 sets the position and orientation of the virtual camera 34 with respect to the three-dimensional background image 30 and also sets the position and orientation of the virtual light 35.

Figure 5:
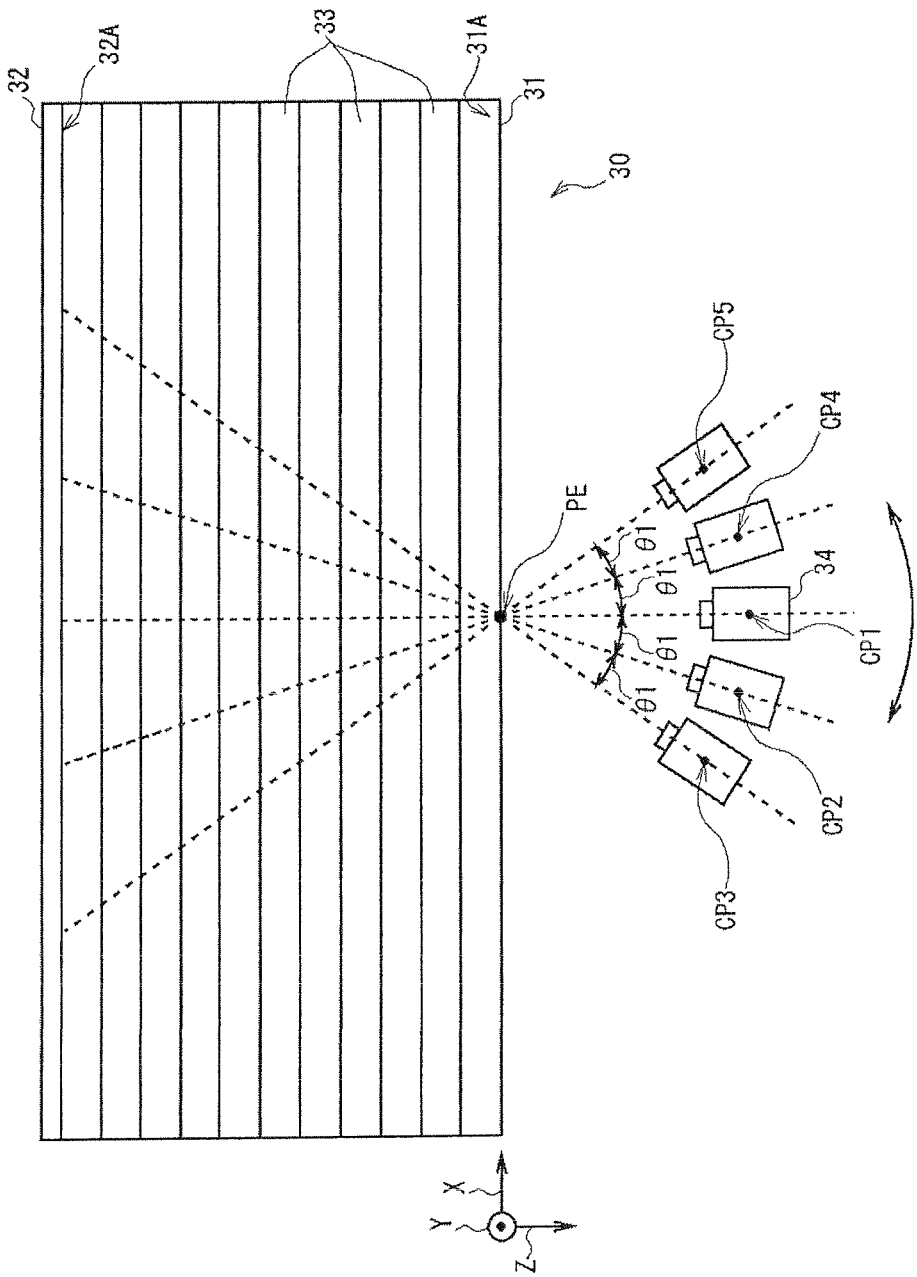
FIG. 5 is an approximate top view offering a description of positions and orientations of a camera chosen for generating a two-dimensional background image when the display of a home image is switched.

For the virtual camera 34, as shown in FIG. 5, five positions for photographing the three-dimensional background image 30 and orientations in the five positions are chosen in advance for generation of two-dimensional background images on the front side of the image from the bottom plate edge of the three-dimensional background image 30.

In this case, the five positions of the virtual camera 34 and the orientations in the five positions are chosen based on, for example, a perpendicular PE of the bottom plate one surface 31A passing through the center point of the front edge of the bottom plate in the three-dimensional background image 30.

One of the positions chosen in advance for the camera 34 is a position CP1 that is on the front side of the image by a predetermined distance from the edge of the bottom plate of the three-dimensional background image 30 and makes the camera optical axis parallel to the image depth direction and sequentially intersect the center of the deep wall one surface 32A at right angles together with the perpendicular PE.

Then, one orientation chosen in advance for the camera 34 is an orientation that orients the lens of the camera 34 along the camera optical axis toward the center portion of the three-dimensional background image 30 in the position CP1 that makes the camera optical axis intersect the center of the deep wall one surface 32A at right angles.

In the description that follows, the position CP1 of the camera 34 that is on the front side of the image by a predetermined distance from the edge of the bottom plate of the three-dimensional background image 30 and makes the camera optical axis parallel to the image depth direction and sequentially intersect the center of the deep wall one surface 32A at right angles together with the perpendicular PE is also called the center camera position CP1.

Also in the description that follows, the orientation that orients the lens of the camera 34 in the center camera position CP1 toward the center portion of the three-dimensional background image 30 is also called a center camera orientation.

The four remaining positions chosen in advance for the camera 34 are chosen in such a way that the respective height (Y coordinate) from the ZX plane and the respective distance to the perpendicular PE are equal to the height (Y coordinate) from the ZX plane and the distance to the perpendicular PE in the center camera position CP1, respectively.

Two of the remaining four positions are two positions CP2, CP3 obtained by rotating the camera 34 around the perpendicular PE from the center camera position CP1 in the image left direction sequentially by an angle θ1.

The other two of the remaining four positions are two positions CP4, CP5 obtained by rotating the camera 34 around the perpendicular PE from the center camera position CP1 in the image right direction sequentially by the angle θ1.

Then, one of the four remaining orientations chosen in advance for the camera 34 is an orientation in the first position CP2 in the image left direction from the center camera position CP1 that makes the camera optical axis intersect the perpendicular PE at right angles and the deep wall one surface 32A obliquely in a position on the right side from the center.

That is, the orientation of the camera 34 in the first position CP2 in the image left direction from the center camera position CP1 is an orientation that orients the lens of the camera 34 from the position CP2 on the left front side of the image along the camera optical axis toward a first right-side portion on the right side from the center portion of the three-dimensional background image 30.

Another one of the four remaining orientations is an orientation in the second position CP3 in the image left direction from the center camera position CP1 that makes the camera optical axis intersect the perpendicular PE at right angles and the deep wall one surface 32A obliquely in a position further on the right side from the center.

That is, the orientation of the camera 34 in the second position CP3 in the image left direction from the center camera position CP1 is an orientation that orients the lens of the camera 34 from the position CP3 on the left front side of the image along the camera optical axis toward a second right-side portion further on the right side from the first right-side portion of the three-dimensional background image 30.

Still another one of the four remaining orientations is an orientation in the first position CP4 in the image right direction from the center camera position CP1 that makes the camera optical axis intersect the perpendicular PE at right angles and the deep wall one surface 32A obliquely in a position on the left side from the center.

That is, the orientation of the camera 34 in the first position CP4 in the image right direction from the center camera position CP1 is an orientation that orients the lens of the camera 34 from the position CP4 on the right front side of the image along the camera optical axis toward a first left-side portion on the left side from the center portion of the three-dimensional background image 30.

Still another one of the four remaining orientations is an orientation in the second position CP5 in the image right direction from the center camera position CP1 that makes the camera optical axis intersect the perpendicular PE at right angles and the deep wall one surface 32A obliquely in a position further on the left side from the center.

That is, the orientation of the camera 34 in the second position CP5 in the image right direction from the center camera position CP1 is an orientation that orients the lens of the camera 34 from the position CP5 on the right front side of the image along the camera optical axis toward a second left-side portion further on the left side from the first left-side portion of the three-dimensional background image 30.

In the description that follows, the first position CP2 of the camera 34 in the image left direction from the center camera position CP1 is also called the first left-side camera position CP2.

Then, in the description that follows, the orientation of the camera 34 that orients the lens of the camera 34 along the camera optical axis toward the first right-side portion of the three-dimensional background image 30 in the first left-side camera position CP2 on the left front side of the image is also called a first right back-side camera orientation.

Also in the description that follows, the second position CP3 of the camera 34 in the image left direction from the center camera position CP1 is also called the second left-side camera position CP3.

Then, in the description that follows, the orientation of the camera 34 that orients the lens of the camera 34 along the camera optical axis toward the second right-side portion of the three-dimensional background image 30 in the second left-side camera position CP3 on the left front side of the image is also called a second right back-side camera orientation.

Further, in the description that follows, the first position CP4 of the camera 34 in the image right direction from the center camera position CP1 is also called the first right-side camera position CP4.

Then, in the description that follows, the orientation of the camera 34 that orients the lens of the camera 34 along the camera optical axis toward the first left-side portion of the three-dimensional background image 30 in the first right-side camera position CP4 on the right front side of the image is also called a first left back-side camera orientation.

Further, in the description that follows, the second position CP5 of the camera 34 in the image right direction from the center camera position CP1 is also called the second right-side camera position CP5.

Then, in the description that follows, the orientation of the camera 34 that orients the lens of the camera 34 along the camera optical axis toward the second left-side portion of the three-dimensional background image 30 in the second right-side camera position CP5 on the right front side of the image is also called a second left back-side camera orientation.

In the description that follows, if it is not necessary to distinguish the center camera position CP1, the first left-side camera position CP2, the second left-side camera position CP3, the first right-side camera position CP4, and the second right-side camera position CP5, these camera positions are simply called chosen camera positions for convenience's sake.

Also in the description that follows, if it is not necessary to distinguish the center camera orientation, the first right hack-side camera orientation, the second right back-side camera orientation, the first left back-side camera orientation, and the second left back-side camera orientation, these camera orientations are simply called chosen camera orientations for convenience's sake.

Figure 6:
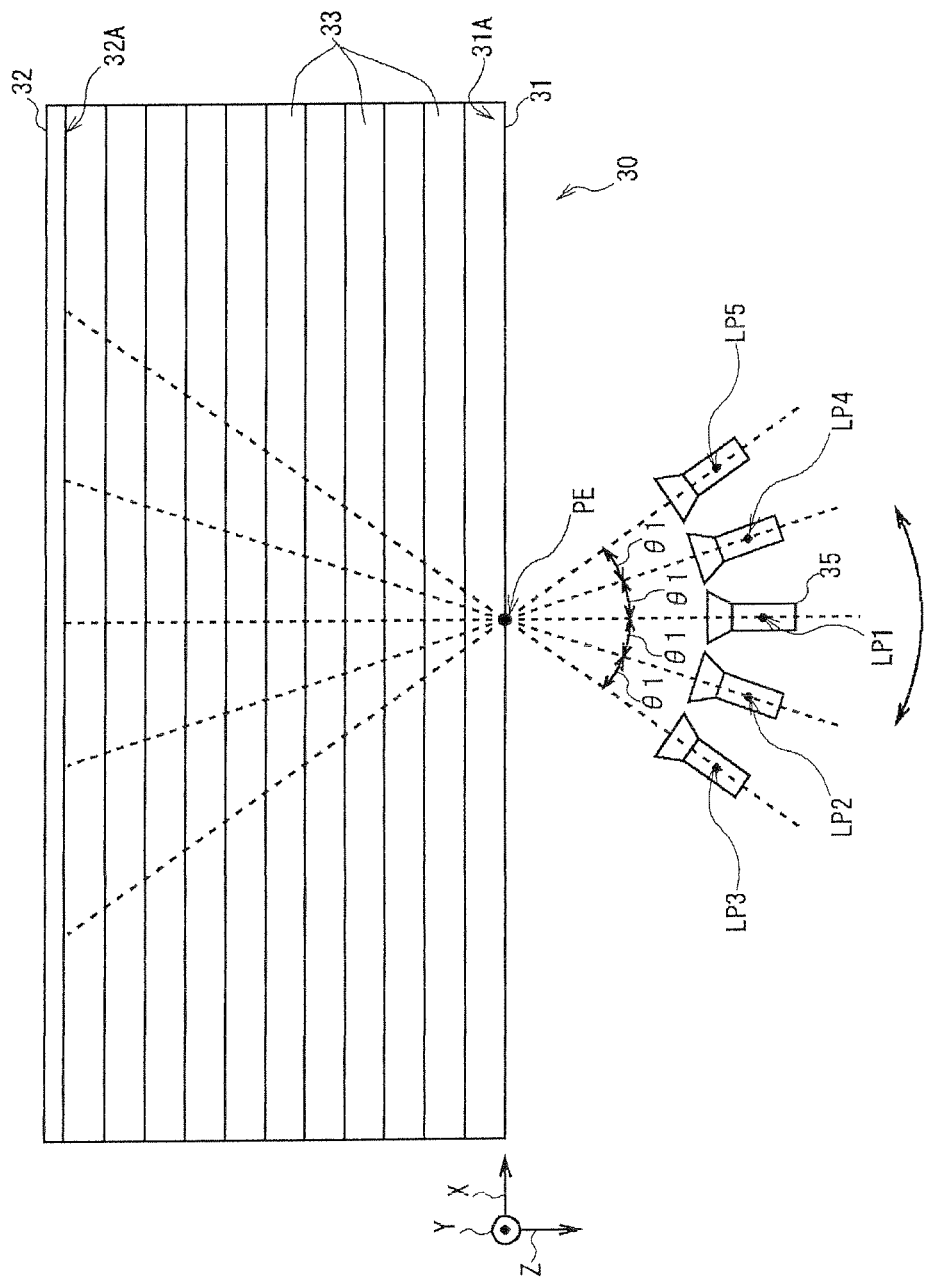
FIG. 6 is an approximate top view offering the description of positions and orientations of a light chosen for generating the two-dimensional background image when the display of the home image is switched.

On the other hand, for the virtual light 35, as shown in FIG. 6, five positions for illuminating the three-dimensional background image 30 and orientations in the live positions are chosen in advance for generation of two-dimensional background images on the front side of the image from the bottom plate edge of the three-dimensional background image 30.

In this case, the five positions of the virtual light 35 and the orientations in the five positions are also chosen based on, for example, like the chosen camera positions and chosen camera orientations of the virtual camera 34, the perpendicular PE of the bottom plate one surface 31A of the three-dimensional background image 30.

One of the positions chosen in advance for the light 35 is a position LP1 that makes the light optical axis parallel to the image depth direction in a lower position of the image than the center camera position CP1 and sequentially intersect the position slightly in an image lower position from the center of the deep wall one surface 32A at right angles together with the perpendicular PE.

In the description that follows, the position in an image lower position from the center of the deep wall one surface 32A and where the light optical axis intersect at right angles is also called a center lower position.

That is, the one position LP1 chosen in advance for the light 35 is different from the center camera position CP1 only in height (Y coordinate) from the ZX plane and the distance (Z coordinate) from the XY plane and the distance (X coordinate) from the YZ plane are chosen to be equal to the corresponding distances of the center camera position CP1.

Then, one orientation chosen in advance for the light 35 is an orientation that orients the emission surface of the light 35 along the light optical axis toward the center portion of the three-dimensional background image 30 in the position LP1 that makes the light optical axis intersect the center lower position of the deep wall one surface 32A at right angles.

In the description that follows, the position LP1 that makes the optical axis of the emission surface of illumination light of the light 35 parallel to the image depth direction in a lower position of the image than the center camera position CP1 and sequentially intersect the position slightly in an image lower position from the center of the deep wall one surface 32A at right angles together with the perpendicular PE is also called the center light position LP1.

Then, in the description that follows, the orientation that orients the emission surface of the light 35 toward the center portion of the three-dimensional background image 30 in the center light position LP1 is also called a center light orientation.

The four remaining orientations chosen in advance for the light 35 are chosen in such a way that the respective height (Y coordinate) from the ZX plane and the respective distance to the perpendicular PE are equal to the height (Y coordinate) from the ZX plane and the distance to the perpendicular PE in the center light position LP1, respectively.

Two of the remaining four orientations are two orientations LP2, LP3 obtained by rotating the light 35 around the perpendicular PE from the center light position LP1 in the image left direction sequentially by the angle θ1.

The other two of the remaining four orientations are two positions LP4, LP5 obtained by rotating the light 35 around the perpendicular PE from the center light position LP1 in the image right direction sequentially by the angle θ1.

That is, one of the four positions LP2 to LP5 is the position LP2 that is different from the first left-side camera position CP2 only in height (Y coordinate) from the ZX plane and for which the distance (Z coordinate) from the XY plane and the distance (X coordinate) from the YZ plane are chosen to be equal.

Also, one of the four positions LP2 to LP5 is the position LP3 that is different from the second left-side camera position CP3 only in height (Y coordinate) from the ZX plane and for which the distance (Z coordinate) from the XY plane and the distance (X coordinate) from the YZ plane are chosen to be equal.

Further, one of the four positions LP2 to LP5 is the position LP4 that is different from the first right-side camera position CP4 only in height (Y coordinate) from the ZX plane and for which the distance (Z coordinate) from the XY plane and the distance (X coordinate) from the YZ plane are chosen to be equal.

Further, one of the four positions LP2 to LP5 is the position LP5 that is different from the second right-side camera position CP5 only in height (Y coordinate) from the ZX plane and for which the distance (Z coordinate) from the XY plane and the distance (X coordinate) from the YZ plane are chosen to be equal.

Then, one of the four remaining orientations chosen in advance for the light 35 is an orientation in the first position LP2 in the image left direction from the center light position LP1 that makes the light optical axis intersect the perpendicular PE at right angles and the deep wall one surface 32A obliquely in a position on the right side from the center lower position.

That is, the orientation of the light 35 in the first position LP2 in the image left direction from the center light position LP1 is an orientation that orients the emission surface of the light 35 from the position LP2 on the left front side of the image along the light optical axis toward the first right-side portion of the three-dimensional background image 30.

Another one of the four remaining orientations is an orientation in the second position LP3 in the image left direction from the center light position LP1 that makes the light optical axis intersect the perpendicular PE at right angles and the deep wall one surface 32A obliquely in a position further on the right side from the center lower position.

That is, the orientation of the light 35 in the second position LP3 in the image left direction from the center light position LP1 is an orientation that orients the emission surface of the light 35 from the position LP3 on the left front side of the image along the light optical axis toward the second right-side portion of the three-dimensional background image 30.

Still another one of the four remaining orientations is an orientation in the first position LP4 in the image right direction from the center light position LP1 that makes the light optical axis intersect the perpendicular PE at right angles and the deep wall one surface 32A obliquely in a position on the left side from the center lower position.

That is, the orientation of the light 35 in the first position LP4 in the image right direction from the center light position LP1 is an orientation that orients the emission surface of the light 35 from the position LP4 on the right front side of the image along the light optical axis toward the first left-side portion of the three-dimensional background image 30.

Still another one of the four remaining orientations is an orientation in the second position LP5 in the image right direction from the center light position LP1 that makes the light optical axis intersect the perpendicular PE at right angles and the deep wall one surface 32A obliquely in a position further on the left side from the center lower position.

That is, the orientation of the light 35 in the second position LP5 in the image right direction from the center light position LP1 is an orientation that orients the emission surface of the light 35 from the position LP5 on the right front side of the image along the light optical axis toward the second left-side portion of the three-dimensional background image 30.

In the description that follows, the first position LP2 of the light 35 in the image left direction from the center light position LP1 is also called the first left-side light position LP2.

Then, in the description that follows, the orientation of the light 35 that orients the emission surface of the light 35 along the light optical axis toward the first right-side portion of the three-dimensional background image 30 in the first left-side light position LP2 on the left front side of the image is also called a first right back light orientation.

Also in the description that follows, the second position LP3 of the light 35 in the image left direction from the center light position LP1 is also called the second left-side light position LP3.

Then, in the description that follows, the orientation of the light 35 that orients the emission surface of the light 35 along the camera optical axis toward the second right-side portion of the three-dimensional background image 30 in the second left-side light position LP3 on the left front side of the image is also called a second right back light orientation.

Further, in the description that follows, the first position LP4 of the light 35 in the image right direction from the center light position LP1 is also called the first right-side light position LP4.

Then, in the description that follows, the orientation of the light 35 that orients the emission surface of the light 35 along the light optical axis toward the first left-side portion of the three-dimensional background image 30 in the first right-side light position LP4 on the right front side of the image is also called a first left back light orientation.

Further, in the description that follows, the second position LP5 of the light 35 in the image right direction from the center light position LP1 is also called the second right-side light position LP5.

Then, in the description that follows, the orientation of the light 35 that orients the emission surface of the light 35 along the light optical axis toward the second left-side portion of the three-dimensional background image 30 in the second right-side light position LP5 on the right front side of the image is also called a second left back light orientation.

If, in the description that follows, it is not necessary to distinguish the center light position LP1, the first left-side light position LP2, the second left-side light position LP3, the first right-side light position LP4, and the second right-side light position LP5, these light positions are simply called chosen light positions for convenience's sake.

Also in the description that follows, if it is not necessary to distinguish the center light orientation, the first right back light orientation, the second right back light orientation, the first left back light orientation, and the second left back light orientation, these light orientations are simply called chosen light orientations for convenience's sake.

Thus, the CPU 20 sets the position and the orientation of the virtual camera 34 for the three-dimensional background image 30 to the center camera position and the center camera orientation and also sets the position and the orientation of the virtual light 35 to the center light position and the center light orientation.

Accordingly, the CPU 20 illuminates the center portion of the three-dimensional background image 30 (that is, the center portion of the bottom plate one surface 31A and the deep wall one surface 32A) with the light 35 from the front side of the image.

In this state, the CPU 20 converts the center portion of the three-dimensional background image 30 into a two-dimensional background image by a perspective projection as if to look squarely at the center portion to photograph from the front side of the image by the camera 34.

That is, the CPU 20 uniformly illuminates and converts the center portion of the three-dimensional background image 30 into a two-dimensional background image drawn and represented as if to look squarely from the front side of the image on a two-dimensional plane having the same image horizontal direction size and image vertical direction size as the image horizontal direction size and image vertical direction size of the display image.

If a two-dimensional background image is generated from the three-dimensional background image 30 as described above, the CPU 20 reads template image data stored in advance as a foreground common to a plurality of home images from, for example, the ROM 21.

Then, the CPU 20 combines background image data of the two-dimensional background image and the template image data to generate home image data and sends out the generated home image data to the display 13A via the display processing unit 27.

Figure 7:
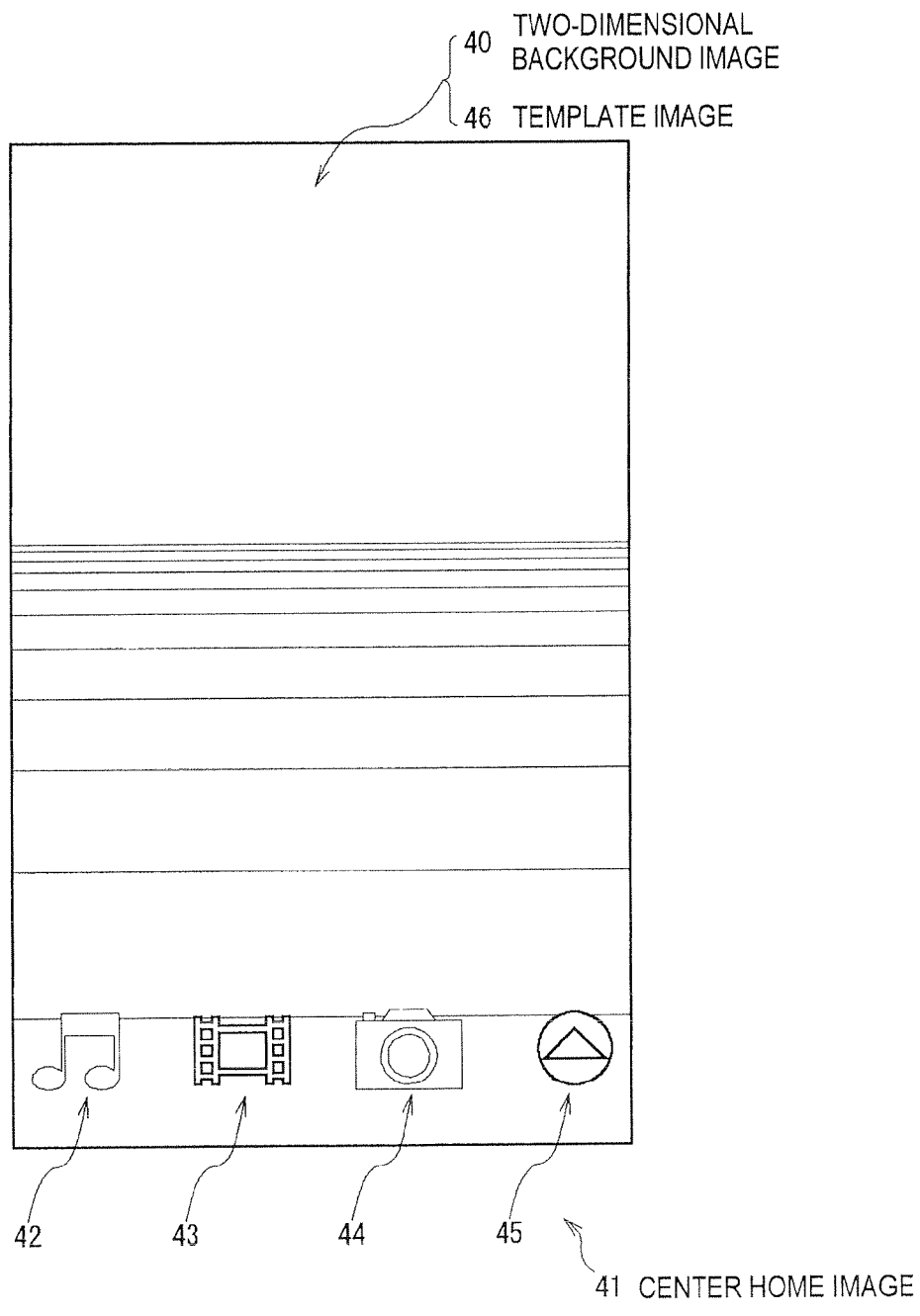
FIG. 7 is an approximate front view showing the configuration of a center home image.

Accordingly, the CPU 20 displays a home image 41 having a two-dimensional background image 40 as shown in FIG. 7 in the display 13A based on the home image data.

In this case, the two-dimensional background image 40 in the home image 41 shows the center portion of the three-dimensional background image 30 in a visible state in which individual object edges are visible in parallel with the image horizontal direction in approximately uniform brightness as a whole.

In the description that follows, the home image 41 showing the center portion of the three-dimensional background image 30 and having the two-dimensional background image 40 is particularly also called the center home image 41.

In addition to the center home image 41, various home images having two-dimensional background images with different visible states of the three-dimensional background image 30 will be described below.

In the description that follows, however, if it is not necessary to distinguish the center home image and other home images, these home images are simply called home images for convenience's sake.

The center hole image 41 has a template image 46 having a plurality of icons 42 to 45 chosen in advance and showing a plurality of functions superimposed on the two-dimensional background image 40.

The template image 46 has the plurality of icons 42 to 45 arranged in the lower end portion thereof in the image horizontal direction and is generated in such a way that the two-dimensional background image 40 is transmitted in portions other than an arrangement portion of the icons 42 to 45.

The icons 42 to 45 inside the template image 46 include the icon 42 to select for switching (transition) from the display of a home image to a display image generated to enable the selection of various functions such as the acquisition or playback of, for example, audio data as icons.

The icons 42 to 45 inside the template image 46 also include the icon 43 to select for switching (transition) from the display of a home image to a display image generated to enable the selection of various functions such as the acquisition or playback of, for example, video data as icons.

Further, the icons 42 to 45 inside the template image 46 include the icon 44 to select for switching (transition) from the display of a home image to a display image generated to enable the selection of various functions such as the acquisition or playback of, for example, photo image data as icons.

Further, the icons 42 to 45 inside the template image 46 include the icon 45 to select for switching (transition) from the display of a home image to a display image generated to enable the selection of various functions such as the acquisition or playback of, for example, application programs as icons.

In the description that follows, a display image generated to enable the selection of various functions such as the acquisition or playback of audio data is particularly also called an audio menu image.

In the description that follows, a display image generated to enable the selection of various functions such as the acquisition or playback of video data is particularly also called a video menu image.

Further, in the description that follows, a display image generated to enable the selection of various functions such as the acquisition or playback of photo image data is particularly also called a photo image menu image.

Further, in the description that follows, a display image generated to enable the selection of various functions such as the acquisition or playback of application programs is particularly also called an application menu image.

In the description that follows, if it is not necessary to distinguish the audio menu image, the video menu image, the photo image menu image, and the application menu image, these menu images are simply called menu images.

If, for example, a slide operation in the left direction is performed on the surface of the touch panel 13B by the user while the center home image 41 is displayed in the display 13A, the CPU 20 determines that display content of the center home image 41 is requested to be changed.

Figure 8:
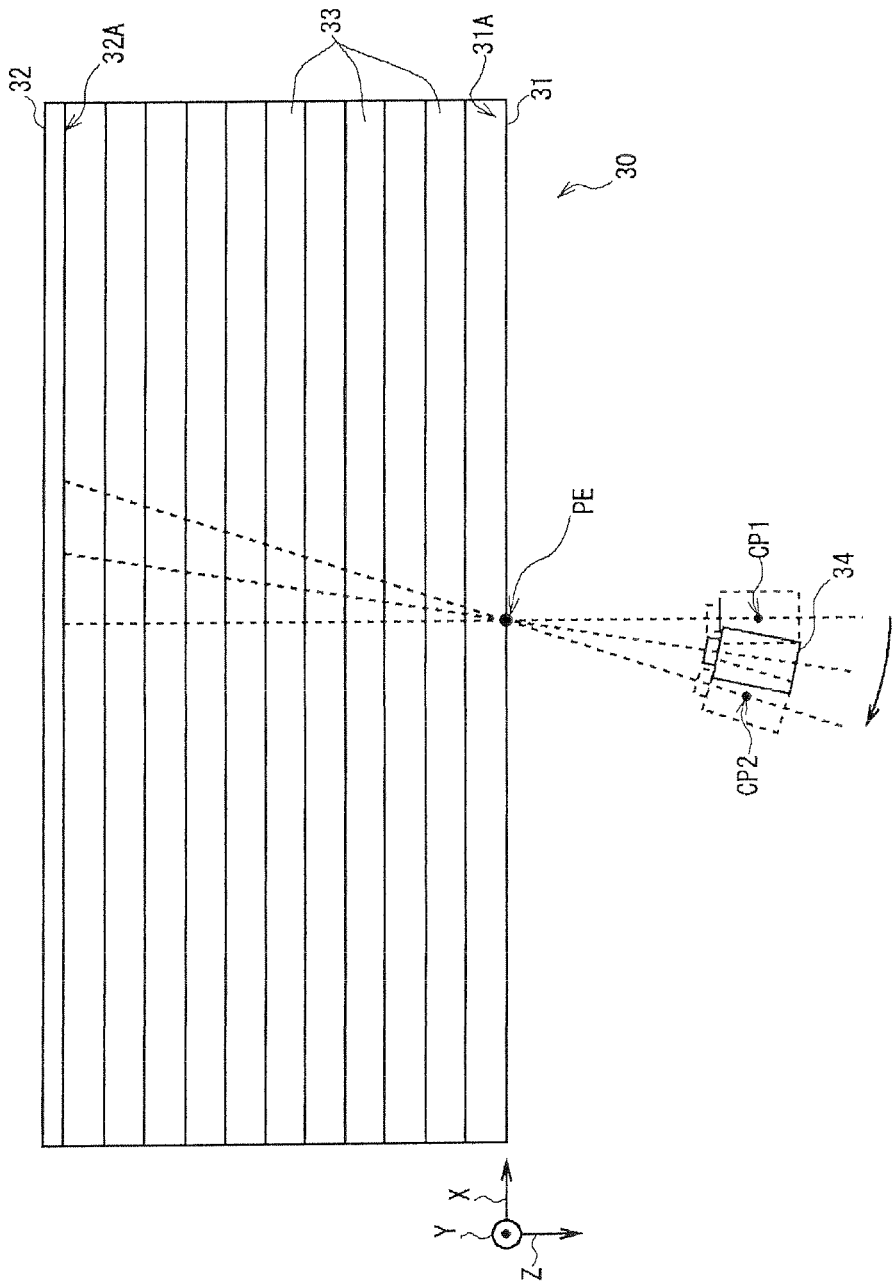
FIG. 8 is an approximate top view offering the description of changes in position and orientation of the camera in accordance with a slide operation in a left direction.

In this case, as shown in FIG. 8, the CPU 20 sequentially moves (rotates) the camera 34 horizontally in accordance with the amount of displacement of the touch position around the above perpendicular PE while the camera optical axis being maintained at right angles to the perpendicular PE from the center camera position CP1 in the image left direction up to immediately before the first left-side camera position CP2.

Figure 9:
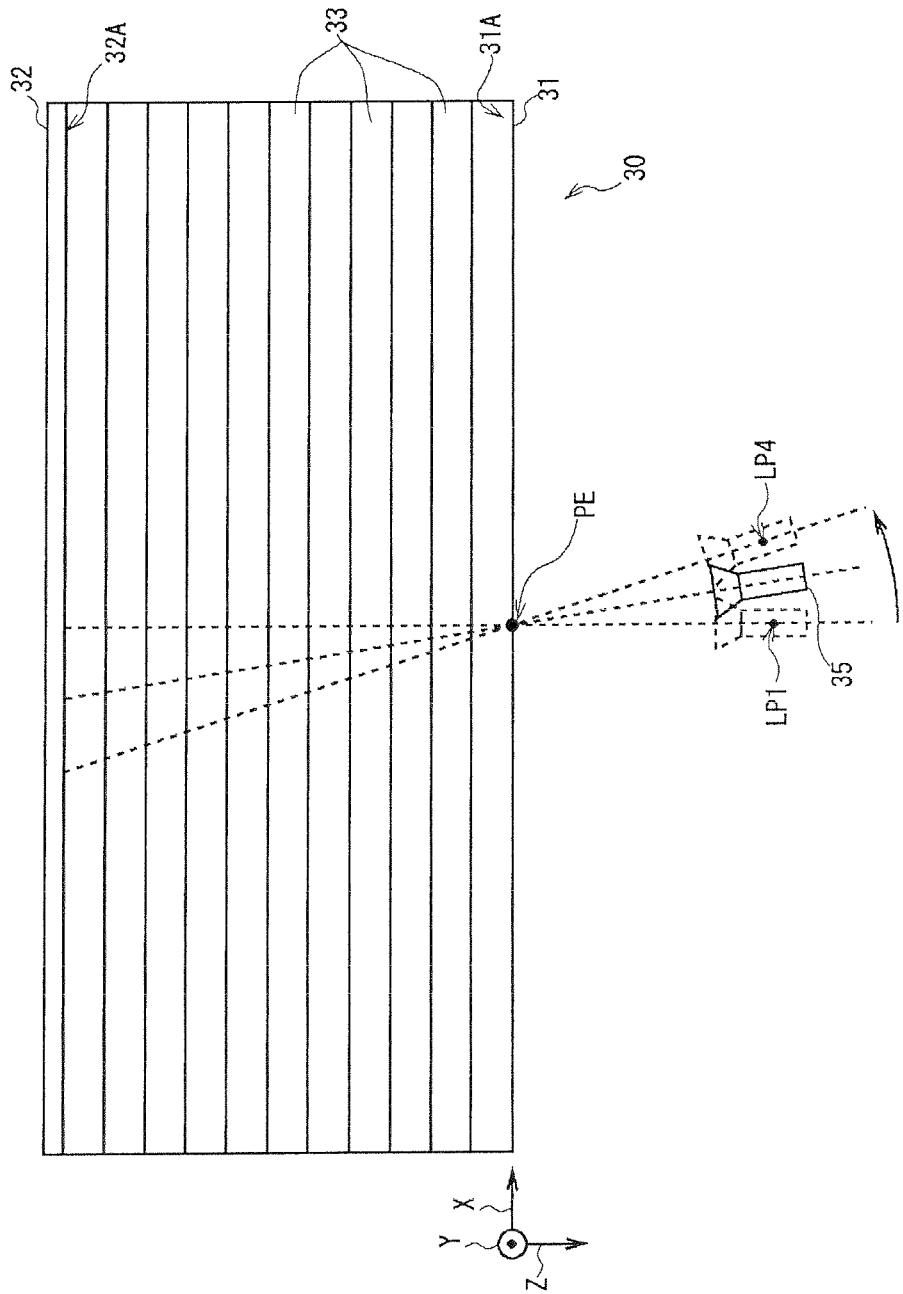
FIG. 9 is an approximate top view offering the description of changes in position and orientation of the light in accordance with the slide operation in the left direction.

Also as shown in FIG. 9, the CPU 20 sequentially moves (rotates) the light 35 horizontally in accordance with the amount of displacement of the touch position around the perpendicular PE while the light optical axis being maintained at right angles to the perpendicular PE from the center light position LP1 in the image right direction up to immediately before the first right-side light position LP4.

Further, the CPU 20 sequentially converts the three-dimensional background image 30 into two-dimensional background images by a method similar to the above method while moving the camera 34 and the light 35 in the opposite directions (that is, separating from each other) in this manner to sequentially change the position and orientation.

Further, each time a two-dimensional background image is generated, the CPU 20 combines background image data of the two-dimensional background image and template image data to generate home image data and sends out the home image data to the display 13A via the display processing unit 27.

Accordingly, while the slide operation in the left direction is performed, the CPU 20 changes the two-dimensional background image inside the home image displayed in the display 13A by gradually changing the visible state of the three-dimensional background image 30 in response to the movement of a fingertip or the like caused by the slide operation.

That is, while the slide operation in the left direction is performed, the CPU 20 displays two-dimensional background images inside the home image as an animation that sequentially changes the visible state from the center portion to the portion on the right side viewed obliquely while moving to the left front side of the three-dimensional background image 30.

When the slide operation in the left direction by the user ends, the CPU 20 compares the amount of displacement of the touch position from the start point to the end point with a predetermined threshold chosen in advance to determine whether to switch the display.

If, as a result, the amount of displacement of the touch position is smaller than the threshold, the CPU 20 determines that switching of the display of the home image is not instructed.

Then, in place of the home image in which two-dimensional background images are displayed as an animation, the CPU 20 redisplays the center home image 41 before starting to change the two-dimensional background image in the display 13A.

If the amount of displacement of the touch position is equal to or larger than the threshold, by contrast, the CPU 20 determines that switching of the display of the home image is instructed.

Figure 10:
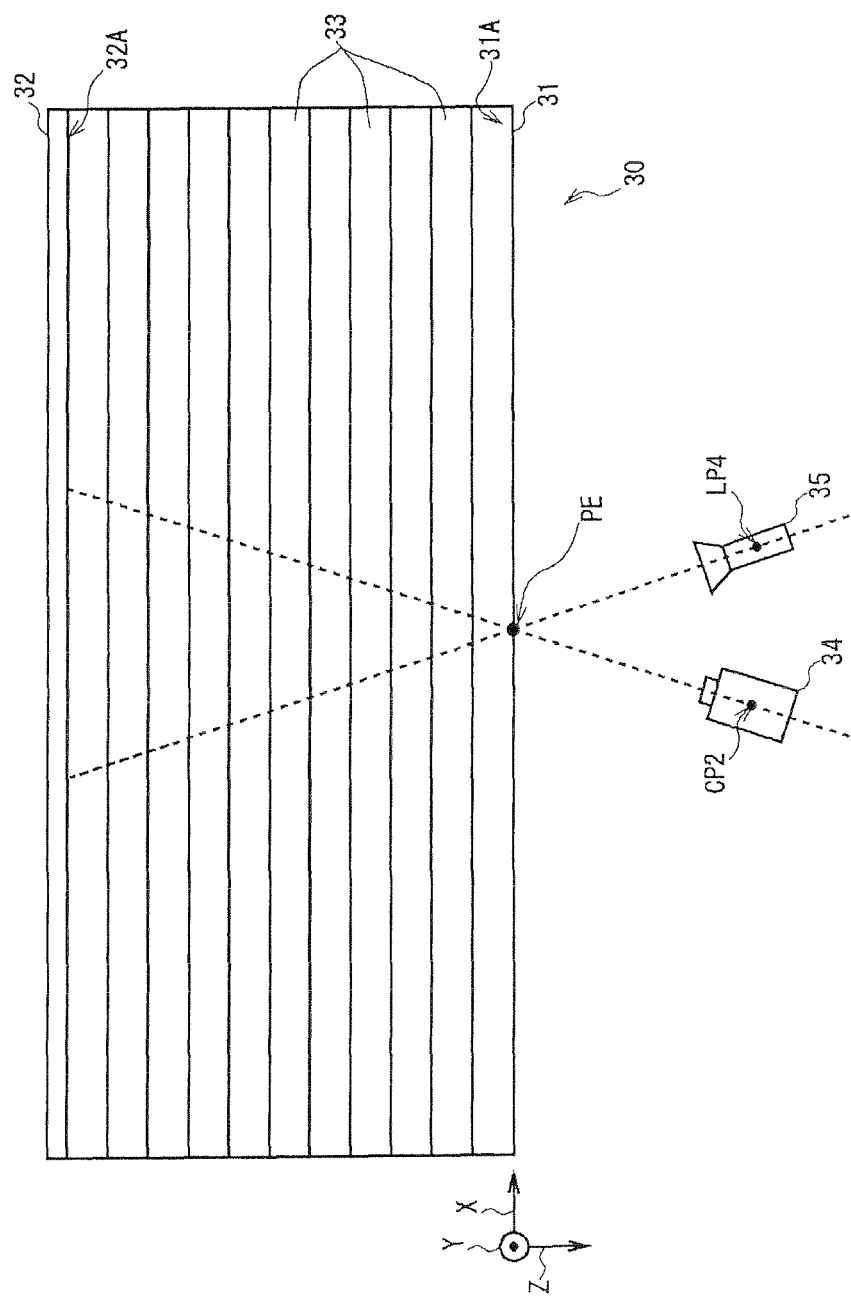
FIG. 10 is an approximate top view offering the description of a setting (1) of the positions and orientations of the camera and light when switching of the display of the home image is instructed by the slide operation in the left direction.

In this case, as shown in FIG. 10, the CPU 20 sets the position and orientation of the virtual camera 34 with respect to the three-dimensional background image 30 to the first left-side camera position CP2 and the first right back-side camera orientation, respectively.

The CPU 20 also sets the position and orientation of the virtual light 35 with respect to the three-dimensional background image 30 to the first right-side light position LP4 and the first left back light orientation, respectively.

Accordingly, the CPU 20 illuminates the three-dimensional background image 30 with the virtual light 35 obliquely from the right front side of the image by focusing on the first left-side portion.

In this state, the CPU 20 converts the first right-side portion of the three-dimensional background image 30 (that is, the first right-side portion of the bottom plate one surface 31A and the deep wall one surface 32A) into a two-dimensional background image by a perspective projection as if to photograph the first right-side portion by obliquely viewing from the left front side of the image using the virtual camera 34.

That is, the CPU 20 converts the first right-side portion of the three-dimensional background image 30 into a two-dimensional background image drawn and represented as if to view obliquely from the left front side of the image on a two-dimensional plane having the same image horizontal direction size and image vertical direction size as the image horizontal direction size and image vertical direction size of the display image.

Then, the CPU 20 combines background image data of the two-dimensional background image and the template image data to generate home image data and sends out the generated home image data to the display 13A via the display processing unit 27.

Figure 11:
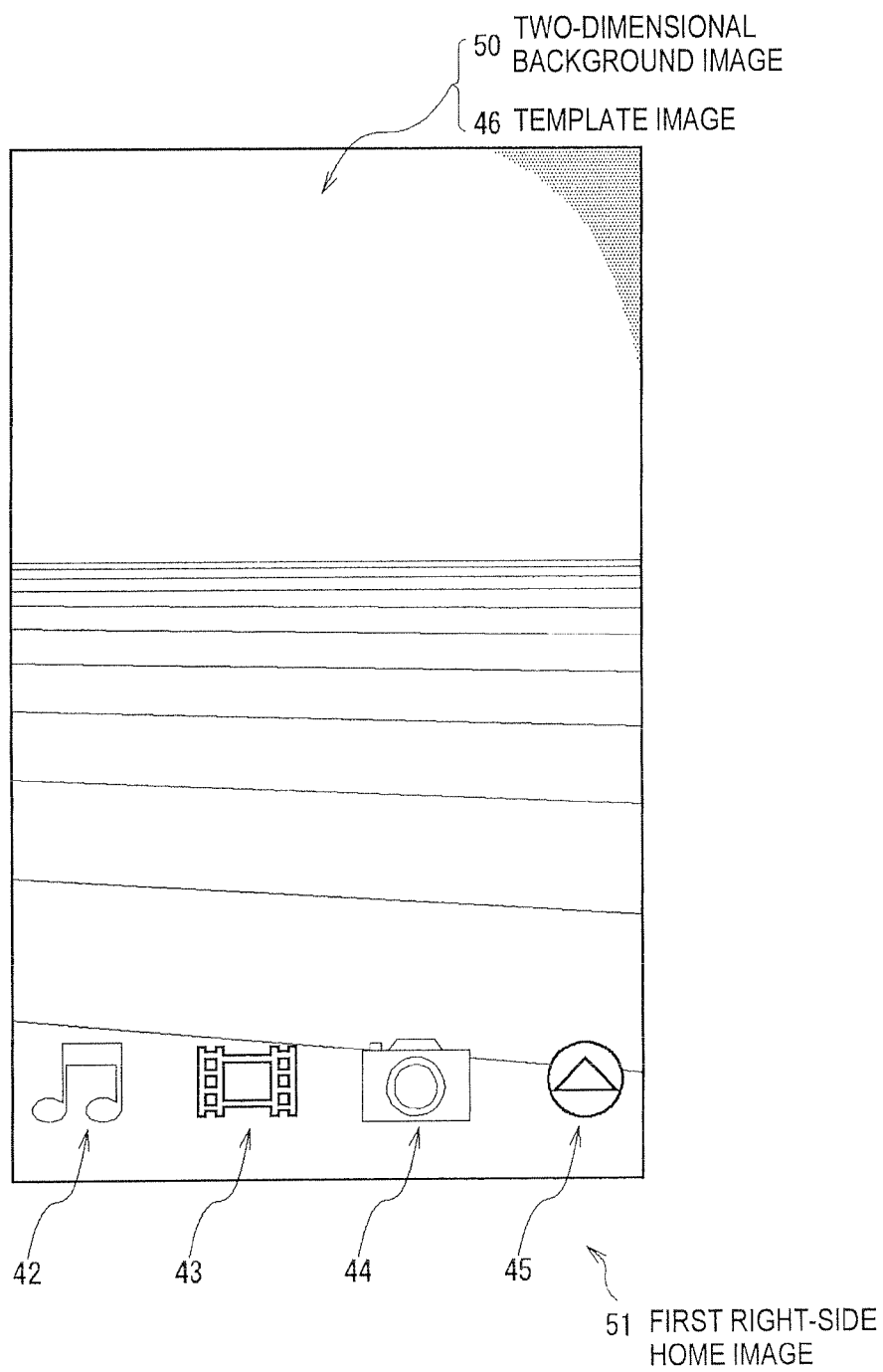
FIG. 11 is an approximate front view showing the configuration of a first right-side home image.

Accordingly, the CPU 20 displays a home image 51 having a two-dimensional background image 50 as shown in FIG. 11 in the display 13A based on the home image data, in place of the home image in which two-dimensional background images are displayed as an animation.

In this case, the two-dimensional background image 50 shows the first right-side portion of the three-dimensional background image 30 in a visible state in which the lower the position in the image, the wider the spacing between object edges seems to increase from the image left side to the image right side.

The two-dimensional background image 50 also shows the first right-side portion of the three-dimensional background image 30 in a visible state in which while the left side is bright as a whole, a small shadow appearing at an upper right corner is visible.

In the description that follows, the home image 51 having the two-dimensional background image 50 showing the first right-side portion of the three-dimensional background image 30 is particularly also called the first right-side home image 51.

In this manner, if switching of the display is instructed by the slide operation in the left direction while the center home image 41 is displayed in the display 13A, the CPU 20 switches the display to the first right-side home image 51.

If a slide operation in the left direction is performed on the surface of the touch panel 13B by the user while the first right-side home image 51 is displayed in the display 13A, the CPU 20 determines that display content of the first right-side home image 51 is requested to be changed.

In this case, the CPU 20 sequentially moves (rotates) the camera 34 horizontally in accordance with the amount of displacement of the touch position around the perpendicular PE while the camera optical axis being maintained at right angles to the perpendicular PE from the first left-side camera position CP2 in the image left direction up to immediately before the second left-side camera position CP3.

Also the CPU 20 sequentially moves (rotates) the light 35 horizontally in accordance with the amount of displacement of the touch position around the perpendicular PE while the light optical axis being maintained at right angles to the perpendicular PE from the first right-side light position LP4 in the image right direction up to immediately before the second right-side light position LP5.

Further, the CPU 20 sequentially converts the three-dimensional background image 30 into two-dimensional background images by a method similar to the above method while moving the camera 34 and the light 35 in the opposite directions (that is, separating from each other) in this manner to sequentially change the position and orientation.

Then, each time a two-dimensional background image is generated, the CPU 20 combines background image data of the two-dimensional background image and template image data to generate home image data and sends out the home image data to the display 13A via the display processing unit 27.

Accordingly, while the slide operation in the left direction is performed, the CPU 20 changes the two-dimensional background image inside the home image displayed in the display 13A by gradually changing the visible state of the three-dimensional background image 30 in response to the movement of a fingertip or the like caused by the slide operation.

That is, while the slide operation in the left direction is performed, the CPU 20 displays two-dimensional background images inside the home image as an animation that sequentially changes the visible state from the first right-side portion to the portion on the right side viewed obliquely while moving to the left front side of the three-dimensional background image 30.

Also in this case, when the slide operation in the left direction by the user ends, the CPU 20 determines whether switching of the display as described above is instructed.

If, as a result, the CPU 20 determines that switching of the display of the home image is not instructed, in place of the home image in which two-dimensional background images are displayed as an animation, the CPU 20 redisplays the first right-side home image 51 in the display 13A.

Figure 12:
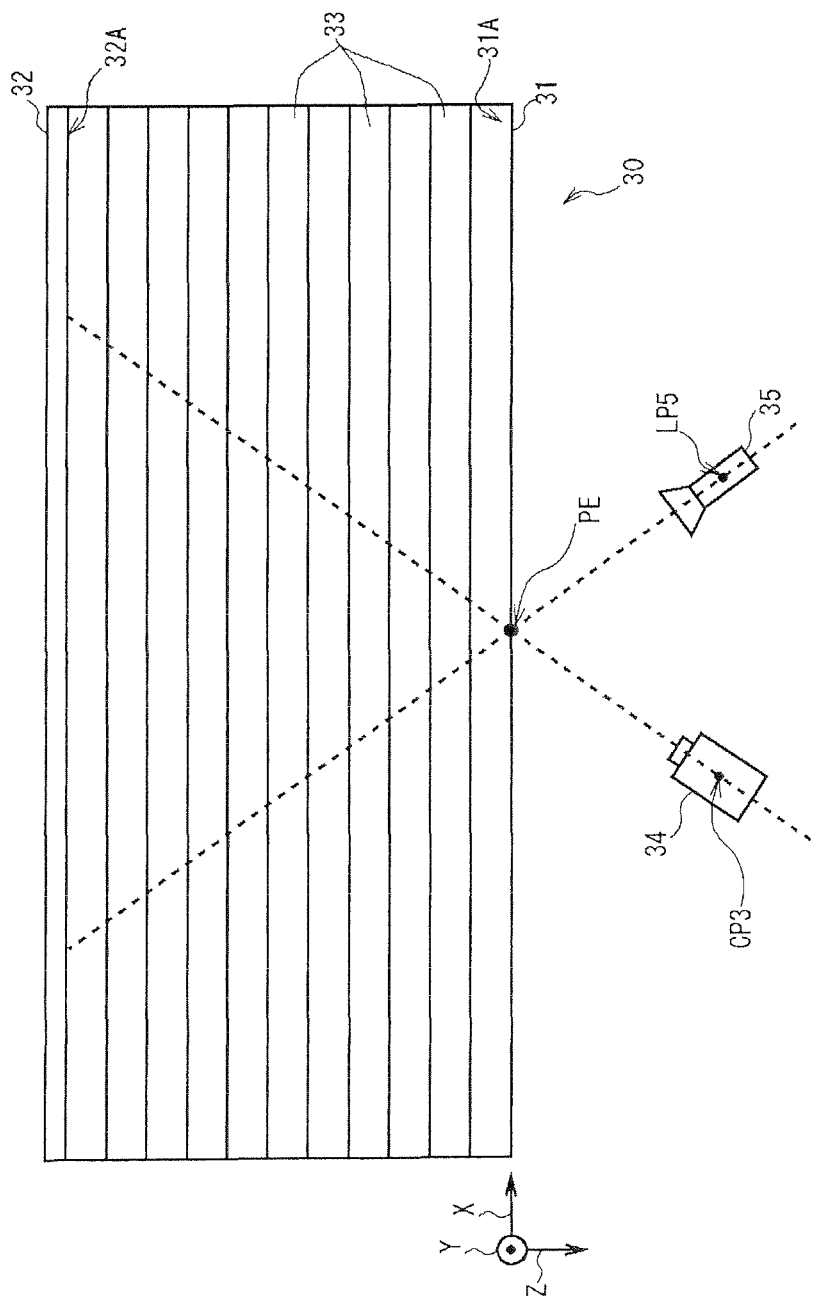
FIG. 12 is an approximate top view offering the description of a setting (2) of the positions and orientations of the camera and light when switching of the display of the home image is instructed by the slide operation in the left direction.

If, as shown in FIG. 12, the CPU 20 determines that switching of the display of the home image is instructed, by contrast, the CPU 20 sets the position and orientation of the virtual camera 34 with respect to the three-dimensional background image 30 to the second left-side camera position CP3 and the second right back-side camera orientation, respectively.

The CPU 20 also sets the position and orientation of the virtual light 35 with respect to the three-dimensional background image 30 to the second right-side light position LP5 and the second left back light orientation, respectively.

Accordingly, the CPU 20 illuminates the three-dimensional background image 30 with the virtual light 35 obliquely from the right front side of the image by focusing on the second left-side portion.

In this state, the CPU 20 converts the second right-side portion of the three-dimensional background image 30 (that is, the second right-side portion of the bottom plate one surface 31A and the deep wall one surface 32A) into a two-dimensional background image by a perspective projection as if to photograph the second right-side portion by obliquely viewing from the left front side of the image using the virtual camera 34.

That is, the CPU 20 converts the second right-side portion of the three-dimensional background image 30 into a two-dimensional background image drawn and represented as if to view obliquely from the left front side of the image on a two-dimensional plane having the same image horizontal direction size and image vertical direction size as the image horizontal direction size and image vertical direction size of the display image.

Then, the CPU 20 combines background image data of the two-dimensional background image and the template image data to generate home image data and sends out the generated home image data to the display 13A via the display processing unit 27.

Figure 13:
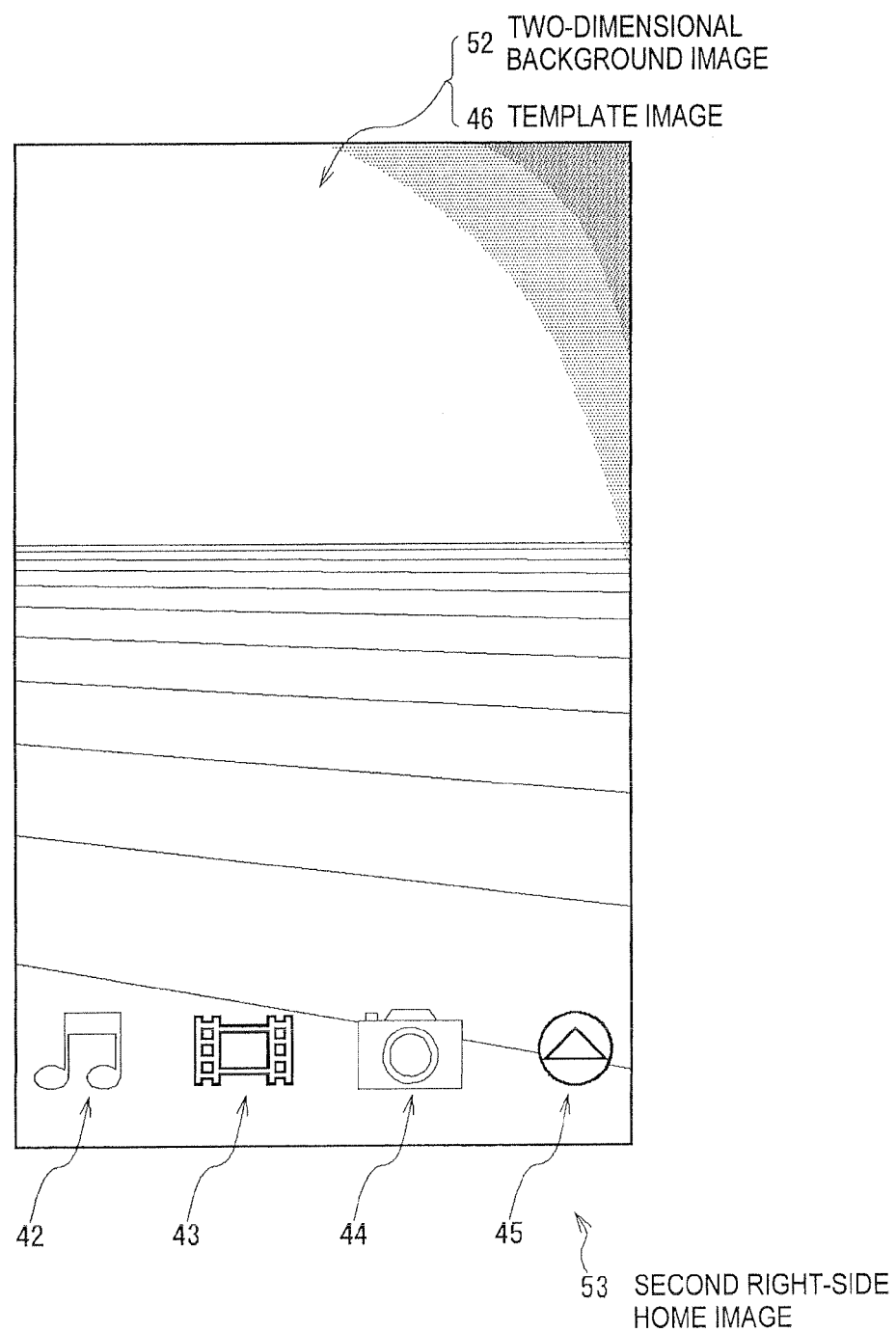
FIG. 13 is an approximate front view showing the configuration of a second right-side home image.

Accordingly, the CPU 20 displays a home image 53 having a two-dimensional background image 52 as shown in FIG. 13 in the display 13A based on the home image data, in place of the home image in which two-dimensional background images are displayed as an animation.

In this case, the two-dimensional background image 52 shows the second right-side portion of the three-dimensional background image 30 in a visible state in which, compared with the two-dimensional background image 50 inside the first right-side home image 51, the lower the position in the image, the wider the spacing between object edges seems to increase from the image left side to the image right side.

The two-dimensional background image 52 also shows the second right-side portion of the three-dimensional background image 30 in a visible state in which while the closer to the lower left corner, the brighter the image is, compared with the two-dimensional background image 50 inside the first right-side home image 51, a shadow appearing in a wider range at the upper right corner so dense that it is difficult to discriminate the original color is visible.

In the description that follows, the home image 53 having the two-dimensional background image 52 showing the second right-side portion of the three-dimensional background image 30 is particularly also called the second right-side home image 53.

In this manner, if switching of the display is instructed by the slide operation in the left direction while the first right-side home image 51 is displayed in the display 13A, the CPU 20 switches the display to the second right-side home image 53.

On the other hand, if, for example, a slide operation in the right direction is performed on the surface of the touch panel 13B by the user while the center home image 41 is displayed in the display 13A, the CPU 20 also determines that display content of the center home image 41 is requested to be changed.

In this case, however, in contrast to the case when a slide operation in the left direction is performed, the CPU 20 moves the virtual camera 34 in the image right direction and the virtual light 35 in the image left direction.

That is, the CPU 20 sequentially moves (rotates) the camera 34 horizontally in accordance with the amount of displacement of the touch position around the perpendicular PE while the camera optical axis being maintained at right angles to the perpendicular PE from the center camera position CP1 in the image right direction up to immediately before the first right-side camera position CP4.

Also, the CPU 20 sequentially moves (rotates) the light 35 horizontally in accordance with the amount of displacement of the touch position around the perpendicular PE while the light optical axis being maintained at right angles to the perpendicular PE from the center light position LP1 in the image left direction up to immediately before the first left-side light position LP2.

Further, the CPU 20 sequentially converts the three-dimensional background image 30 into two-dimensional background images by a method similar to the above method while moving the camera 34 and the light 35 in the opposite directions (that is, separating from each other) in this manner to sequentially change the position and orientation.

Further, each time a two-dimensional background image is generated, the CPU 20 combines background image data of the two-dimensional background image and template image data to generate home image data and sends out the home image data to the display 13A via the display processing unit 27.

Accordingly, while the slide operation in the right direction is performed, the CPU 20 changes the two-dimensional background image inside the home image displayed in the display 13A by gradually changing the visible state of the three-dimensional background image 30 in response to the movement of a fingertip or the like caused by the slide operation.

That is, while the slide operation in the right direction is performed, the CPU 20 displays two-dimensional background images inside the home image as an animation that sequentially changes the visible state from the center portion to the portion on the left side viewed obliquely while moving to the left front side of the three-dimensional background image 30.

Then, when the slide operation in the right direction by the user ends, also in this case, the CPU 20 determines whether switching of the display as described above is instructed.

If, as a result, the CPU 20 determines that switching of the display of the home image is not instructed, in place of the home image in which two-dimensional background images are displayed as an animation, the CPU 20 redisplays the center home image 41 in the display 13A.

Figure 14:
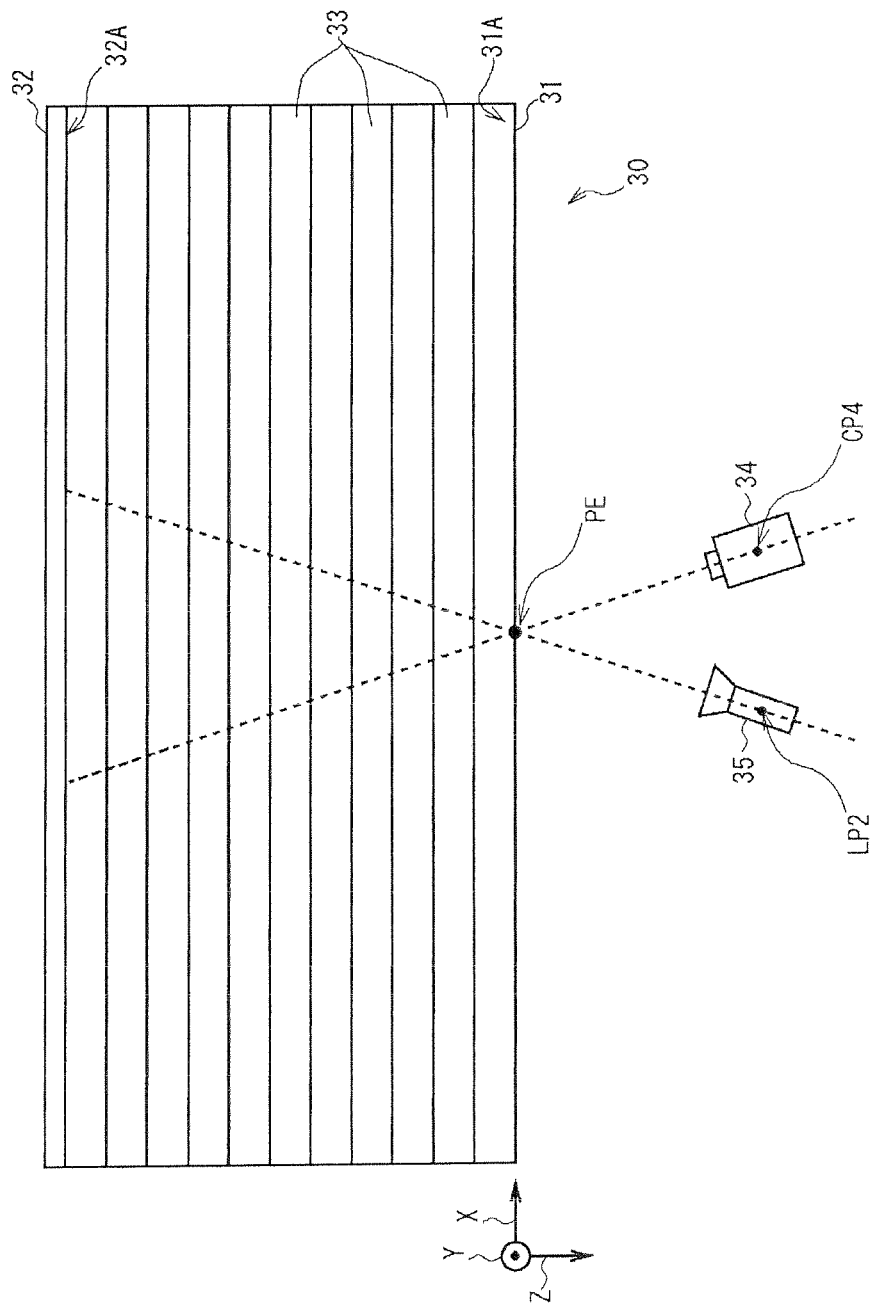
FIG. 14 is an approximate top view offering the description of a setting (1) of the positions and orientations of the camera and light when switching of the display of the home image is instructed by the slide operation in a right direction.

If, as shown in FIG. 14, the CPU 20 determines that switching of the display of the home image is instructed, by contrast, the CPU 20 sets the position and orientation of the virtual camera 34 with respect to the three-dimensional background image 30 to the first right-side camera position CP4 and the first left back-side camera orientation, respectively.

The CPU 20 also sets the position and orientation of the virtual light 35 with respect to the three-dimensional background image 30 to the first left-side light position LP2 and the first right back light orientation, respectively.

Accordingly, the CPU 20 illuminates the three-dimensional background image 30 with the virtual light 35 obliquely from the left front side of the image by focusing on the first right-side portion.

In this state, the CPU 20 converts the first left-side portion of the three-dimensional background image 30 (that is, the first left-side portion of the bottom plate one surface 31A and the deep wall one surface 32A) into a two-dimensional background image by a perspective projection as if to photograph the first left-side portion by obliquely viewing from the right front side of the image using the virtual camera 34.

That is, the CPU 20 converts the first left-side portion of the three-dimensional background image 30 into a two-dimensional background image drawn and represented as if to view obliquely from the right front side of the image on a two-dimensional plane having the same image horizontal direction size and image vertical direction size as the image horizontal direction size and image vertical direction size of the display image.

Then, the CPU 20 combines background image data of the two-dimensional background image and the template image data to generate home image data and sends out the generated home image data to the display 13A via the display processing unit 27.

Figure 15:
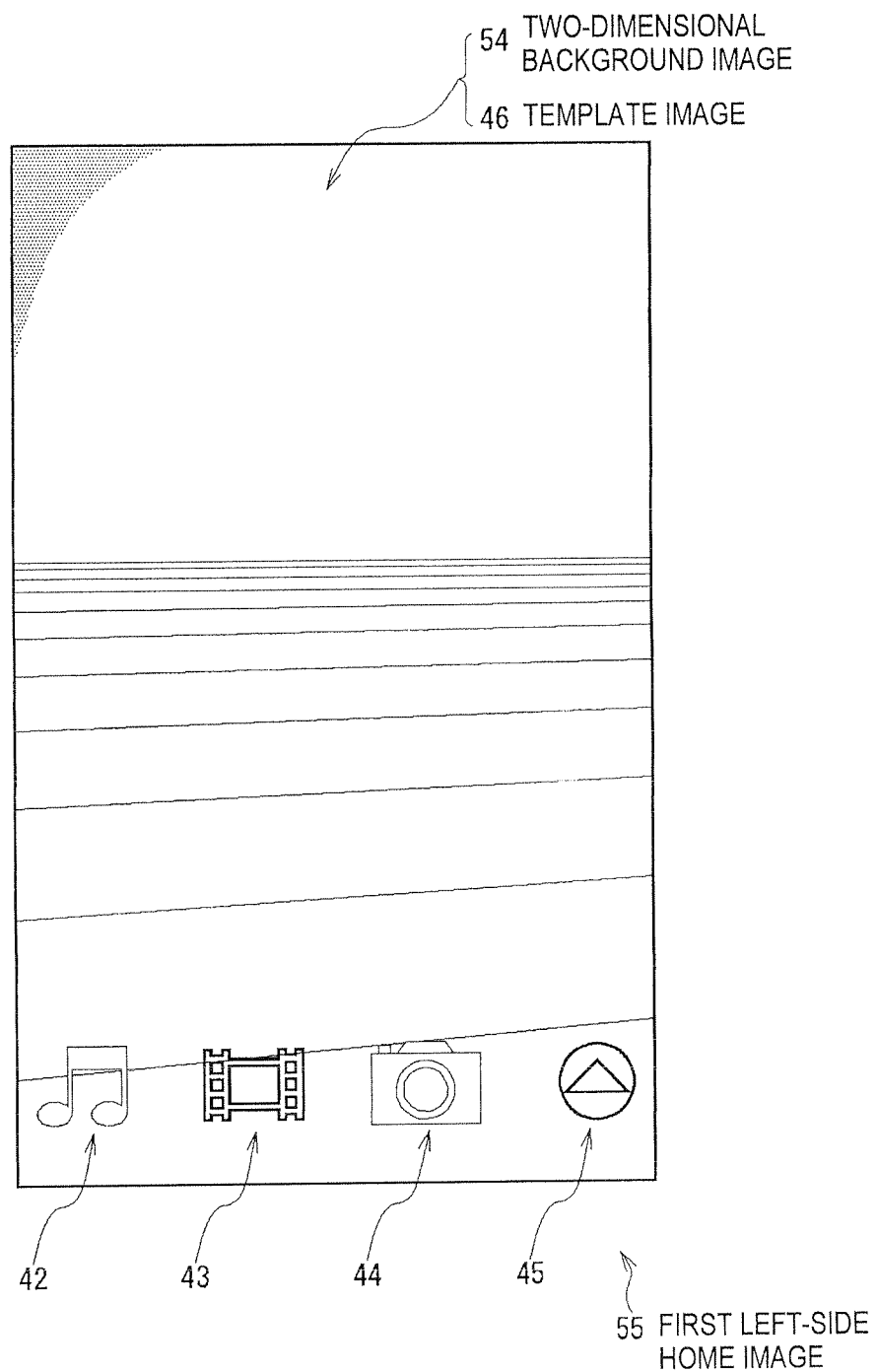
FIG. 15 is an approximate front view showing the configuration of a first left home image.

Accordingly, the CPU 20 displays a home image 55 having a two-dimensional background image 54 as shown in FIG. 15 in the display 13A based on the home image data, in place of the home image in which two-dimensional background images are displayed as an animation.

In this case, the two-dimensional background image 54 shows the first left-side portion of the three-dimensional background image 30 in a visible state in which the lower the position in the image, the wider the spacing between object edges seems to increase from the image right side to the image left side.

The two-dimensional background image 54 also shows the first left-side portion of the three-dimensional background image 30 in a visible state in which while the right side is bright as a whole, a small shadow appearing at an upper left corner is visible.

In the description that follows, the home image 55 having the two-dimensional background image 54 showing the first left-side portion of the three-dimensional background image 30 is particularly also called the first left-side home image 55.

In this manner, if switching of the display is instructed by the slide operation in the right direction while the center home image 41 is displayed in the display 13A, the CPU 20 switches the display to the first left-side home image 55.

If a slide operation in the right direction is performed on the surface of the touch panel 13B by the user while the first left-side home image 55 is displayed in the display 13A, the CPU 20 determines that display content of the first left-side home image 55 is requested to be changed.

In this case, the CPU 20 sequentially moves (rotates) the camera 34 horizontally in accordance with the amount of displacement of the touch position around the perpendicular PE while the camera optical axis being maintained at right angles to the perpendicular PE from the first right-side camera position CP4 in the image right direction up to immediately before the second right-side camera position CP5.

Also the CPU 20 sequentially moves (rotates) the light 35 horizontally in accordance with the amount of displacement of the touch position around the perpendicular PE while the light optical axis being maintained at right angles to the perpendicular PE from the first left-side light position LP2 in the image left direction up to immediately before the second left-side light position LP3.

Further, the CPU 20 sequentially converts the three-dimensional background image 30 into two-dimensional background images by a method similar to the above method while moving the camera 34 and the light 35 in the opposite directions (that is, separating from each other) in this manner to sequentially change the position and orientation.

Further, each time a two-dimensional background image is generated, the CPU 20 combines background image data of the two-dimensional background image and template image data to generate home image data and sends out the home image data to the display 13A via the display processing unit 27.

Accordingly, while the slide operation in the right direction is performed, the CPU 20 changes the two-dimensional background image inside the home image displayed in the display 13A by gradually changing the visible state of the three-dimensional background image 30 in response to the movement of a fingertip or the like caused by the slide operation.

That is, while the slide operation in the right direction is performed, the CPU 20 displays two-dimensional background images inside the home image as an animation that sequentially changes the visible state from the first left-side portion to the portion on the left side viewed obliquely while moving to the right front side of the three-dimensional background image 30.

Then, when the slide operation in the right direction by the user ends, also in this case, the CPU 20 determines whether switching of the display as described above is instructed.

If, as a result, the CPU 20 determines that switching of the display of the home image is not instructed, in place of the home image in which two-dimensional background images are displayed as an animation, the CPU 20 redisplays the first left-side home image 55 in the display 13A.

Figure 16:
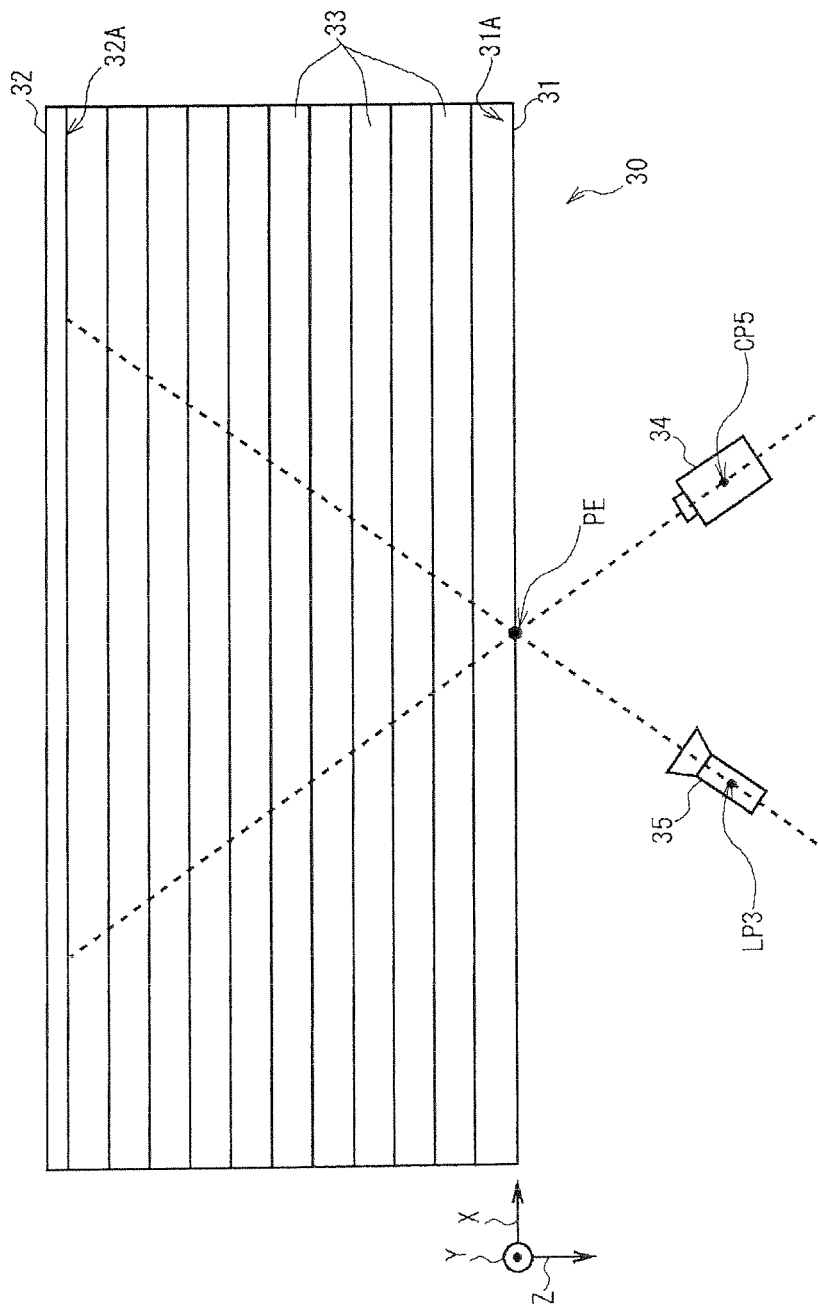
FIG. 16 is an approximate top view offering the description of a setting (2) of the positions and orientations of the camera and light when switching of the display of the home image is instructed by the slide operation in the right direction.

If, as shown in FIG. 16, the CPU 20 determines that switching of the display of the home image is instructed, by contrast, the CPU 20 sets the position and orientation of the virtual camera 34 with respect to the three-dimensional background image 30 to the second right-side camera position CP5 and the second left back-side camera orientation, respectively.

The CPU 20 also sets the position and orientation of the virtual light 35 with respect to the three-dimensional background image 30 to the second left-side light position LP3 and the second right back light orientation, respectively.

Accordingly, the CPU 20 illuminates the three-dimensional background image 30 with the virtual light 35 obliquely from the left front side of the image by focusing on the second right-side portion.

In this state, the CPU 20 converts the second left-side portion of the three-dimensional background image 30 (that is, the second left-side portion of the bottom plate one surface 31A and the deep wall one surface 32A) into a two-dimensional background image by a perspective projection as if to photograph the second left-side portion by obliquely viewing from the right front side of the image using the virtual camera 34.

That is, the CPU 20 converts the second left-side portion of the three-dimensional background image 30 into a two-dimensional background image drawn and represented as if to view obliquely from the right front side of the image on a two-dimensional plane having the same image horizontal direction size and image vertical direction size as the image horizontal direction size and image vertical direction size of the display image.

Then, the CPU 20 combines background image data of the two-dimensional background image and the template image data to generate home image data and sends out the generated home image data to the display 13A via the display processing unit 27.

Figure 17:
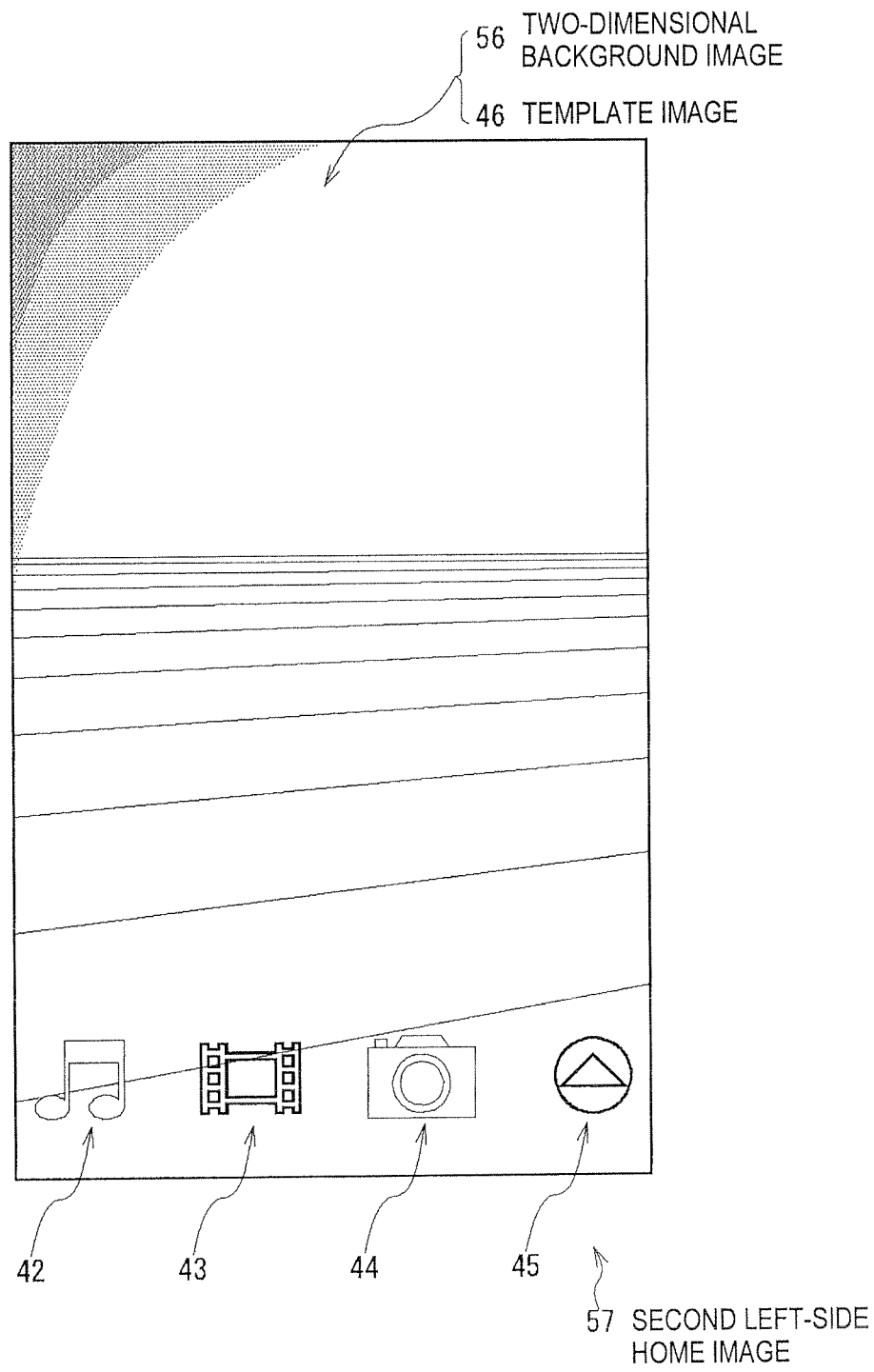
FIG. 17 is an approximate front view showing the configuration of a second left home image.

Accordingly, the CPU 20 displays a home image 57 having a two-dimensional background image 56 as shown in FIG. 17 in the display 13A based on the home image data, in place of the home image in which two-dimensional background images are displayed as an animation.

In this case, the two-dimensional background image 56 shows the second left-side portion of the three-dimensional background image 30 in a visible state in which, compared with the two-dimensional background image 54 inside the first left-side home image 55, the lower the position in the image, the wider the spacing between object edges seems to increase from the image right side to the image left side.

The two-dimensional background image 56 also shows the second left-side portion of the three-dimensional background image 30 in a visible state in which while the closer to the lower right corner, the brighter the image is, compared with the two-dimensional background image 54 inside the first right-side home image 55, a shadow appearing in a wider range at the upper left corner so dense that it is difficult to discriminate the original color is visible.

In the description that follows, the home image 57 having the two-dimensional background image 56 showing the second left-side portion of the three-dimensional background image 30 is particularly also called the second left-side home image 57.

In this manner, if switching of the display is instructed by the slide operation in the right direction while the first left-side home image 55 is displayed in the display 13A, the CPU 20 switches the display to the second left-side home image 57.

Incidentally, if a slide operation in the right direction is performed on the surface of the touch panel 13B by the user while the second right-side home image 53 is displayed in the display 13A, the CPU 20 determines that display content of the second right-side home image 53 is requested to be changed.

In this case, the CPU 20 sequentially moves (rotates) the camera 34 horizontally in accordance with the amount of displacement of the touch position around the perpendicular PE while the camera optical axis being maintained at right angles to the perpendicular PE from the second left-side camera position CP3 in the image right direction up to immediately before the first left-side camera position CP2.

Also the CPU 20 sequentially moves (rotates) the light 35 horizontally in accordance with the amount of displacement of the touch position around the perpendicular PE while the light optical axis being maintained at right angles to the perpendicular PE from the second right-side light position LP5 in the image left direction up to immediately before the first right-side light position LP4.

Further, the CPU 20 sequentially converts the three-dimensional background image 30 into two-dimensional background images by a method similar to the above method while moving the camera 34 and the light 35 in the opposite directions (that is, bringing closer to each other) in this manner to sequentially change the position and orientation.

Further, each time a two-dimensional background image is generated as described above, the CPU 20 generates home image data in the same manner as described above and sends out the home image data to the display 13A via the display processing unit 27.

Accordingly, while the slide operation in the right direction is performed, the CPU 20 changes the two-dimensional background image inside the home image displayed in the display 13A by gradually changing the visible state of the three-dimensional background image 30 in response to the movement of a fingertip or the like caused by the slide operation.

That is, while the slide operation in the right direction is performed, the CPU 20 displays two-dimensional background images inside the home image as an animation that sequentially changes the visible state from the second right-side portion to the portion on the left side viewed obliquely while moving to the right side of the three-dimensional background image 30.

Then, when the slide operation in the right direction by the user ends, also in this case, the CPU 20 determines whether switching of the display as described above is instructed.

If, as a result, the CPU 20 determines that switching of the display of the home image is not instructed, in place of the home image in which two-dimensional background images are displayed as an animation, the CPU 20 redisplays the second right-side home image 53 in the display 13A.

If the CPU 20 determines that switching of the display of the home image is instructed, by contrast, the CPU 20 sets the positions and orientations of the virtual camera 34 and the light 35 in the same manner as described with reference to FIG. 10 to generate the two-dimensional background image 50.

Accordingly, the CPU 20 generates home image data of the first right-side home image 51 having the two-dimensional background image 50 and sends out the home image data to the display 13A via the display processing unit 27.

Accordingly, the CPU 20 displays the first right-side home image 51 having the two-dimensional background image 50 in the display 13A based on the home image data, in place of the home image in which two-dimensional background images are displayed as an animation.

In this manner, if switching of the display is instructed by the slide operation in the right direction while the second right-side home image 53 is displayed in the display 13A, the CPU 20 switches the display to the first right-side home image 51.

Also if a slide operation in the right direction is performed on the surface of the touch panel 13B by the user while the first right-side home image 51 is displayed in the display 13A, the CPU 20 similarly moves the virtual camera 34 and the virtual light 35 to bring both closer to each other.

That is, the CPU 20 sequentially moves (rotates) the camera 34 horizontally in accordance with the amount of displacement of the touch position around the perpendicular PE while the camera optical axis being maintained at right angles to the perpendicular PE from the first left-side camera position CP2 in the image right direction up to immediately before the center camera position LP1.

Also, the CPU 20 sequentially moves (rotates) the light 35 horizontally in accordance with the amount of displacement of the touch position around the perpendicular PE while the light optical axis being maintained at right angles to the perpendicular PE from the first right-side light position LP4 in the image left direction up to immediately before the center light position LP1.

Then, the CPU 20 sequentially converts the two-dimensional background image inside the home image displayed in the display 13A by a method similar to the above method while sequentially changing the positions and orientations of the camera 34 and the light 35 as described above.

In this manner, while the slide operation in the right direction is performed, the CPU 20 displays two-dimensional background images inside the home image as an animation that sequentially changes the visible state from the first right-side portion to the portion on the left side viewed obliquely while moving to the right side of the three-dimensional background image 30.

Then, when the slide operation in the right direction ends, also in this case, the CPU 20 determines whether switching of the display is instructed.

Then, in accordance with the determination result, the CPU 20 appropriately switches the display of the first right-side home image 51 in the display 13A to the display of the center home image 41.

Further, if a slide operation in the left direction is performed while the second left-side home image 57 or the first left-side home image 55 is displayed in the display 13A, the CPU 20 moves the virtual camera 34 and the virtual light 35 to bring both closer to each other in the same manner as described above.

Then, the CPU 20 sequentially converts the two-dimensional background image inside the home image displayed in the display 13A by a method similar to the above method while sequentially changing the positions and orientations of the camera 34 and the light 35 as described above.

Subsequently, when the slide operation in the left direction ends, the CPU 20 determines whether switching of the display as described above is instructed.

Then, in accordance with the determination result, the CPU 20 appropriately switches the display of the second left-side home image 57 or the first left-side home image 55 to the display of the first right-side home image 51 or the center home image 41 in the display 13A.

Figure 18:
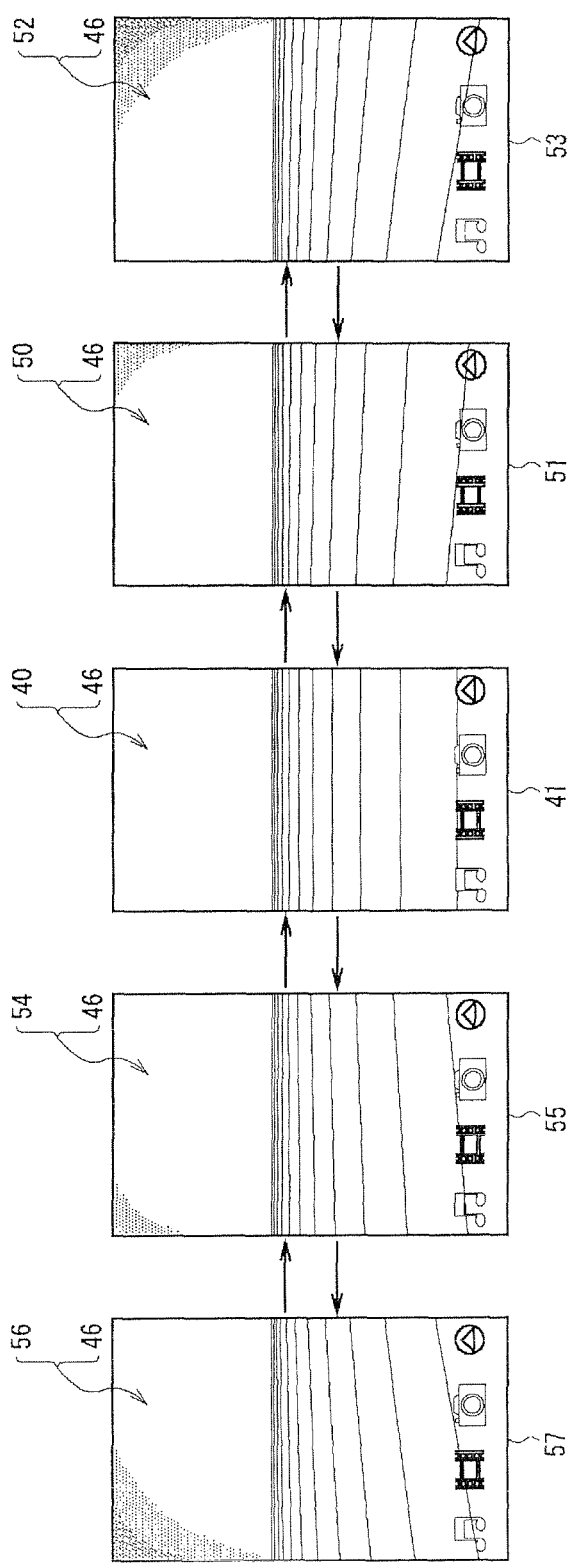
FIG. 18 is an approximate front view offering the description of switching of the display of the home image.

In this manner, as shown in FIG. 18, the CPU 20 switches the display of the home image in the display 13A to the display of another home image in accordance with instructions of display switching of a slide operation by the user.

Then, if the display of the center home image 41 is switched to the display of the first right-side home image 51, the CPU 20 can cause the user to recognize that spacing between object edges is slightly wider on the right side in the two-dimensional background image 50 inside the first right-side home image 51.

The CPU 20 can also cause the user to recognize that a portion at the upper right corner that may not be reached by illumination light is relatively narrow in the two-dimensional background image 50 inside the first right-side home image 51.

Thus, the CPU 20 can also cause the user to recognize that based on such a visible state of the two-dimensional background image 50 inside the first right-side home image 51, the second right-side portion that can be drawn still exists on the right side of the three-dimensional background image 30.

Accordingly, if the first right-side home image 51 is displayed, the CPU 20 can also cause the user to recognize that based on the visible state of the two-dimensional background image 50, the second right-side home image 53 having the two-dimensional background image 52 that shows the second right-side portion of the three-dimensional background image 30 further switchably exists.

That is, if the first right-side home image 51 is displayed, the CPU 20 can cause the user to easily recognize that based on the visible state of the two-dimensional background image 50, the display of the first right-side home image 51 is switchable if switching of the display is instructed by performing a slide operation in the left direction.

In addition, the CPU 20 can cause the user to recognize that spacing between object edges is narrower on the left side of the two-dimensional background image 50 inside the first right-side home image 51.

Also, the CPU 20 can cause the user to recognize that the left side of the two-dimensional background image 50 inside the first right-side borne image 51 as a whole is brightly illuminated.

Thus, the CPU 20 can also cause the user to recognize that based on such a visible state of the two-dimensional background image 50 inside the first right-side home image 51, the center portion that can be drawn still exists on the left side of the first right-side portion of the three-dimensional background image 30.

Accordingly, if the display of the second right-side home image 53 is switched to the display of the first right-side home image 51, the CPU 20 can cause the user to recognize that based on the visible state of the two-dimensional background image 50, the center home image 41 having the two-dimensional background image 40 that shows the center portion of the three-dimensional background image 30 further switchably exists if switching of the display is instructed by performing a slide operation in the right direction.

That is, if the display of the second right-side home image 53 is switched to the display of the first right-side home image 51, the CPU 20 can cause the user to easily recognize that based on the visible state of the two-dimensional background image 50, the display of the second right-side home image 53 is switchable if switching of the display is instructed by performing a slide operation in the right direction.

On the other hand, if the display of the first right-side home image 51 is switched to the display of the second right-side home image 53, the CPU 20 can cause the user to recognize that spacing between object edges considerably increases on the right side in the two-dimensional background image 52 inside the second right-side home image 53.

The CPU 20 can also cause the user to recognize that a portion at the upper right corner that may not be reached by illumination light is relatively wide in the two-dimensional background image 52 inside the second right-side home image 53.

Thus, the CPU 20 can cause the user to recognize that based on such a visible state of the two-dimensional background image 52 inside the second right-side home image 53, no portion that can be drawn exists on the right side of the three-dimensional background image 30.

Accordingly, if the second right-side home image 53 is displayed, the CPU 20 can cause the user to recognize that based on the visible state of the two-dimensional background image 52, no home image that can further be switched to exists even if switching of the display is instructed by performing a slide operation in the left direction.

That is, if the second right-side home image 53 is displayed, the CPU 20 can cause the user to easily recognize that based on the visible state of the two-dimensional background image 52, the display of the second right-side home image 53 is not switchable.

In addition, the CPU 20 can cause the user to recognize that spacing between object edges is narrower on the left side of the two-dimensional background image 52 inside the second right-side home image 53.

Also, the CPU 20 can cause the user to recognize that the left side of the two-dimensional background image 52 inside the second right-side home image 53 as a whole is relatively brightly illuminated.

Thus, the CPU 20 can also cause the user to recognize that based on such a visible state of the two-dimensional background image 52 inside the second right-side home image 53, the first right-side portion that can be drawn still exists on the left side of the second right-side portion of the three-dimensional background image 30.

Then, if the display of the first right-side home image 51 is switched to the display of the second right-side home image 53 in accordance with a slide operation in the left direction by a user, the CPU 20 can cause the user to easily recognize that the display of the second right-side home image 53 can be brought back to the previous display state, the first right-side home image 51, without having to check the visible state of the two-dimensional background image 52.

However, for another user who first views the state in which the second right-side home image 53 is already displayed, the CPU 20 can cause the user to recognize that based on the visible state of the two-dimensional background image 52, the first right-side home image 51 having the two-dimensional background image 50 that shows the first right-side portion of the three-dimensional background image 30 further switchably exists if switching of the display is instructed by performing a slide operation in the right direction.

That is, for another user who first views the state in which the second right-side home image 53 is already displayed, the CPU 20 can cause the user to easily recognize that based on the visible state of the two-dimensional background image 52, the display of the second right-side home image 53 is switchable.

If the display of the center home image 41 is switched to the display of the first left-side home image 55, the CPU 20 can cause the user to recognize that spacing between object edges is slightly wider on the left side in the two-dimensional background image 54 inside the first left-side home image 55.

The CPU 20 can also cause the user to recognize that a portion at the upper left corner that may not be reached by illumination light is relatively narrow in the two-dimensional background image 54 inside the first left-side home image 55.

Thus, the CPU 20 can also cause the user to recognize that based on such a visible state of the two-dimensional background image 54 inside the first left-side home image 55, the second left-side portion that can be drawn still exists on the left side of the three-dimensional background image 30.

Accordingly, if the first left-side home image 55 is displayed, the CPU 20 can also cause the user to recognize that based on the visible state of the two-dimensional background image 54, the second left-side home image 57 having the two-dimensional background image 56 that shows the second left-side portion of the three-dimensional background image 30 further switchably exists.

That is, if the first left-side home image 55 is displayed, the CPU 20 can cause the user to easily recognize that based on the visible state of the two-dimensional background image 54, the display of the first left-side home image 55 is switchable if switching of the display is instructed by performing a slide operation in the right direction.

In addition, the CPU 20 can cause the user to recognize that spacing between object edges is narrower on the right side of the two-dimensional background image 54 inside the first left-side home image 55.

Also, the CPU 20 can cause the user to recognize that the right side of the two-dimensional background image 54 inside the first left-side home image 55 as a whole is brightly illuminated.

Thus, the CPU 20 can cause the user to recognize that based on such a visible state of the two-dimensional background image 54 inside the first left-side home image 55, the center portion that can be drawn still exists on the right side of the first left-side portion of the three-dimensional background image 30.

Accordingly, if the display of the second left-side home image 57 is switched to the display of the first left-side home image 55, the CPU 20 can cause the user to recognize that based on the visible state of the two-dimensional background image 54, the center home image 41 having the two-dimensional background image 40 that shows the center portion of the three-dimensional background image 30 further switchably exists if switching of the display is instructed by performing a slide operation in the left direction.

That is, if the display of the second left-side home image 57 is switched to the display of the first left-side home image 55, the CPU 20 can cause the user to easily recognize that based on the visible state of the two-dimensional background image 54, the display of the second left-side home image 57 is switchable if switching of the display is instructed by performing a slide operation in the left direction.

On the other hand, if the display of the first left-side home image 55 is switched to the display of the second left-side home image 57, the CPU 20 can cause the user to recognize that spacing between object edges considerably increases on the left side in the two-dimensional background image 56 inside the second left-side home image 57.

The CPU 20 can also cause the user to recognize that a portion at the upper left corner that may not be reached by illumination light is relatively wide in the two-dimensional background image 56 inside the second left-side home image 57.

Thus, the CPU 20 can cause the user to recognize that based on such a visible state of the two-dimensional background image 56 inside the second left-side home image 57, no portion that can be drawn exists on the left side of the three-dimensional background image 30.

Accordingly, if the second left-side home image 57 is displayed, the CPU 20 can cause the user to recognize that based on the visible state of the two-dimensional background image 56, no home image that can further be switched to exists even if switching of the display is instructed by performing a slide operation in the right direction.

That is, if the second left-side home image 57 is displayed, the CPU 20 can cause the user to easily recognize that based on the visible state of the two-dimensional background image 56, the display of the second left-side home image 57 is not switchable even if switching of the display is instructed by performing a slide operation in the right direction.

In addition, the CPU 20 can cause the user to recognize that spacing between object edges is narrower on the right side of the two-dimensional background image 56 inside the second left-side home image 57.

Also, the CPU 20 can cause the user to recognize that the right side of the two-dimensional background image 56 inside the second left-side home image 57 as a whole is relatively brightly illuminated.

Thus, the CPU 20 can cause the user to recognize that based on such a visible state of the two-dimensional background image 56 inside the second left-side home image 57, the first left-side portion that can be drawn still exists on the right side of the second left-side portion of the three-dimensional background image 30.

Then, if the display of the first left-side home image 55 is switched to the display of the second left-side home image 57 in accordance with a slide operation in the left direction by a user, the CPU 20 can cause the user to easily recognize that the display of the second left-side home image 57 can be brought back to the previous display state, the first left-side home image 55, without having to check the visible state of the two-dimensional background image 56.

However, for another user who first views the state in which, for example, the second left-side home image 57 is already displayed, the CPU 20 can cause the user to recognize that based on the visible state of the two-dimensional background image 56, the first left-side home image 55 having the two-dimensional background image 54 that shows the first left-side portion of the three-dimensional background image 30 further switchably exists if switching of the display is instructed by performing a slide operation in the left direction.

That is, for another user who first views the state in which the second left-side home image 57 is already displayed, the CPU 20 can cause the user to easily recognize that based on the visible state of the two-dimensional background image 56, the display of the second left-side home image 57 is switchable if switching of the display is instructed by performing a slide operation in the right direction.

Incidentally, the above menu images are provided with an icon (hereinafter, referred to also as a home icon) to select for switching of the display to the home image. Other display images than the menu image may be provided with the home icon.

Thus, when a menu image or another display image is displayed in the display 13A, the CPU 20 can cause the user to instruct switching of the display to the home image by causing the user to select the home icon on the menu image or the other display image via the touch panel 13B.

Regardless of whether the home icon is provided in the menu image or the other display image displayed in the display 13A, the CPU 20 can also cause the user to instruct switching of the display to the home image in accordance with an operation of the specific operation button 14.

Then, if switching of the display to the home image is instructed, the CPU 20 switches the display of the menu image or the other display image in the display 13A to the center home image 41.

If the display in the display 13A is switched to the center home image 41, the CPU 20 can cause the user to recognize that individual object edges are parallel to the image horizontal direction in the two-dimensional background image 40 inside the center home image 41.

Also, the CPU 20 can cause the user to recognize that the whole two-dimensional background image 40 inside the center home image 41 is approximately uniformly and brightly illuminated.

Thus, based on such a visible state of the two-dimensional background image 40, the CPU 20 can cause the user to recognize that the first right-side portion that can be drawn still exists on the right side of the three-dimensional background image 30 and the first left-side portion that can be drawn still exists on the left side thereof.

Accordingly, if the center home image 41 is displayed, the CPU 20 can cause the user to recognize that based on the visible state of the two-dimensional background image 40, the first right-side home image 51 having the two-dimensional background image 50 that shows the first right-side portion of the three-dimensional background image 30 further switchably exists if switching of the display is instructed by performing a slide operation in the left direction.

That is, if the center home image 41 is displayed, the CPU 20 can cause the user to easily recognize that based on the visible state of the two-dimensional background image 40, the display of the center home image 41 is switchable if switching of the display is instructed by performing a slide operation in the left direction.

Also, if the center home image 41 is displayed, the CPU 20 can cause the user to recognize that based on the visible state of the two-dimensional background image 40, the first left-side home image 55 having the two-dimensional background image 54 that shows the first left-side portion of the three-dimensional background image 30 further switchably exists if switching of the display is instructed by performing a slide operation in the right direction.

That is, if the center home image 41 is displayed, the CPU 20 can cause the user to easily recognize that based on the visible state of the two-dimensional background image 40, the display of the center home image 41 is switchable if switching of the display is instructed by performing a slide operation in the right direction.

Incidentally, the CPU 20 has only the template image 46 having, for example, the above four icons 42 to 45 superimposed on a two-dimensional background image in the home image in the initial state.

However, the CPU 20 can additionally arrange various icons arranged in menu images or other display images inside the home image in accordance with the user's operation.

Figure 19:
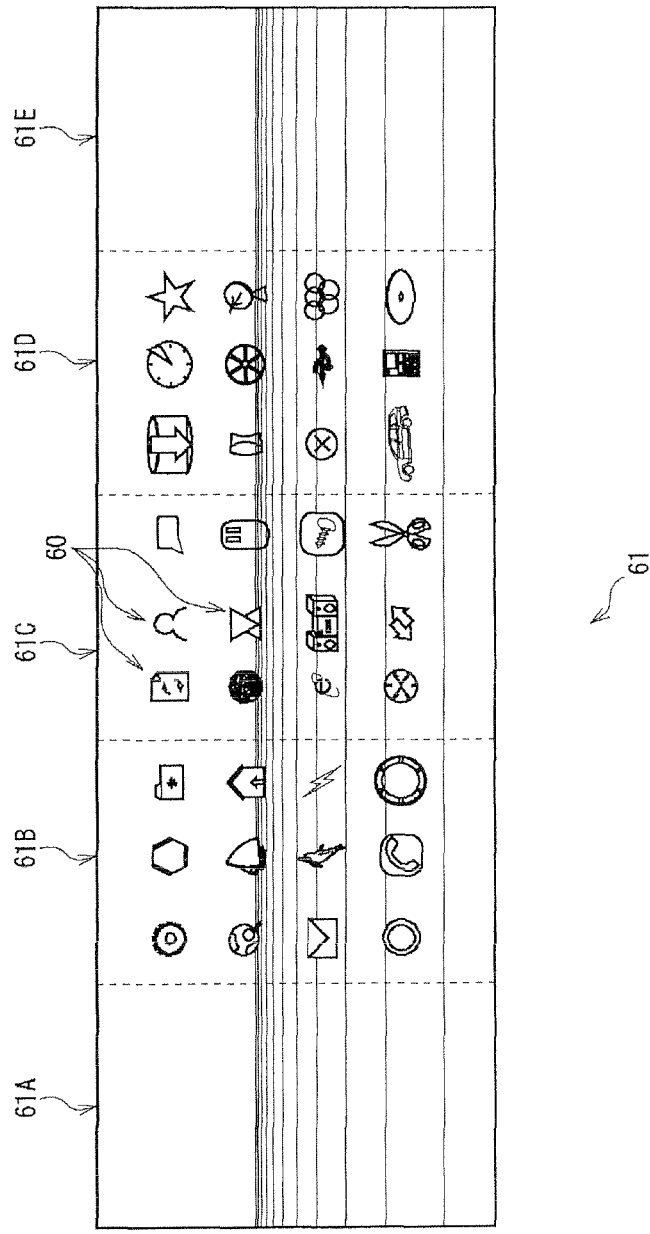
FIG. 19 is an approximate front view showing the configuration of a foreground image for offering additional icons.

If, as shown in FIG. 19, icons (hereinafter, referred to also as additional icons) 60 to be additionally arranged on the home image are selected, the CPU 20 actually generates a foreground image 61 to present the additional icons 60.

In this case, the CPU 20 generates a three-dimensional foreground image as a three-dimensional space image by arranging the additional icons 60 as two-dimensional objects or three-dimensional objects in a three-dimensional virtual space represented by a three-dimensional space coordinate system on a virtual plane parallel to the XY plane in a matrix shape.

The CPU 20 sets the positions and orientations of the virtual camera and light with respect to the three-dimensional foreground image to such positions and orientations that a plurality of additional icons 60 is photographed by uniformly being illuminated from the front side of the image.

Then, the CPU 20 converts the plurality of additional icons 60 inside the three-dimensional foreground image into the foreground image 61 as a two-dimensional plane image by a perspective projection as if to look squarely at the additional icons 60 to photograph from the front side of the image by using a virtual camera.

The size of the foreground image 61 in the image vertical direction is chosen to be equal to the size of the home image in the image vertical direction. Also, the size of the foreground image 61 in the image horizontal direction is chosen to be equal to five times the size of the home image in the image horizontal direction in accordance with the number of the above home images.

Then, the CPU 20 sequentially allocates regions 61A to 61E having the width equal to the length of one home image in the image horizontal direction along the image horizontal direction from the left side of the foreground image 61 as additional structural elements.

Actually, the CPU 20 allocates the first (that is, the leftmost) region (hereinafter, referred to also as a second left-side region) 61A from the left side of the foreground image 61 as an additional structural element to the second left-side home image 57.

The CPU 20 also allocates the second region (hereinafter, referred to also as a first left-side region) 61B from the left side of the foreground image 61 as an additional structural element to the first left-side home image 55.

Further, the CPU 20 allocates the third (that is, the center) region (hereinafter, referred to also as a center region) 61C from the left side of the foreground image 61 as an additional structural element to the center home image 41.

Further, the CPU 20 allocates the fourth region (hereinafter, referred to also as a first right-side region) 61D from the left side of the foreground image 61 as an additional structural element to the first right-side image 51.

Further, the CPU 20 allocates the fifth (that is, the rightmost) region (hereinafter, referred to also as a second right-side region) 61E from the left side of the foreground image 61 as an additional structural element to the second right-side image 53.

In the description that follows, if it is not necessary to distinguish the second left-side region 61A, the first left-side region 61B, the center region 61C, the first right-side region 61D, and the second right-side region 61E, these regions are simply called regions.

Incidentally, if the additional icon 60 is selected by the user, the CPU 20 preferentially arranges the additional icon 60 in a center region corresponding to the center region 61C of the foreground image 61 in the three-dimensional space image.

If the plurality of additional icons 60 is briefly arranged in the center region of the three-dimensional space image, the CPU 20 subsequently arranges the selected additional icon 60 approximately uniformly to the left and right from the center region as if the expand the arrangement portion.

In this manner, each time the additional icon 60 is selected by the user, the CPU 20 arranges the additional icon 60 in the three-dimensional space image to re-convert the foreground image 61 as a two-dimensional plane image to update the foreground image 61.

Thus, depending on the selection conditions of the additional icons 60 to be added onto the home image, the foreground image 61 may have a region in which no additional icon 60 is arranged or the numbers of the additional icons 60 arranged may be different between regions.

If, for example, the center home image 41 is displayed in the display 13A while the foreground image 61 is generated, though not illustrated, the CPU 20 sequentially superimposes the center region 61A of the foreground image 61 and the above template image 46 on the two-dimensional background image 40.

If, for example, the first right-side home image 51 is displayed in the display 13A, though not illustrated, the CPU 20 sequentially superimposes the first right-side region 61D of the foreground image 61 and the above template image 46 on the two-dimensional background image 50.

Further, if, for example, the second right-side home image 53 is displayed in the display 13A, though not illustrated, the CPU 20 sequentially superimposes the second right-side region 61E of the foreground image 61 and the above template image 46 on the two-dimensional background image 52.

Also, if, for example, the first left-side home image 55 is displayed in the display 13A, though not illustrated, the CPU 20 sequentially superimposes the first left-side region 61B of the foreground image 61 and the above template image 46 on the two-dimensional background image 54.

Also, if for example, the second left-side home image 57 is displayed in the display 13A, though not illustrated, the CPU 20 sequentially superimposes the second left-side region 61A of the foreground image 61 and the above template image 46 on the two-dimensional background image 56.

Accordingly, when the home image is displayed in the display 13A, the CPU 20 can present the additional icons 60 in the region of the foreground image 61 as selectable icons also on the home image.

Then, if the additional icon 60 is selected by the user via a tap operation while the home image having the additional icons 60 in the display 13A, the CPU 20 realizes the function corresponding to the selected additional icon 60.

Incidentally, the foreground image 61 is generated in such a way that the two-dimensional background image inside the home image is transmitted in portions other than an arrangement portion of the additional icons 60.

Thus, when the home image having the additional icons 60 is displayed in the display 13A, the CPU 20 can also cause the user to recognize whether any home image to which the display is switchable still exists based on, as described above, the visible state of a two-dimensional background image.

If, for example, two-dimensional background images are displayed as an animation as described above in accordance with a slide operation in the left direction while the center home image 41 is displayed, the CPU 20 sequentially cuts out a region to the right from the center from the foreground image 61.

That is, in this case, the CPU 20 sequentially cuts out a region positioned to the right from the center and having a length equal to the length in the image horizontal direction of the home image from the foreground image 61 and superimposes the region on a two-dimensional background image displayed in an animation.

Accordingly, when two-dimensional background images inside the home image are displayed as an animation, the CPU 20 can gradually change the additional icons 60 be to presented by scrolling the region to be displayed of the foreground image 61 to the right.

Further, if, for example, two-dimensional background images are displayed as an animation as described above in accordance with a slide operation in the right direction while the center home image 41 is displayed, the CPU 20 sequentially cuts out a region to the left from the center from the foreground image 61.

That is, in this case, the CPU 20 sequentially cuts out a region positioned to the left from the center and having a length equal to the length in the image horizontal direction of the home image from the foreground image 61 and superimposes the region on a two-dimensional background image displayed in an animation.

Accordingly, when two-dimensional background images inside the home image are displayed as an animation, the CPU 20 can gradually change the additional icons 60 be to presented by scrolling the region to be displayed of the foreground image 61 to the left.

Then, if a slide operation in the left direction or the right direction is performed while another home image is displayed, the CPU 20 can gradually change the additional icons 60 be to presented by similarly scrolling the region to be displayed of the foreground image 61.

In this manner, when two-dimensional background images inside the home image are displayed as an animation, the CPU 20 can notify the user of a portion of the additional icons 60 that can be presented after the display of the home image being switched by gradually changing the additional icons 60 to be presented.

Incidentally, if one of the icons 42 to 45, 60 is selected by the user on the home image displayed in the display 13A via the touch panel 13B, the CPU 20 displays a menu image or another display image having a plurality of icons showing selectable functions and information together with a two-dimensional background image.

If an icon is selected by the user on the menu image or the other display image displayed in the display 13A via the touch panel 13B, the CPU 20 displays still another display image having a plurality of icons showing selectable functions and information together with a two-dimensional background image.

Thus, by sequentially switching and displaying (that is, by effecting the transition of display) the menu image or other display images from the home image as a starting point of transition, the CPU 20 can cause the user to sequentially narrow down and select various functions and information associated hierarchically.

That is, the CPU 20 sets the home image serving as the starting point of transition as a display image to present, among various functions and information associated hierarchically, functions positioned at the highest level as the icons 42 to 45, 60 (that is, the icons 42 to 45, 60 to instruct switching of the display to the menu image or the like).

The CPU 20 sets the menu image or the other display image displayed in accordance with the selection of one of the icons 42 to 45, 60 on the home image as a display image to present functions and information positioned one level lower than functions presented by the home image as icons.

Further, the CPU 20 sets other various display images as display images to sequentially present functions and information positioned one level lower than functions and information presented by the menu image or the other display image as icons.

In the description that follows, a display image that presents functions and information positioned one level lower than functions and information presented by the home image currently displayed, the menu image, or the other display image is also called a lower-level display image when appropriate.

Also in the description that follows, a menu image or another display image that presents functions and information positioned one level higher than functions and information presented by a display image such as the menu image currently displayed or other display images is also called a higher-level display image when appropriate.

The transition of display to a menu image or other display images starting from the home image as a starting point will be described by taking a case when audio data is played back by effecting a transition from the display of the home image as an audio menu image to the display of a plurality of other display images as an example.

If, for example, the icon 42 is selected on the center home image 41 displayed in the display 13A by the user via the touch panel 13B, the CPU 20 recognizes that switching of the display to the audio menu image is instructed.

At this point, the CPU 20 sets the position and orientation of the one virtual camera 34 with respect to the three-dimensional background image 30 for the purpose of generating a two-dimensional background image inside the audio menu image.

The CPU 20 also sets the positions and orientations of two virtual lights, a first light and a second light, with respect to the three-dimensional background image 30 for the purpose of generating a two-dimensional background image inside the audio menu image.

Figure 20:
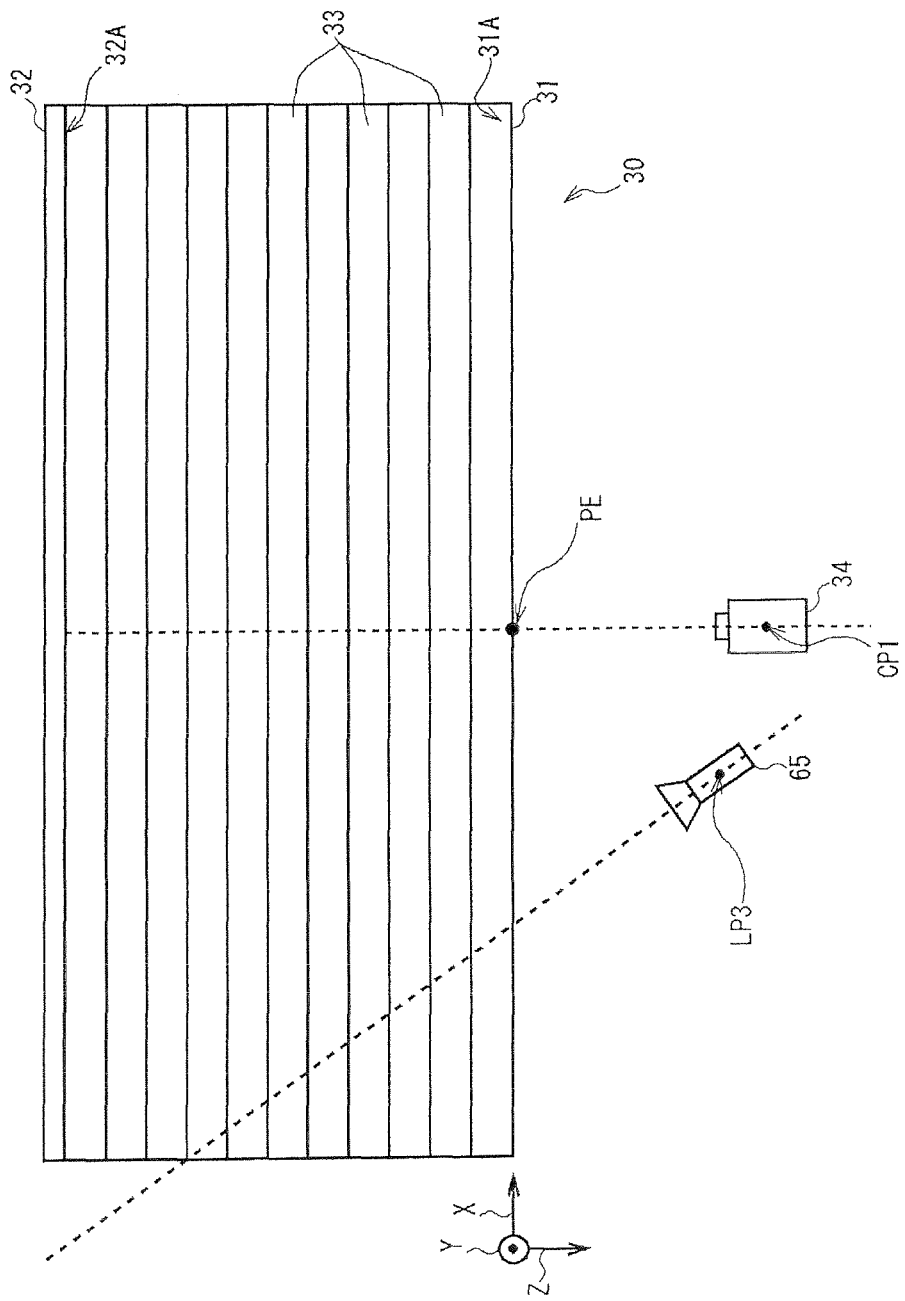
FIG. 20 is an approximate top view offering the description of the position and orientation of the camera and the position and orientation of a first light chosen for generating the two-dimensional background image when the display of the home image is switched to a menu image or other display images.

For the virtual camera 34, as shown in FIG. 20, the position and orientation with respect to the three-dimensional background image 30 are set in advance to the center camera position CP1 and the center camera orientation for both cases of generating a two-dimensional background image inside the menu image and the other display image.

For a virtual first light 65, the position with respect to the three-dimensional background image 30 is set in advance to, for example, the second left-side light position LP3 for both cases of generating a two-dimensional background image inside the menu image and the other display image.

Then, for the first light 65, the orientation in the second left-side light position LP3 with respect to the three-dimensional background image 30 is set to, for example, an orientation that makes the light optical axis parallel to the ZX plane and orients the first light 65 toward the left side of the three-dimensional background image 30 for both cases of generating a two-dimensional background image inside the menu image and the other display image.

That is, the orientation of the first light 65 in the second left-side light position LP3 is an orientation that orients the emission surface of the first light 65 toward the left side of the three-dimensional background image 30 (virtual space deviating to the left from the three-dimensional background image 30) along the light optical axis from the left front side of the image.

In the description that follows, the orientation of the first light 65 in the second left-side light position LP3 that orients the emission surface of the first light 65 toward the left side of the three-dimensional background image 30 along the light optical axis from the left front side of the image is also called a third left back light orientation.

Figure 21:
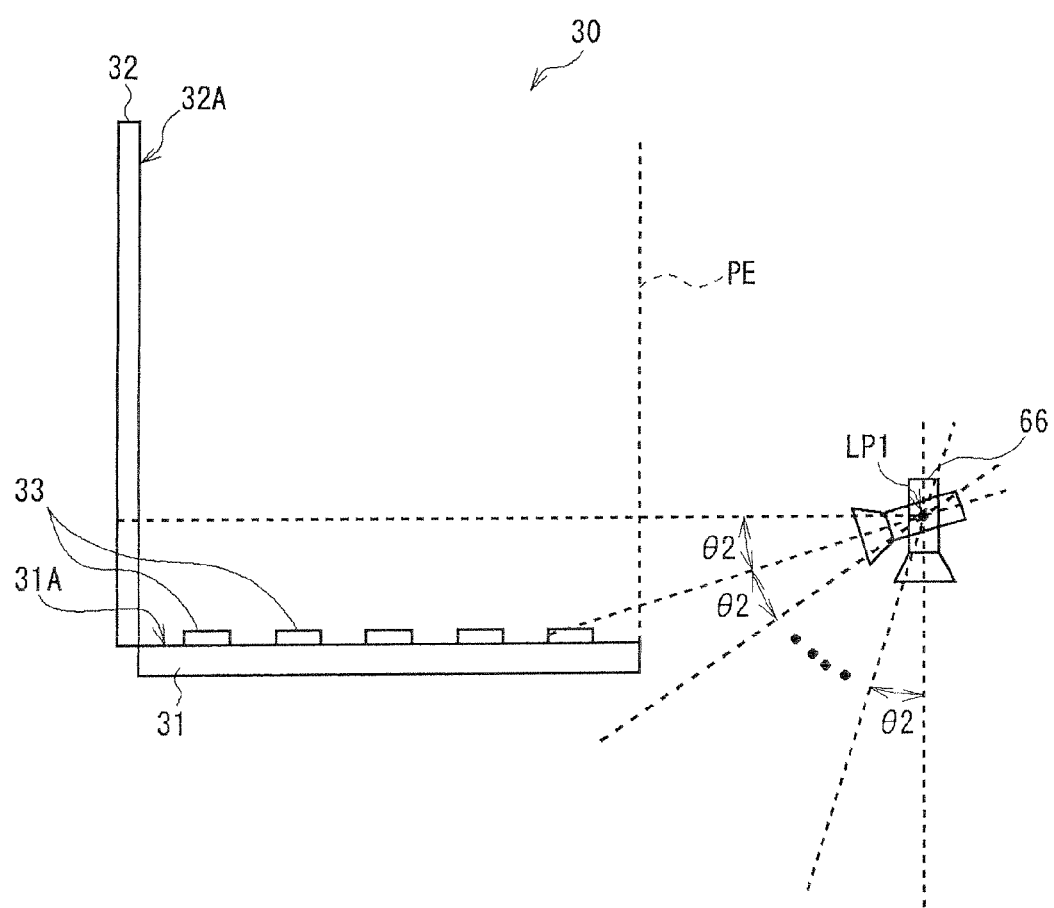
FIG. 21 is an approximate top view offering the description of the position and orientation of a second light chosen for generating the two-dimensional background image when the display of the home image is switched to the menu image or other display images.

Further, for a virtual second light 66, as shown in FIG. 21, the position with respect to the three-dimensional background image 30 is set to, for example, the center light position LP1 for both cases of generating a two-dimensional background image inside the menu image and the other display image.

For the transition of display that sequentially switches the display from the home image as a starting point to a menu image or another display image, a plurality of sequences exists depending on the type of functions and information that can be presented when the display is switched and how to narrow down functions and information in accordance with switching of the display.

For the plurality of sequences of the transition of display, the number of times of transition varies when the transition of display is sequentially effected from the home image as a starting point depending on the type of functions and information that can be presented when the display is switched and how to narrow down functions and information in accordance with switching of the display.

Then, for the second light 66 in the center light position LP1 with respect to the three-dimensional background image 30, a plurality of orientations that can be changed each time a two-dimensional background image is generated in a series of transitions of the menu image and other display images is chosen in advance regardless of the sequence of transition of display.

A virtual rotation axis parallel to the image width direction (X axis) passing through the center light position LP1 is used to actually choose the plurality of orientations of the second light 66 in the center light position LP1.

Also, for example, an angle θ2 obtained by dividing the angle range of 90 degrees from the center light orientation to the downward direction of the image by the maximum number of times of transition among the numbers of times of transition of the plurality of sequences for the transition of display is used to choose a plurality of orientations of the second light 66 in the center light position LP1.

Then, the plurality of orientations of the second light 66 in the center light position LP1 is a plurality of orientations that sequentially tilt the light optical axis by the angle θ2 from the center light orientation as a reference around the rotation axis in the downward direction of the image in the angle range of 90 degrees from the center light orientation to the downward direction of the image.

The orientation among the plurality of orientations of the second light 66 in the center light position LP1 obtained by tilting the light optical axis from the center light orientation in the downward direction of the image by the angle θ2 is an orientation that causes the light optical axis to sequentially intersect the perpendicular PE and a portion of the bottom plate one surface 31A closer to the image front obliquely.

That is, the orientation among the plurality of orientations of the second light 66 in the center light position LP1 obtained by tilting the light optical axis from the center light orientation in the downward direction of the image by the angle θ2 is an orientation that orients the emission surface of the second light 66 from the front side of the image along the light optical axis toward a portion of the bottom plate one surface 31A closer to the image front of the three-dimensional background image 30.

In the description that follows, the orientation in the center light position LP1 that orients the emission surface of the second light 66 from the front side of the image along the light optical axis toward a portion of the bottom plate one surface 31A closer to the image front of the three-dimensional background image 30 is also called a first down light orientation.

The orientation among the plurality of orientations of the second light 66 in the center light position LP1 obtained by sequentially tilting the light optical axis from the center light orientation in the downward direction of the image by an angle of an integral multiple equal to two times or more of the angle θ2 is an orientation that sequentially orients the emission surface of the second light 66 from the front side of the image along the light optical axis toward, for example, a virtual space on the front side of the three-dimensional background image 30.

The orientation among the plurality of orientations of the second light 66 in the center light position LP1 obtained by tilting the light optical axis from the center light orientation by 90 degrees equal to an integral multiple of the angle θ2 (that is, the light optical axis is made parallel to the downward direction of the image) is an orientation that orients the emission surface of the second light 66 from the front side of the image along the light optical axis toward directly below the center light position LP1.

In the description that follows, orientations in the center light position LP1 that sequentially orient the emission surface of the second light 66 from the front side of the image along the light optical axis toward a virtual space on the front side of the three-dimensional background image 30 are also called a second down light orientation, a third down light orientation, . . . .

In the description that follows, the orientation in the center light position LP1 that orients the emission surface of the second light 66 from the front side of the image along the light optical axis toward directly below the center light position LP1 is particularly also called an N-th down light orientation.

Incidentally, for the above light 35, the brightness of the emission surface when illumination light is emitted is set to a predetermined value when a two-dimensional background image is generated in any home image.

Thus, the CPU 20 causes the emission surface of the light 35 to emit light in brightness of the set value (hereinafter, referred to also as the reference brightness) to emit illumination light from the light 35 when a two-dimensional background image is generated in any home image.

Then, for the first light 65, the brightness of the emission surface when illumination light is emitted is set so as to be similar to the reference brightness of the above light 35 regardless of whether a two-dimensional background image inside a menu image or another display image is generated.

For the second light 66, the brightness of the emission surface is set to be sequentially lowered at a fixed decreasing rate from the reference brightness when the orientation is changed like the first down light orientation, the second down light orientation, . . . , the N-th down light orientation.

In the description that follows, the brightness set to be sequentially lowered at a fixed decreasing rate from the reference brightness when the orientation is changed like the first down light orientation, the second down light orientation, . . . , the N-th down light orientation for the second light 66 is also called the first brightness, the second brightness, . . . , the N-th brightness.

Thus, the CPU 20 sets the position and orientation of the virtual camera 34 with respect to the three-dimensional background image 30 to the preset center camera position CP1 and center camera orientation, respectively.

Also, the CPU 20 sets the position and orientation of the virtual first light 65 with respect to the three-dimensional background image 30 to the preset second left-side light position LP3 and third left back light orientation, respectively.

Further, the CPU 20 sets the position and orientation of the virtual second light 66 with respect to the three-dimensional background image 30 to the preset center light position LP1 and first down light orientation, respectively.

Moreover, the CPU 20 sets the first light 65 so that light is emitted in reference brightness and also sets the second light 66 so that light is emitted in first brightness obtained by lowering the reference brightness.

Accordingly, the CPU 20 causes the virtual first light 65 to emit light in reference brightness to illuminate the three-dimensional background image 30 by focusing on the center of the virtual space deviating from the three-dimensional background image 30 to the left from the left front side of the image.

The CPU 20 also causes the virtual second light 66 to emit light in first brightness to illuminate the three-dimensional background image 30 by focusing on a portion of the bottom plate one surface 31A closer to the image obliquely below from the front side of the image.

That is, the CPU 20 illuminates a lower left corner in the center portion of the three-dimensional background image 30 slightly brighter with the first light 65 and the second light 66.

The CPU 20 also illuminates an upper right portion excluding the lower left corner in the center portion of the three-dimensional background image 30 slightly darker than the lower left corner as a whole with the first light 65 and the second light 66 and also gradually darker from the upper side to the lower side of the image.

In this state, the CPU 20 converts the center portion of the three-dimensional background image 30 into a two-dimensional background image by a perspective projection as if to look squarely at the center portion to photograph from the front side of the image by the camera 34.

That is, the CPU 20 converts the center portion of the three-dimensional background image 30 into a two-dimensional background image drawn and represented as if to look squarely from the front side of the image in the above illumination state on a two-dimensional plane having the same image horizontal direction size and image vertical direction size as the image horizontal direction size and image vertical direction size of the display image.

If the two-dimensional background image is generated from the three-dimensional background image 30 in this manner, the CPU 20 reads template image data stored in advance as a foreground common to a plurality of menu images from, for example, the ROM 21.

The CPU 20 also reads foreground image data of a foreground image having a plurality of icons showing various functions such as the acquisition and playback of audio data generated and stored by a method similar to the method of the background image 61 described above with reference to FIG. 19 from, for example, the storage medium 28.

Then, the CPU 20 combines background image data of the two-dimensional background image with the template image data and foreground image data to generate audio menu image data and sends out the generated audio menu image data to the display 13A via the display processing unit 27.

Figure 22:
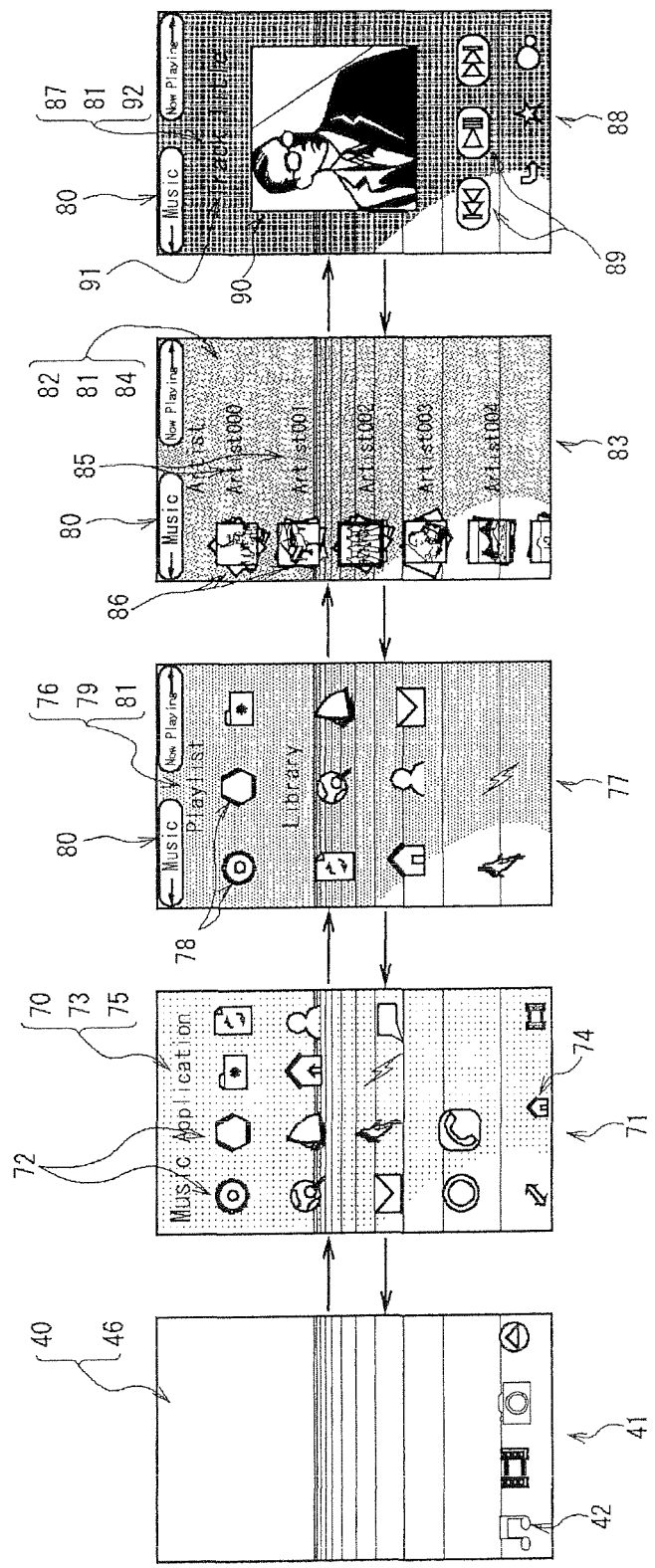
FIG. 22 is an approximate front view offering the description of hierarchical switching of the display of the display image when audio data to be played back is selected.

Accordingly, as shown in FIG. 22, the CPU 20 switches the display of the center home image 41 in the display 13A to an audio menu image 71 having a two-dimensional background image 70 based on the audio menu image data.

In this case, the two-dimensional background image 70 in the audio menu image 71 is shown in a visible state in which the center portion of the three-dimensional background image 30 is visible with individual object edges in parallel with the image horizontal direction.

The two-dimensional background image 70 also shows the center portion of the three-dimensional background image 30 in a visible state in which the lower left corner is slightly brighter, the upper right portion is slightly darker than the lower left corner as a whole, and the image appears gradually darker from the upper side to the lower side thereof.

The audio menu image 71 has a foreground image 73 having a plurality of icons 72 showing various functions such as the acquisition and playback of audio data superimposed on the two-dimensional background image 70.

The foreground image 73 has the plurality of icons 72 arranged in a matrix shape and is generated in such a way that the two-dimensional background image 70 is transmitted in portions other than the arrangement portion of the plurality of icons 72.

Further, a template image 75 having a plurality of icons such as a home icon 74 described above is also arranged on the two-dimensional background image 70 in the audio menu image 71.

The template image 75 has a plurality of icons such as the home icon 74 arranged in a lower end portion thereof in the image vertical direction and is generated in such a way that the two-dimensional background image 70 is transmitted in portions other than the arrangement portion of the plurality of icons such as the home icon 74.

If, for example, the icon 72 indicating the playback function of audio data is selected on the audio menu image 71 displayed in the display 13A by the user via the touch panel 13B, the CPU 20 recognizes that switching of the display is instructed.

That is, the CPU 20 recognizes that switching of the display to a display image to present a plurality of selection methods of audio data to be played back (hereinafter, referred to as a selection method presentation image) in accordance with the selection of the icon 72 by the user is instructed.

In this case, the CPU 20 sets, like the above case, the position and orientation of the virtual camera 34 with respect to the three-dimensional background image 30 to the center camera position CP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1, but sets the orientation of the second light 66 to the second down light orientation, which orients the light more toward the downward direction of the image than the first down light orientation.

Further, the CPU 20 sets the first light 65, like the above case, so that light is emitted in reference brightness, but sets the second light 66 so that light is emitted in second brightness, which is dimmer than the first brightness.

Accordingly, the CPU 20 causes the virtual first light 65 to emit light in reference brightness to illuminate the three-dimensional background image 30 by focusing on the center of the virtual space deviating from the three-dimensional background image 30 to the left from the left front side of the image.

The CPU 20 also causes the virtual second light 66 to emit light in second brightness to illuminate by focusing on the virtual space slightly deviating to the second light 66 from the bottom plate one surface 31A of the three-dimensional background image 30.

That is, the CPU 20 illuminates the lower left corner in the center portion of the three-dimensional background image 30 slightly brighter with the first light 65 and the second light 66.

The CPU 20 also illuminates the upper right portion in the center portion of the three-dimensional background image 30 further darker than the case of the two-dimensional background image 70 inside the audio menu image 71 as a whole with the first light 65 and the second light 66 and also gradually darker from the upper side to the lower side of the image.

In this state, the CPU 20 converts the center portion of the three-dimensional background image 30 into a two-dimensional background image by a perspective projection as if to look squarely at the center portion to photograph from the front side of the image by the camera 34.

That is, the CPU 20 converts the center portion of the three-dimensional background image 30 into a two-dimensional background image drawn and represented as if to look squarely from the front side of the image in the above illumination state on a two-dimensional plane having the same image horizontal direction size and image vertical direction size as the image horizontal direction size and image vertical direction size of the display image.

If the two-dimensional background image is generated from the three-dimensional background image 30 in this manner, the CPU 20 reads a selection method presentation image and template image data stored in advance as a foreground common to lower-level display images from, for example, the ROM 21.

The CPU 20 also reads foreground image data of a foreground image having a plurality of icons showing a plurality of selection methods of audio data to be played back generated and stored by a method similar to the method of the background image 61 described above with reference to FIG. 19 from, for example, the storage medium 28.

Then, the CPU 20 combines background image data of the two-dimensional background image with the template image data and foreground image data to generate selection method presentation image data and sends out the generated selection method presentation image data to the display 13A via the display processing unit 27.

Accordingly, the CPU 20 (FIG. 22) switches the display of the audio menu image 71 in the display 13A to a selection method presentation image 77 having a two-dimensional background image 76 based on the selection method presentation image data.

In this case, the two-dimensional background image 76 in the selection method presentation image 77 is shown in a visible state in which the center portion of the three-dimensional background image 30 is visible with individual object edges in parallel with the image horizontal direction.

The two-dimensional background image 76 also shows the center portion of the three-dimensional background image 30 in a visible state in which the lower left corner is slightly brighter, the upper right portion is further darker than the case of the audio menu image 71 as a whole, and the image appears gradually darker from the upper side to the lower side thereof.

The selection method presentation image 77 has a foreground image 79 having a plurality of icons 78 showing various selection methods of audio data to be played back superimposed on the two-dimensional background image 76.

The foreground image 79 has the plurality of icons 78 arranged in a matrix shape and is generated in such a way that the two-dimensional background image 76 is transmitted in portions other than the arrangement portion of the plurality of icons 78.

Further, the selection method presentation image 77 has a template image 81 having a plurality of icons such as an icon (hereinafter, referred to as a display switching icon) 80 selected for switching such as bringing the display back to the previous display image superimposed on the two-dimensional background image 76.

The template image 81 is generated in such a way that the two-dimensional background image 76 is transmitted in portions other than the arrangement portion of the plurality of icons such as the icon 80.

As the plurality of icons 78 indicating various selection methods of audio data to be played back, a plurality of icons allowing the selection of a plurality of pieces of audio data to be played back collectively and indicating, for example, a play list specifying the playback order of the plurality of pieces of audio data can be cited.

Further, as the plurality of icons 78 indicating various selection methods of audio data to be played back, a plurality of icons allowing the selection of one or a plurality of pieces of audio data individually or collectively and indicating various lists such as a list of genre names or a list of artist names described above can be cited.

If, for example, the icon 78 indicating a list of artist names is selected on the selection method presentation image 77 displayed in the display 13A by the user via the touch panel 13B, the CPU 20 recognizes that switching of the display is instructed.

That is, the CPU 20 recognizes that switching of the display to a display image to present a plurality of pieces of audio data as a list of artist names (hereinafter, referred to as an artist list image) in accordance with the selection of the icon 78 by the user is instructed.

In this case, the CPU 20 sets, like the above case, the position and orientation of the virtual camera 34 with respect to the three-dimensional background image 30 to the center camera position CP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1, but sets the orientation of the second light 66 to the third down light orientation, which orients the light more toward the downward direction of the image than the second down light orientation.

Further, the CPU 20 sets the first light 65, like the above case, so that light is emitted in reference brightness, but sets the second light 66 so that light is emitted in third brightness obtained by further lowering the second brightness.

Accordingly, the CPU 20 causes the virtual first light 65 to emit light in reference brightness to illuminate the three-dimensional background image 30 by focusing on the center of the virtual space deviating from the three-dimensional background image 30 to the left from the left front side of the image.

The CPU 20 also causes the virtual second light 66 to emit light in third brightness to illuminate by focusing on the virtual space further (that is, compared with when the selection method presentation image 77 is generated) deviating to the second light 66 from the bottom plate one surface 31A of the three-dimensional background image 30.

That is, the CPU 20 illuminates the lower left corner in the center portion of the three-dimensional background image 30 slightly brighter with the first light 65 and the second light 66.

The CPU 20 also illuminates the upper right portion in the center portion of the three-dimensional background image 30 further darker than the case of the two-dimensional background image 76 inside the selection method presentation image 77 as a whole with the first light 65 and the second light 66 and also gradually darker from the upper side to the lower side of the image.

In this state, the CPU 20 converts the center portion of the three-dimensional background image 30 into a two-dimensional background image by a perspective projection as if to look squarely at the center portion to photograph from the front side of the image by the camera 34.

That is, the CPU 20 converts the center portion of the three-dimensional background image 30 into a two-dimensional background image drawn and represented as if to look squarely from the front side of the image in the above illumination state on a two-dimensional plane having the same image horizontal direction size and image vertical direction size as the image horizontal direction size and image vertical direction size of the display image.

If the two-dimensional background image is generated from the three-dimensional background image 30 in this manner, the CPU 20 reads template image data similar to the one at the time of generating the selection method presentation image 77 from, for example, the ROM 21.

The CPU 20 also reads a list of artist names and also reads jacket image data corresponding to each artist name from, for example, the storage medium 28.

Further, the CPU 20 generates foreground image data based on the list of artist names and the jacket image data for each artist name.

Then, the CPU 20 combines background image data of the two-dimensional background image with the template image data and foreground image data to generate artist list image data and sends out the generated artist list image data to the display 13A via the display processing unit 27.

Accordingly, the CPU 20 (FIG. 22) switches the display of the selection method presentation image 77 in the display 13A to an artist list image 83 having a two-dimensional background image 82 based on the artist list image data.

In this case, the two-dimensional background image 82 in the artist list image 83 is shown in a visible state in which the center portion of the three-dimensional background image 30 is visible with individual object edges in parallel with the image horizontal direction.

The two-dimensional background image 82 also shows the center portion of the three-dimensional background image 30 in a visible state in which the lower left corner is slightly brighter, the upper right portion is further darker than the case of the selection method presentation image 77 as a whole, and the image appears gradually darker from the upper side to the lower side thereof.

The artist list image 83 has a foreground image 84 showing artist names and jacket images superimposed on the two-dimensional background image 82.

In this case, a plurality of icons 85 showing a plurality of artist names as text is arranged in the foreground image 84 along the image vertical direction, for example, in a list form in which artist names are alphabetically arranged in a row.

Also in the foreground image 84, a jacket image of one or a plurality of corresponding albums is arranged as an icon 86 beside the icon 85 indicating each artist name.

If a plurality of jacket images corresponding to an artist name exists, the icon 86 arranged in the foreground image 84 and showing the jacket images of the artist name is shown by slightly shifting the plurality of jacket images.

Accordingly, the foreground image 84 can cause the user to intuitively recognize whether the number of albums corresponding to each artist name (that is, albums for each artist) is large.

The foreground image 84 is generated in such a way that the two-dimensional background image 82 is transmitted in portions other than the arrangement portion of the icons 85 and the icons 86.

If the icon 85 indicating one of artist names is selected on the artist list image 83 displayed in the display 13A by the user via the touch panel 13B, the CPU 20 recognizes that switching of the display is instructed.

If the icon 86 indicating one of jacket images is selected on the artist list image 83 displayed in the display 13A by the user via the touch panel 13B, the CPU 20 also recognizes that switching of the display is instructed.

That is, the CPU 20 recognizes that switching of the display to a display image (hereinafter, referred to as a playback image) to notify the user of playback of music in one or a plurality of albums of the artist selected by the user via the icon 85 or the icon 86 is instructed.

In this case, the CPU 20 sets, like the above case, the position and orientation of the virtual camera 34 with respect to the three-dimensional background image 30 to the center camera position CP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1.

However, the playback image is a display image to present information positioned as, for example, the lowest level in a sequence of switching of the display described above.

Thus, when a two-dimensional background image inside a display image to present information positioned as the lowest level like a playback image is generated, the CPU 20 sets the orientation of the virtual second light 66 with respect to the three-dimensional background image 30 to the lowest N-th down light orientation.

That is, when switching of the display to a display image to present information positioned as the lowest level, the CPU 20 sets the orientation of the virtual second light 66 to the lowest N-th down light orientation regardless of how many orientations lower than the orientation set when the display is switched last time exist.

Further, the CPU 20 sets the first light 65, like the above case, so that light is emitted in reference brightness, but sets the second light 66 so that light is emitted in N-th brightness corresponding to the N-th down light orientation obtained by further lowering the third brightness.

Accordingly, the CPU 20 causes the virtual first light 65 to emit light in reference brightness to illuminate the three-dimensional background image 30 by focusing on the center of the virtual space deviating from the three-dimensional background image 30 to the left from the left front side of the image.

The CPU 20 also causes the virtual second light 66 to emit light in N-th brightness to illuminate by focusing on the virtual space directly below the second light 66 further (that is, compared with when the artist list image 83 is generated) deviating to the front side of the image from the bottom plate one surface 31A of the three-dimensional background image 30.

That is, the CPU 20 illuminates the lower left corner in the center portion of the three-dimensional background image 30 slightly brighter with the first light 65 and the second light 66.

The CPU 20 also illuminates the upper right portion in the center portion of the three-dimensional background image 30 further darker than the case of the two-dimensional background image 82 inside the artist list image 83 as a whole with the first light 65 and the second light 66 and also gradually darker from the upper side to the lower side of the image.

In this state, the CPU 20 converts the center portion of the three-dimensional background image 30 into a two-dimensional background image by a perspective projection as if to look squarely at the center portion to photograph from the front side of the image by the camera 34.

That is, the CPU 20 converts the center portion of the three-dimensional background image 30 into a two-dimensional background image drawn and represented as if to look squarely from the front side of the image in the above illumination state on a two-dimensional plane having the same image horizontal direction size and image vertical direction size as the image horizontal direction size and image vertical direction size of the display image.

If the two-dimensional background image is generated from the three-dimensional background image 30 in this manner, the CPU 20 reads template image data similar to the one at the time of generating the selection method presentation image 77 from, for example, the ROM 21.

The CPU 20 also reads foreground image data stored in advance as a foreground of a playback image from, for example, the ROM 21 and also reads audio title information corresponding to audio data played back first and jacket image data from the storage medium 28 to combine with the foreground image data.

Further, the CPU 20 combines background image data of the two-dimensional background image with the template image data and foreground image data (foreground image data generated by combining jacket image data and audio title information) to generate playback image data.

Then, the CPU 20 sends out the playback image data to the display 13A via the display processing unit 27.

Accordingly, the CPU 20 (FIG. 22) switches the display of the artist list image 83 in the display 13A to a playback image 88 having a two-dimensional background image 87 based on the playback image data.

In this case, the two-dimensional background image 87 in the playback image 88 is shown in a visible state in which the center portion of the three-dimensional background image 30 is visible with individual object edges in parallel with the image horizontal direction.

The two-dimensional background image 87 also shows the center portion of the three-dimensional background image 30 in a visible state in which the lower left corner is slightly brighter, the upper right portion is further darker than the ease of the artist list image 83 as a whole, and the image appears gradually darker from the upper side to the lower side thereof.

The playback image 88 has a foreground image 92 in which a jacket image 90 and text 91 showing the audio title of audio data to be played back are arranged along with icons 89 for playback control superimposed on the two-dimensional background image 87.

In this case, as the icon 89 arranged in the foreground image 92, for example, an icon to instruct the playback start and playback stop of audio data and an icon to instruct switching of audio data to be played back can be cited.

The foreground image 92 is generated in such a way that the two-dimensional background image 87 is transmitted in portions other than the arrangement portion of the icons 89 and the jacket images 90.

When the display of the artist list image 83 in the display 13A is switched to the playback image 88, the CPU 20 reads audio data from the storage medium 28 to automatically start playback.

In this manner, the CPU 20 can sequentially switch the display of the center home image 41 in the display 13A to the audio menu image 71, the selection method presentation image 77, the artist list image 83, and the playback image 88 indicating functions or information associated hierarchically.

If the display switching icon 80 is selected on the playback image 88 displayed in the display 13A by the user via the touch panel 13B, the CPU 20 recognizes that switching of the display of the playback image 88 to the artist list image 83 is instructed.

In this case, the CPU 20 sets, like the above case, the position and orientation of the virtual camera 34 with respect to the three-dimensional background image 30 to the center camera position CP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1 and also sets the orientation of the second light 66 to the third down light orientation by lifting from the N-th down light orientation.

Further, the CPU 20 sets the first light 65, like the above case, so that light is emitted in reference brightness, but sets the second light 66 so that light is emitted in third brightness lifted from the N-th brightness.

Accordingly, the CPU 20 generates, like the above case, the two-dimensional background image 82 for the artist list image 83 based on the three-dimensional background image 30.

Then, the CPU 20 generates artist list image data by using background image data of the two-dimensional background image 82 thereof and switches the display of the playback image 88 in the display 13A to the artist list image 83.

If the display switching icon 80 is selected on the artist list image 83 displayed in the display 13A by the user via the touch panel 13B, the CPU 20 recognizes that switching of the display of the artist list image 83 to the selection method presentation image 77 is instructed.

In this case, the CPU 20 sets, like the above case, the position and orientation of the virtual camera 34 with respect to the three-dimensional background image 30 to the center camera position CP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1 and also sets the orientation of the second light 66 to the second down light orientation by lifting from the third down light orientation.

Further, the CPU 20 sets the first light 65, like the above case, so that light is emitted in reference brightness, but sets the second light 66 so that light is emitted in second brightness lifted from the third brightness.

Accordingly, the CPU 20 generates, like the above case, the two-dimensional background image 76 for the selection method presentation image 77 based on the three-dimensional background image 30.

Then, the CPU 20 generates selection method presentation image data by using background image data of the two-dimensional background image 76 thereof and switches the display of the artist list image 83 in the display 13A to the selection method presentation image 77.

Further, if the display switching icon 80 is selected on the selection method presentation image 77 displayed in the display 13A by the user via the touch panel 13B, the CPU 20 recognizes that switching of the display of the selection method presentation image 77 to the audio menu image 71 is instructed.

In this case, the CPU 20 sets, like the above case, the position and orientation of the virtual camera 34 with respect to the three-dimensional background image 30 to the center camera position LP1 and the center camera orientation, respectively.

Also, the CPU 20 sets, like the above case, the position and orientation of the virtual first light 65 with respect to the three-dimensional background image 30 to the second left-side light position LP3 and the third left back light orientation, respectively.

Further, the CPU 20 sets, like the above case, the position of the virtual second light 66 with respect to the three-dimensional background image 30 to the center light position LP1 and also sets the orientation of the second light 66 to the first down light orientation by lifting from the second down light orientation.

Further, the CPU 20 sets the first light 65, like the above case, so that light is emitted in reference brightness, but sets the second light 66 so that light is emitted in first brightness lifted from the second brightness.

Accordingly, the CPU 20 generates, like the above case, the two-dimensional background image 70 for the audio menu image 71 based on the three-dimensional background image 30.

Then, the CPU 20 generates audio menu image data by using background image data of the two-dimensional background image 70 thereof and switches the display of the selection method presentation image 77 in the display 13A to the audio menu image 71.

Further, if the home icon 74 is selected on the audio menu image 71 displayed in the display 13A by the user via the touch panel 13B, the CPU 20 switches the display of the audio menu image 71 in the display 13A to the center home image 41.

In this manner, the display of the playback image 88 in the display 13A can sequentially be switched back like the artist list image 83, the selection method presentation image 77, the audio menu image 71, and the center home image 41.

If the display of the center home image 41 is switched to the audio menu image 71, the CPU 20 can cause the user to recognize that the lower left corner in the two-dimensional background image 70 inside the audio menu image 71 is slightly brighter and the upper right portion is slightly darker than the lower left corner as a whole.

Thus, the CPU 20 can cause the user to recognize that based on a visible state of the two-dimensional background image 70 inside the audio menu image 71, a display image (that is, the selection method presentation image 77) to which the display can further be switched exists if switching of the display to a lower-level display image is instructed.

That is, if the display of the center home image 41 is switched to the audio menu image 71, the CPU 20 can cause the user to easily recognize that based on a visible state of the two-dimensional background image 70 inside the audio menu image 71, the display of the audio menu image 71 is switchable when switching of the display to a lower-level display image is instructed.

In addition, if the display of the selection method presentation image 77 is switched to the audio menu image 71, the CPU 20 can cause the user to recognize that based on a visible state of the two-dimensional background image 70 inside the audio menu image 71, a display image (that is, the center home image 41) to which the display can further be switched exists if switching of the display to a higher-level display image is instructed.

That is, if the display of the selection method presentation image 77 is switched to the audio menu image 71, the CPU 20 can cause the user to easily recognize that based on the visible state of the two-dimensional background image 70 inside the audio menu image 71, the display of the selection method presentation image 77 is switchable if switching of the display to a higher-level display image is instructed.

If the display of the audio menu image 71 is switched to the selection method presentation image 77, the CPU 20 can cause the user to recognize that the lower left corner in the two-dimensional background image 76 inside the selection method presentation image 77 is slightly brighter and the upper right portion is darker as a whole compared with the audio menu image 71, but is not too dark.

Thus, the CPU 20 can cause the user to recognize that based on the visible state of the two-dimensional background image 76 inside the selection method presentation image 77, a display image (that is, the artist list image 83) to which the display can further be switched exists if switching of the display to a lower-level display image is instructed.

That is, if the display of the audio menu image 71 is switched to the selection method presentation image 77, the CPU 20 can cause the user to easily recognize that based on the visible state of the two-dimensional background image 76 inside the selection method presentation image 77, the display of the selection method presentation image 77 is switchable if switching of the display to a lower-level display image is instructed.

In addition, if the display of the artist list image 83 is switched to the selection method presentation image 77, the CPU 20 can cause the user to recognize that based on the visible state of the two-dimensional background image 76 inside the selection method presentation image 77, a display image (that is, the audio menu image 71) to which the display can further be switched exists if switching of the display to a higher-level display image is instructed.

That is, if the display of the artist list image 83 is switched to the selection method presentation image 77, the CPU 20 can cause the user to easily recognize that based on the visible state of the two-dimensional background image 76 inside the selection method presentation image 77, the display of the selection method presentation image 77 is switchable if switching of the display to a higher-level display image is instructed.

Further, if the display of the selection method presentation image 77 is switched to the artist list image 83, the CPU 20 can cause the user to recognize that the lower left corner in the two-dimensional background image 82 inside the artist list image 83 is slightly brighter and the upper right portion is darker as a whole compared with the selection method presentation image 77, but the two-dimensional background image 82 is sufficiently visually recognizable.

Thus, the CPU 20 can cause the user to recognize that based on the visible state of the two-dimensional background image 82 inside the artist list image 83, a display image (that is, the artist list image 88) to which the display can further be switched exists if switching of the display to a lower-level display image is instructed.

That is, if the display of the selection method presentation image 77 is switched to the artist list image 83, the CPU 20 can cause the user to easily recognize that based on the visible state of the two-dimensional background image 82 inside the artist list image 83, the display of the artist list image 83 is switchable if switching of the display to a lower-level display image is instructed.

In addition, if the display of the playback image 88 is switched the artist list image 83, the CPU 20 can cause the user to recognize that based on the visible state of the two-dimensional background image 82 inside the artist list image 83, a display image (that is, the selection method presentation image 77) to which the display can further be switched exists if switching of the display to a higher-level display image is instructed.

That is, if the display of the playback image 88 is switched to the artist list image 83, the CPU 20 can cause the user to easily recognize that based on the visible state of the two-dimensional background image 82 inside the artist list image 83, the display of the artist list image 83 is switchable if switching of the display to a higher-level display image is instructed.

Further, if the display of the artist list image 83 is switched to the playback image 88, the CPU 20 can cause the user to recognize that the lower left corner in the two-dimensional background image 87 inside the playback image 88 is slightly brighter, the upper right portion is darker as a whole compared with the artist list image 83, and it is difficult to visually recognize the two-dimensional background image 82.

Thus, the CPU 20 can cause the user to recognize that based on the visible state of the two-dimensional background image 87 inside the playback image 88, no display image to which the display can further be switched exists even if switching of the display to a lower-level display image is instructed.

That is, if the display of the artist list image 83 is switched to the playback image 88, the CPU 20 can cause the user to easily recognize that based on the visible state of the two-dimensional background image 87 inside the playback image 88, the display of the playback image 88 is not switchable even if switching of the display to a lower-level display image is instructed.

However, if the display of the artist list image 83 is switched to the playback image 88, the CPU 20 can cause the user to easily recognize that based on the visible state of the two-dimensional background image 87 inside the playback image 88, a display image (that is, the artist list image 83) to which the display can further be switched exists if switching of the display to a higher-level display image is instructed.

That is, if the display of the artist list image 83 is switched to the playback image 88, the CPU 20 can cause the user to easily recognize that based on the visible state of the two-dimensional background image 87 inside the playback image 88, the display of the playback image 88 is switchable if switching of the display to a higher-level display image is instructed.

Incidentally, when generating the foreground image 84 for the artist list image 83, the CPU 20 first generates a three-dimensional space image having the icons 85 and the icons 86.

That is, the CPU 20 arranges a plurality of icons 85 showing artist names on a virtual plane parallel to the XY plane in a row parallel to the image height direction in a three-dimensional virtual space represented by a three-dimensional space coordinate system.

Also, the CPU 20 arranges a plurality of icons 86 showing jacket images on a virtual plane in a row parallel to the image height direction by associating with the icons 85 showing artist names in the three-dimensional virtual space.

In this manner, the CPU 20 generates a three-dimensional foreground image as a three-dimensional space image in which the plurality of icons 85 and icons 86 is arranged in a three-dimensional virtual space.

Then, the CPU 20 sets the positions and orientations of the virtual camera and light with respect to the three-dimensional foreground image to such positions and orientations that the plurality of icons 85 and icons 86 is photographed by uniformly being illuminated from the front side of the image.

In this state, the CPU 20 converts the plurality of icons 85 and icons 86 inside the three-dimensional foreground image into the foreground image 84 as a two-dimensional plane image by a perspective projection as if to look squarely at the icons 85 and icons 86 to photograph from the front side of the image using a virtual camera.

The size of the foreground image 84 in the image horizontal direction is chosen to be equal to the size of the artist list image 83 in the image horizontal direction.

Also, the size of the foreground image 84 in the image vertical direction is chosen to be equal to or more than the size of the artist list image 83 in the image vertical direction in accordance with the number of the plurality of icons 85 arranged in a row.

In the description that follows, the size of the foreground image 84 in the image vertical direction is also called a foreground vertical size and the size of the artist list image 83 in the image vertical direction is also called a list vertical size.

Thus, if the foreground vertical size is equal to the list vertical size, the CPU 20 generates the artist list image 83 by using the foreground image 84 unchanged.

Figure 23:
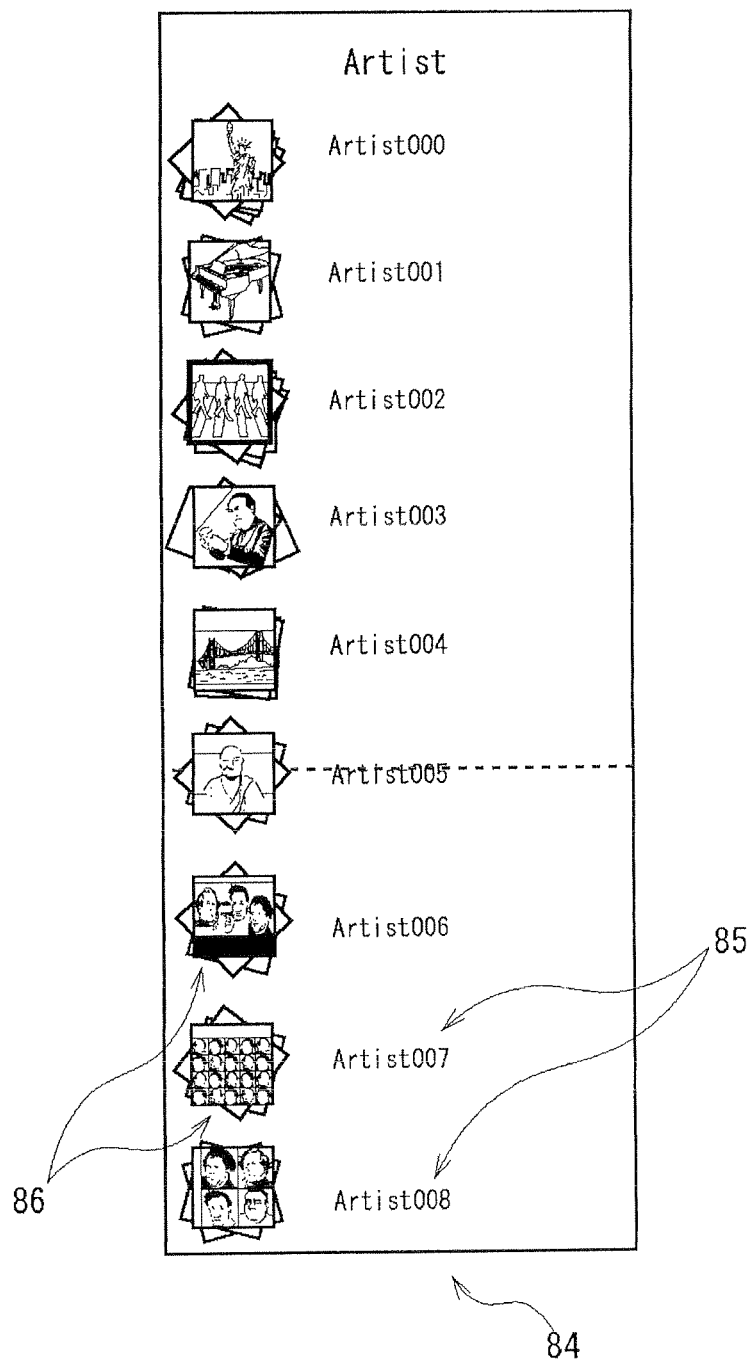
FIG. 23 is an approximate front view showing the configuration of the foreground image for artist images.

If, as shown in FIG. 23, the foreground vertical size is larger (that is, longer) than the list vertical size, by contrast, the CPU 20 sets a portion of the foreground image 84 from the top end of the image up to a predetermined position on the bottom end side of the image equal to the list vertical size as a display portion.

The CPU 20 also generates the artist list image 83 by using the display portion of the foreground image 84 and displays the artist list image 83 in the display 13A.

If a slide operation of the display of the touch panel 13B in an upward direction is performed while the artist list image 83 is displayed in the display 13A, the CPU 20 determines that switching of the display portion of the foreground image 84 from a top end portion of the image to the bottom end side of the image is instructed.

At this point, the CPU 20 sequentially changes the display portion of the foreground image 84 to the bottom end side of the image in accordance with the amount of displacement of the touch position by the slide operation.

Each time the display portion is changed in the foreground image 84, the CPU 20 uses the changed display portion to generate the artist list image 83 and to display the artist list image 83 in the display 13A.

Accordingly, the CPU 20 sequentially changes the display portion of the foreground image 84 inside the artist list image 83 to the bottom end side of the image in accordance with the slide operation in the upward direction by the user.

In this manner, the CPU 20 can scroll the foreground image 84 inside the artist list image 83 in the upward direction in accordance with the slide operation in the upward direction by the user to make the bottom end side of the image visible.

On the other hand, if the foreground image 84 is scrolled in the upward direction and then a slide operation of the display of the touch panel 13B in the downward direction is performed, the CPU 20 determines that switching of the display portion of the foreground image 84 from the top end side of the image to near the top end of the image is instructed.

At this point, the CPU 20 sequentially changes the display portion of the foreground image 84 to the top end side of the image in accordance with the amount of displacement of the touch position by the slide operation.

Each time the display portion is changed in the foreground image 84, the CPU 20 uses the changed display portion to generate the artist list image 83 and to display the artist list image 83 in the display 13A.

Accordingly, the CPU 20 sequentially changes the display portion of the foreground image 84 inside the artist list image 83 to the top end side of the image in accordance with the slide operation in the downward direction by the user.

In this manner, the CPU 20 can scroll the foreground image 84 inside the artist list image 83 in the downward direction in accordance with the slide operation in the downward direction by the user to make the top end side of the image visible.

While the foreground image 84 being scrolled in the upward direction, the CPU 20 does not change the positions and orientations of the virtual camera 34 and the virtual first light 65 with respect to the three-dimensional background image 30 and the position of the second light 66.

However, the CPU 20 changes the orientation of the second light 66 to below the third down light orientation up to the N-th down light orientation by rotating the second light 66 in the downward direction of the image in accordance with the amount of displacement of the touch position by the slide operation.

At this point, while lowering the orientation of the second light 66 to below the third down light orientation, the CPU 20 also lowers the brightness of the emission surface of the second light 66 accordingly to below the third brightness to allow to change up to the N-th brightness.

Further, while sequentially lowering the orientation and brightness of the second light 66 as described above, the CPU 20 sequentially converts the three-dimensional background image 30 into two-dimensional background images by a method similar to the above one.

Then, each time a two-dimensional background image is generated as described above, the CPU 20 uses the generated two-dimensional background image together with the display portion changed in the foreground image 84 at this point to generate and display the artist list image 83 in the display 13A.

Figure 24:
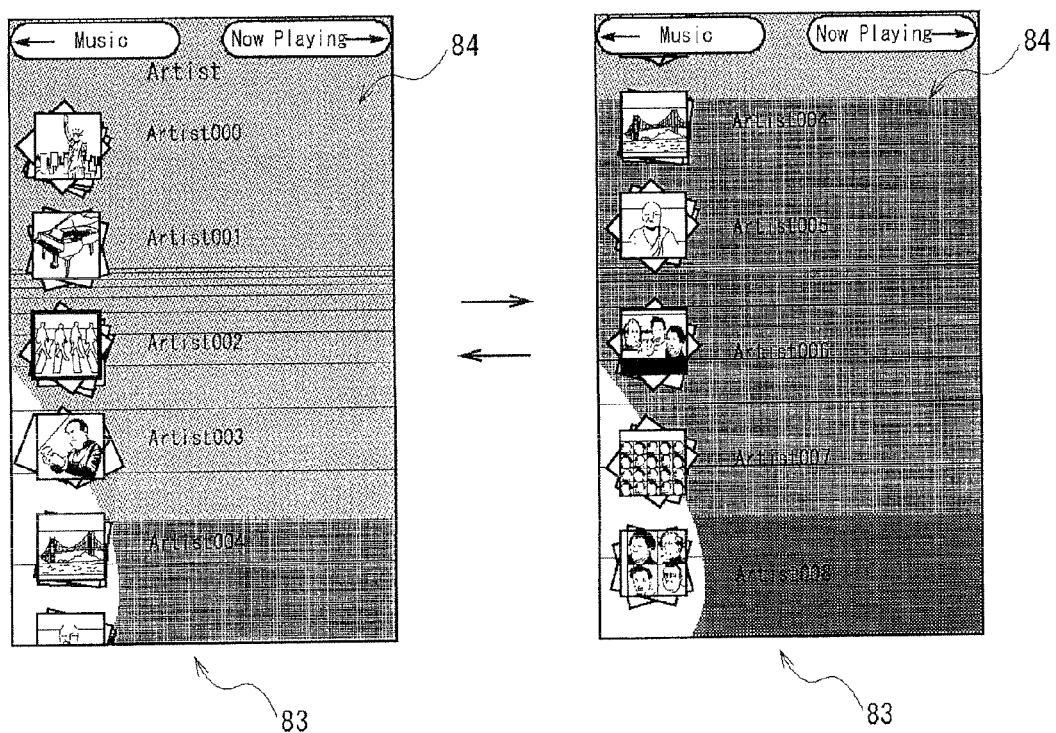
FIG. 24 is an approximate front view offering the description of scrolling of the foreground image in artist images.

Accordingly, as shown in FIG. 24, the CPU 20 shows the two-dimensional background image in a visible state in which the more the foreground image 84 inside the artist list image 83 is scrolled in the upward direction in accordance with a scroll operation in the upward direction, the darker the upper right portion as a whole appears and the bottom side of the image appears darker than the top side of the image.

When the foreground image 84 is scrolled up to the bottom display portion inside the artist list portion 83, the CPU 20 shows the two-dimensional background image in a visible state in which the upper right portion is still darker as a whole, the bottom side of the image appears still darker than the top side of the image, and object edges are not visually recognizable on the bottom side of the image.

Thus, the CPU 20 can cause the user to easily recognize whether any display portion to which the display is switchable exists in the foreground image 84 based on the visible state of the two-dimensional background image during scroll operation in the upward direction if the scroll operation is continued.

That is, the CPU 20 can cause the user to easily recognize whether the display portion of the foreground image 84 is switchable based on the visible state of the two-dimensional background image during scroll operation in the upward direction even if the scroll operation is continued.

When the scroll operation in the upward direction ends, the CPU 20 can cause the user to easily recognize whether any display portion to which the display is switchable exists in the foreground image 84 based on the visible state of the two-dimensional background image if a scroll operation in the upward direction is further performed.

That is, when the scroll operation in the upward direction ends, the CPU 20 can cause the user to easily recognize whether the display portion of the foreground image 84 is switchable based on the visible state of the two-dimensional background image even if the scroll operation in the upward direction is further performed.

Further, when the scroll operation in the upward direction ends, the CPU 20 can cause the user to easily recognize whether the display portion of the foreground image 84 is switchable based on the visible state of the two-dimensional background image if the scroll operation in the downward direction is performed.

On the other hand, while the foreground image 84 being scrolled in the downward direction, the CPU 20 does not change the positions and orientations of the virtual camera 34 and the virtual first light 65 with respect to the three-dimensional background image 30 and the position of the second light 66.

However, the CPU 20 changes the orientation of the second light 66 from below the third down light orientation up to the third down light orientation by rotating the second light 66 in the upward direction of the image in accordance with the amount of displacement of the touch position by the slide operation.

At this point, while lifting the orientation of the second light 66 from below the third down light orientation, the CPU 20 also lifts the brightness of the emission surface of the second light 66 accordingly from below the third brightness to allow to change up to the third brightness.

Further, while sequentially lifting the orientation and brightness of the second light 66 as described above, the CPU 20 sequentially converts the three-dimensional background image 30 into two-dimensional background images by a method similar to the above one.

Then, each time a two-dimensional background image is generated as described above, the CPU 20 uses the generated two-dimensional background image together with the display portion changed in the foreground image 84 at this point to generate and display the artist list image 83 in the display 13A.

Accordingly, the CPU 20 shows the two-dimensional background image in a visible state in which the more the foreground image 84 inside the artist list image 83 is scrolled in the downward direction in accordance with a scroll operation in the downward direction, the brighter the upper right portion as a whole appears and the top side of the image appears brighter than the bottom side of the image.

When the foreground image 84 is scrolled up to the top display portion inside the artist list portion 83, the CPU 20 shows the two-dimensional background image in a visible state in which the upper right portion is still brighter as a whole and the top side of the image appears still brighter than the bottom side of the image.

Thus, the CPU 20 can cause the user to easily recognize whether any display portion to which the display is switchable exists in the foreground image 84 based on the visible state of the two-dimensional background image during scroll operation in the downward direction if the scroll operation is continued.

That is, the CPU 20 can cause the user to easily recognize whether the display portion of the foreground image 84 is switchable based on the visible state of the two-dimensional background image during scroll operation in the downward direction even if the scroll operation is continued.

When the scroll operation in the downward direction ends, the CPU 20 can cause the user to easily recognize whether any display portion to which the display is switchable exists in the foreground image 84 based on the visible state of the two-dimensional background image if a scroll operation in the downward direction is further performed.

That is, when the scroll operation in the downward direction ends, the CPU 20 can cause the user to easily recognize whether the display portion of the foreground image 84 is switchable based on the visible state of the two-dimensional background image even if the scroll operation in the downward direction is further performed.

Further, when the scroll operation in the downward direction ends, the CPU 20 can cause the user to easily recognize whether the display portion of the foreground image 84 is switchable based on the visible state of the two-dimensional background image if the scroll operation in the upward direction is performed.

When presenting various functions and information about photo image data, the CPU 20 can sequentially switch, like the above case, the display of display images having a two-dimensional background image indicating whether the display is switchable.

Also, when presenting various functions and information about application programs, the CPU 20 can sequentially switch, like the above case, the display of display images having a two-dimensional background image indicating whether the display is switchable.

In the present embodiment, each time, for example, audio data is played back, the CPU 20 stores a playback history in the storage medium 28 in forms that can be managed in units of audio data, album name, artist name, and jacket name.

When converting a three-dimensional space image having the icon 85 showing an artist name and the icon 86 showing a jacket image into the foreground image 84 in accordance with, for example, the display of the artist list image 83, the CPU 20 adds a virtual light.

Further, the CPU 20 generates the foreground image 84 in such a way that a spotlight is directed on at least one of the icon 85 and the icon 86 corresponding to audio data whose number of times of playback is equal to or more than a threshold by using the added virtual light in the three-dimensional space image.

Then, the CPU 20 uses the foreground image 84 to generate and display the artist image 83 in the display 13A.

Accordingly, the CPU 20 can easily notify the user of artists whose audio data is played back as many times as the threshold or more (that is, music often heard) via the artist list image 83.

Incidentally, the CPU 20 can make such a notification when the display is switched to the artist list image 83 in accordance with settings by the user in advance.

The CPU 20 can also make such a notification when the foreground image 84 is re-generated in accordance with a user's operation while the artist list image 83 is displayed Further, the CPU 20 can also make a similar notification by performing processing in the same manner when a display image presenting an audio title list, album name list, genre list, or play list is displayed.

In addition, the CPU 20 can also make a similar notification about audio data registered with a play list or artists with many possessed albums by performing processing in the same manner when a display image presenting an audio title list, album name list, or genre list or the artist list image 83 is displayed.

Further, each time photo image data is played back, the CPU 20 stores a playback history thereof in the storage medium 28. Then, when a display image presenting various lists to manage photo image data is displayed, the CPU 20 can make various notifications by performing processing in the same manner using the playback history of the photo image data.

Further, an application program is executed, the CPU 20 stores an execution history thereof in the storage medium 28.

Then, when a display image presenting various lists to manage application programs is displayed, the CPU 20 can make various notifications by performing processing in the same manner using the execution history of application programs.

[1-4. Home Image Display Switching Processing Procedure]

Next, a home image display switching processing procedure RT1 performed by the CPU 20 of the mobile terminal 10 will be described by using a flow chart shown in FIG. 25.

Figure 25:
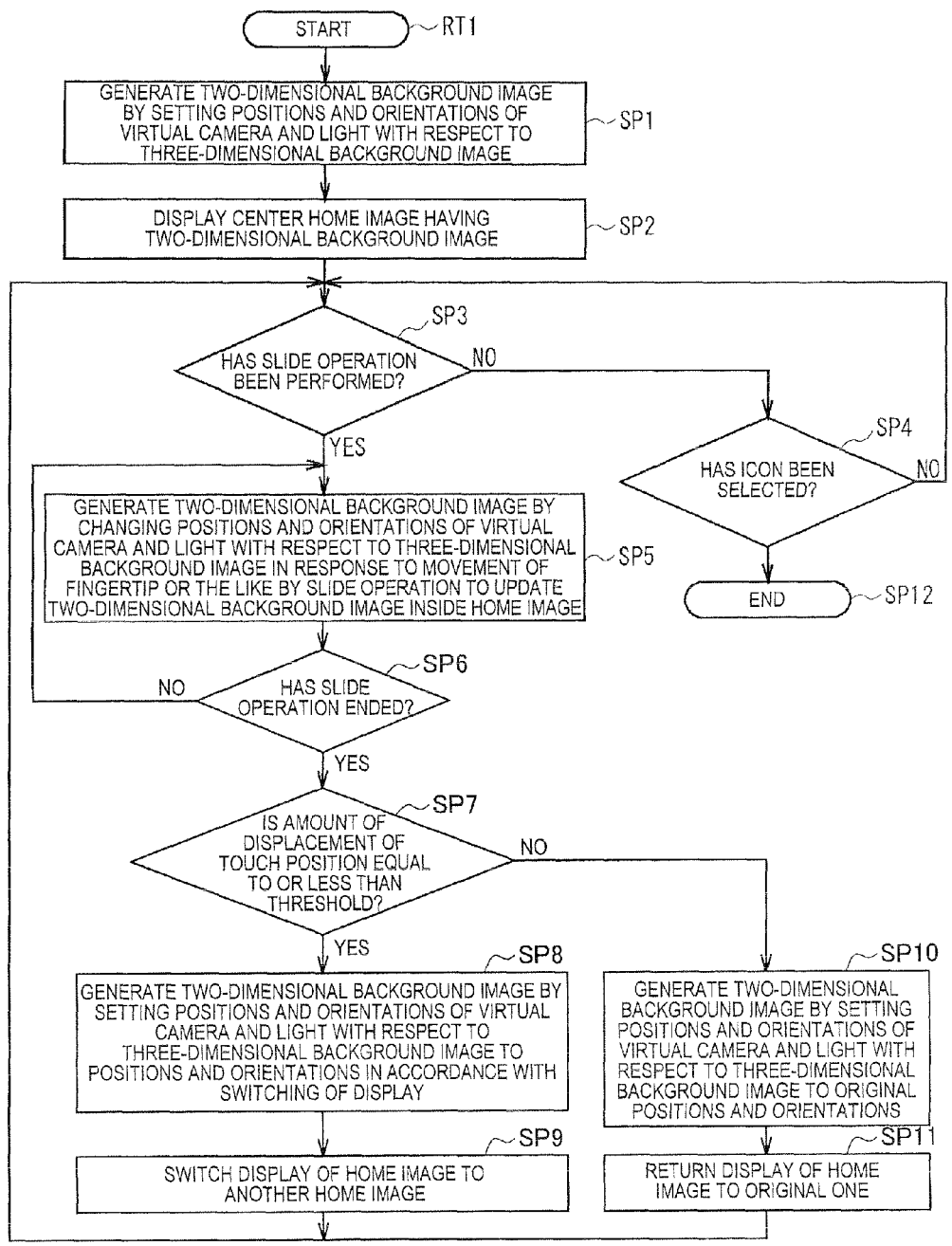
FIG. 25 is a flow chart showing a home image display switching processing procedure.

When the mobile terminal 10 is activated or switching of the display to the home image is instructed, the CPU 20 starts the home image display switching processing procedure RT1 shown in FIG. 25 according to a display switching program expanded on the RAM 22.

When the home image display switching processing procedure RT1 is started, in step SP1, the CPU 20 sets the position and orientation of the virtual camera 34 with respect to the three-dimensional background image 30 to the center camera position CP1 and the center camera orientation, respectively.

The CPU 20 also sets the position and orientation of the virtual light 35 with respect to the three-dimensional background image 30 to the center light position UP1 and the center light orientation, respectively.

Then, the CPU 20 generates the two-dimensional background image 40 drawn and represented as if to look squarely from the front side of the image while the center portion of the three-dimensional background image 30 being uniformly illuminated before proceeding to the next step SP2.

In step SP2, the CPU 20 generates the center home image 41 having the two-dimensional background image 40 and displays the center home image 41 in the display 13A before proceeding to the next step SP3.

In step SP3, the CPU 20 determines whether a slide operation of the surface of the touch panel 13B in a left direction or a right direction is performed by the user.

If a negative result is obtained in step SP3, this means that, for example, switching of the home image (the center home image 41 in this case) to another home image is not instructed by the user. If the negative result is obtained in step SP3, the CPU 20 proceeds to step SP4.

In step SP4, the CPU 20 determines whether the icons 42 to 45 or the additional icon 60 is selected on the home image (the center home image 41 in this case) by the user via the touch panel 13B.

If a negative result is obtained in step SP4, this means that switching of the home image (the center home image 41 in this case) to a menu image or another display image is not instructed by the user. If the negative result is obtained in step SP4, the CPU 20 returns to step SP3.

Thus, the CPU 20 subsequently repeats processing in steps SP3 and SP4 cyclically until an affirmative result is obtained in step SP3 or step SP4.

Accordingly, the CPU 20 awaits, for example, an instruction to switch the display of the home image by the user.

If an affirmative result is obtained in step SP3, this means that switching of the display of the home image to another home image may be instructed because a slide operation of the display of the touch panel 13B in the left direction or the right direction is performed by the user. If the affirmative result is obtained in step SP3, the CPU 20 proceeds to the next step SP5.

In step SP5, the CPU 20 generates a two-dimensional background image by changing the positions and orientations of the virtual camera 34 and light 35 with respect to the three-dimensional background image 30 in response to movement of the fingertip or the like by the slide operation. Accordingly, the CPU 20 updates the two-dimensional background image inside the home image before proceeding to the next step SP6.

In step SP6, the CPU 20 determines whether the slide operation of the surface of the touch panel 13B in the left direction or the right direction by the user has completed.

If a negative result is obtained in step SP6, this means that, for example, the slide operation to switch the display of the home image to another home image is being performed by the user.

The negative result also means that, for example, the additional icon 60 presented after the display of the home image is switched to another home image is being checked by the user. If the negative result is obtained in step SP6, the CPU 20 returns to step SP5.

Thus, the CPU 20 subsequently repeats processing in steps SP5 and SP6 cyclically until an affirmative result is obtained in step SP6.

Accordingly, the CPU 20 awaits, for example, completion of the slide operation by the user while causing the display 13A to display two-dimensional background images inside the home image as an animation.

If the affirmative result is obtained in step SP6 with the completion of the slide operation, the CPU 20 proceeds to the next step SP7.

In step SP7, the CPU 20 determines whether the amount of displacement of the touch position from the start to end of the slide operation is equal to or more than a threshold.

If an affirmative result is obtained in step SP7 this means that switching of the display of the home image to another home image is instructed by the user. If the affirmative result is obtained in step SP7, the CPU 20 proceeds to the next step SP8.

In step SP8, the CPU 20 generates a two-dimensional background image by setting the positions and orientations of the virtual camera 34 and light 35 with respect to the three-dimensional background image 30 to positions and orientations in accordance with the direction of the slide operation performed at this point to switch the display before proceeding to the next step SP9.

In step SP9, the CPU 20 generates another home image having the two-dimensional background image and switches the display of the home image in the display 13A to the other home image before returning to step SP3.

If a negative result is obtained in step SP7, by contrast, this means that switching of the display of the home image to another home image is not instructed by the user. If the negative result is obtained in step SP7, the CPU 20 proceeds to step SP10.

In step SP10, the CPU 20 generates a two-dimensional background image by bringing the positions and orientations of the virtual camera 34 and light 35 with respect to the three-dimensional background image 30 back to settings of the positions and orientations before the change before proceeding to step SP11.

In step SP11, the CPU 20 generates a home image having the two-dimensional background image to bring the display of the home image in the display 13A back to the original one (that is, by bringing back the state before the two-dimensional background image is updated) before returning to step SP3.

Thus, the CPU 20 subsequently repeats processing in steps SP3 and SP5 to SP11 cyclically each time an affirmative result is obtained in step SP3 until an affirmative result is obtained in step SP4.

Accordingly, each time switching of the display of the home image to another home image is instructed by the user, the CPU 20 switches the display of the home image to another home image accordingly.

Incidentally, if an affirmative result is obtained in step SP4, this means that switching of the display of the home image to another home image is instructed by the user.

If the affirmative result is obtained in step SP4, the CPU 20 proceeds to the next step SP12 to complete the home image display switching processing procedure RT1.

[1-5. Hierarchical Image Display Switching Processing Procedure]

Next, a hierarchical image display switching processing procedure RT2 performed by the CPU 20 of the mobile terminal 10 will be described by using a flow chart shown in FIG. 26.

Figure 26:
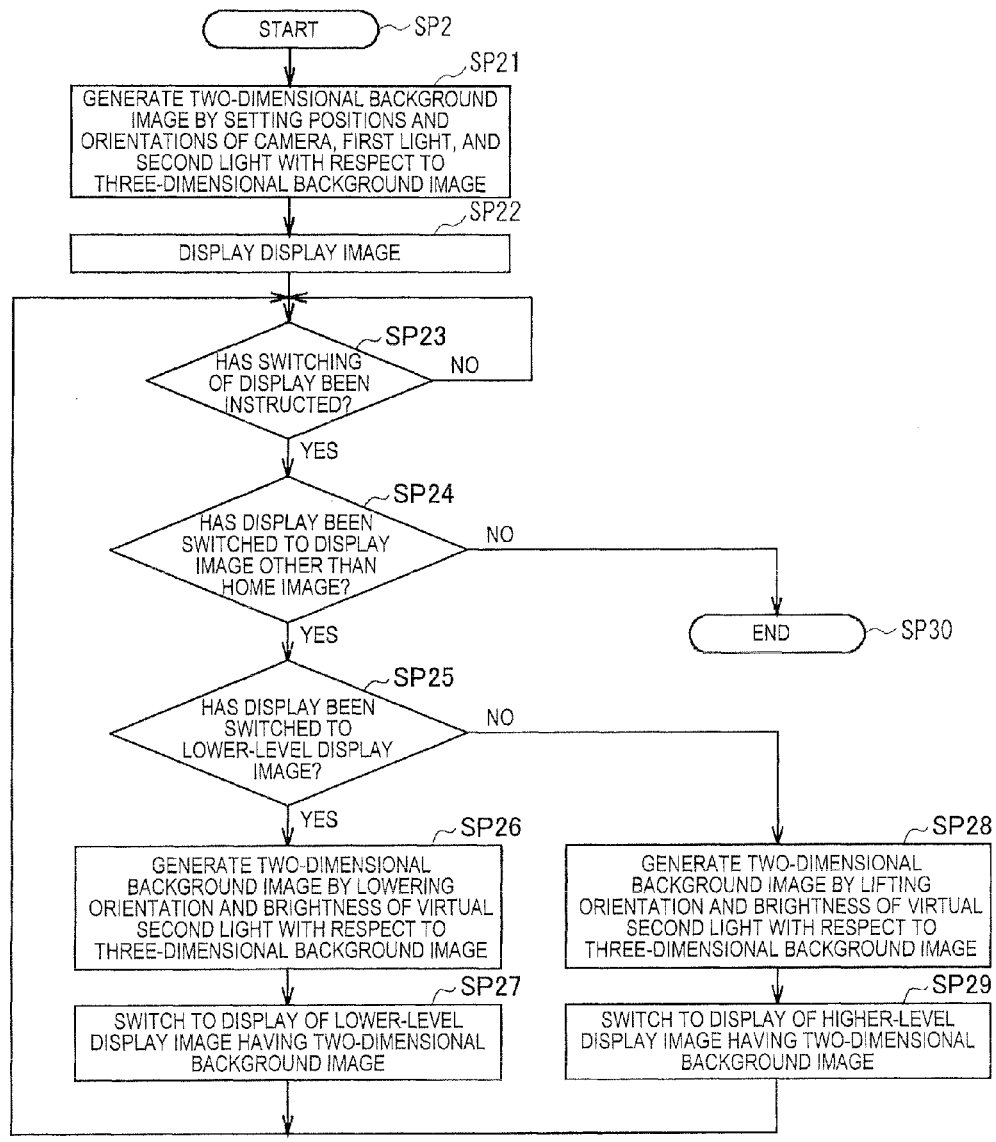
FIG. 26 is a flow chart showing a hierarchical image display switching processing procedure.

If switching of the display of the home image to a menu image or another home image is instructed by the user, the CPU 20 starts the hierarchical image display switching processing procedure RT2 shown in FIG. 26 according to the display switching program expanded on the RAM 22.

When the hierarchical image display switching processing procedure RT2 is started, in step SP21, the CPU 20 sets the position and orientation of the virtual camera 34 with respect to the three-dimensional background image 30 to the center camera position CP1 and the center camera orientation, respectively.

The CPU 20 sets the position, orientation, and brightness of the virtual first light 65 with respect to the three-dimensional background image 30 to the second left-side light position LP3, third left back light orientation, and reference brightness, respectively.

Further, the CPU 20 sets the position, orientation, and brightness of the virtual second light 66 with respect to the three-dimensional background image 30 to the center light position LP1, first down light orientation, and first brightness, respectively.

Accordingly, the CPU 20 illuminates the lower left corner in the center portion of the three-dimensional background image 30 slightly brighter, the upper right portion darker than the lower left corner as a whole, and the bottom end of the image darker than the top end of the image.

In this state, the CPU 20 generates a two-dimensional background image drawn and represented as if to look squarely at the center portion of the three-dimensional background image 30 from the front side of the image before proceeding to the next step SP22.

In step SP22, the CPU 20 generates a display image (a menu image or another display image) having the two-dimensional background image and displays the display image in the display 131 before proceeding to the next step SP23.

In step SP23, the CPU 20 awaits an instruction to switch the display by the user.

Then, if an instruction to switch the display by the user is recognized in step SP23, the CPU 20 proceeds to the next step SP24.

In step SP24, the CPU 20 determines whether switching of the display instructed by the user at this point is switching of the display to a display image other than the center home image 41.

If an affirmative result is obtained in step SP24, this means that switching of the display to a higher-level or lower-level display image is instructed. If the affirmative result is obtained in step SP24, the CPU 20 proceeds to the next step SP25.

In step SP25, the CPU 20 determines whether switching of the display instructed by the user at this point is switching of the display to a lower-level display image.

If an affirmative result is obtained in step SP25, this means that switching of the display image currently displayed in the display 13A to a lower-level display image is instructed. If the affirmative result is obtained in step SP25, the CPU 20 proceeds to the next step SP26.

In step SP26, the CPU 20 sets the orientation and brightness of the virtual second light 66 with respect to the three-dimensional background image 30 by lowering the orientation and brightness used to generate the two-dimensional background image for the display image currently displayed by one level.

Accordingly, the CPU 20 illuminates the lower left corner in the center portion of the three-dimensional background image 30 slightly brighter and the upper right portion darker than when the two-dimensional background image for the display image currently displayed is generated as a whole.

In this state, the CPU 20 generates a two-dimensional background image drawn and represented as if to look squarely at the center portion of the three-dimensional background image 30 from the front side of the image before proceeding to the next step SP27.

In step SP27, the CPU 20 generates a lower-level display image having the two-dimensional background image and switches the display of the display image in the display 13A to the lower-level display image before returning to step SP23.

If a negative result is obtained in step SP25, by contrast, this means that switching of the display image currently displayed in the display 13A to a higher-level display image is instructed. If the negative result is obtained in step SP25, the CPU 20 proceeds to step SP28.

In step SP28, the CPU 20 sets the orientation and brightness of the virtual second light 66 with respect to the three-dimensional background image 30 by lifting the orientation and brightness used to generate the two-dimensional background image for the display image currently displayed by one level.

Accordingly, the CPU 20 illuminates the lower left corner in the center portion of the three-dimensional background image 30 slightly brighter and the upper right portion slightly brighter than when the two-dimensional background image for the display image currently displayed is generated as a whole.

In this state, the CPU 20 generates a two-dimensional background image drawn and represented as if to look squarely at the center portion of the three-dimensional background image 30 from the front side of the image before proceeding to the next step SP29.

In step SP29, the CPU 20 generates a higher-level display image having the two-dimensional background image and switches the display of the display image in the display 13A to the higher-level display image before returning to step SP23.

Thus, the CPU 20 subsequently repeats processing in steps SP23 to SP29 cyclically until an affirmative result is obtained in step SP24.

Accordingly, each time switching of the display of the display image in the display 13A to the display of a lower-level or higher-level display image is instructed by the user, the CPU 20 switches the display to the lower-level or higher-level display image accordingly.

Incidentally, if a negative result is obtained in step SP24 described above, this means that switching of the display of the display image in the display 13A to the display of the center home image 41 is instructed by the user.

If the negative result is obtained in step SP24, the CPU 20 proceeds to step SP30 to complete the hierarchical image display switching processing procedure RT2.

[1-6. Scroll Display Processing Procedure]

Next, a scroll display processing procedure RT3 performed by the CPU 20 of the mobile terminal 10 will be described by using a flow chart shown in FIG. 27.

Figure 27:
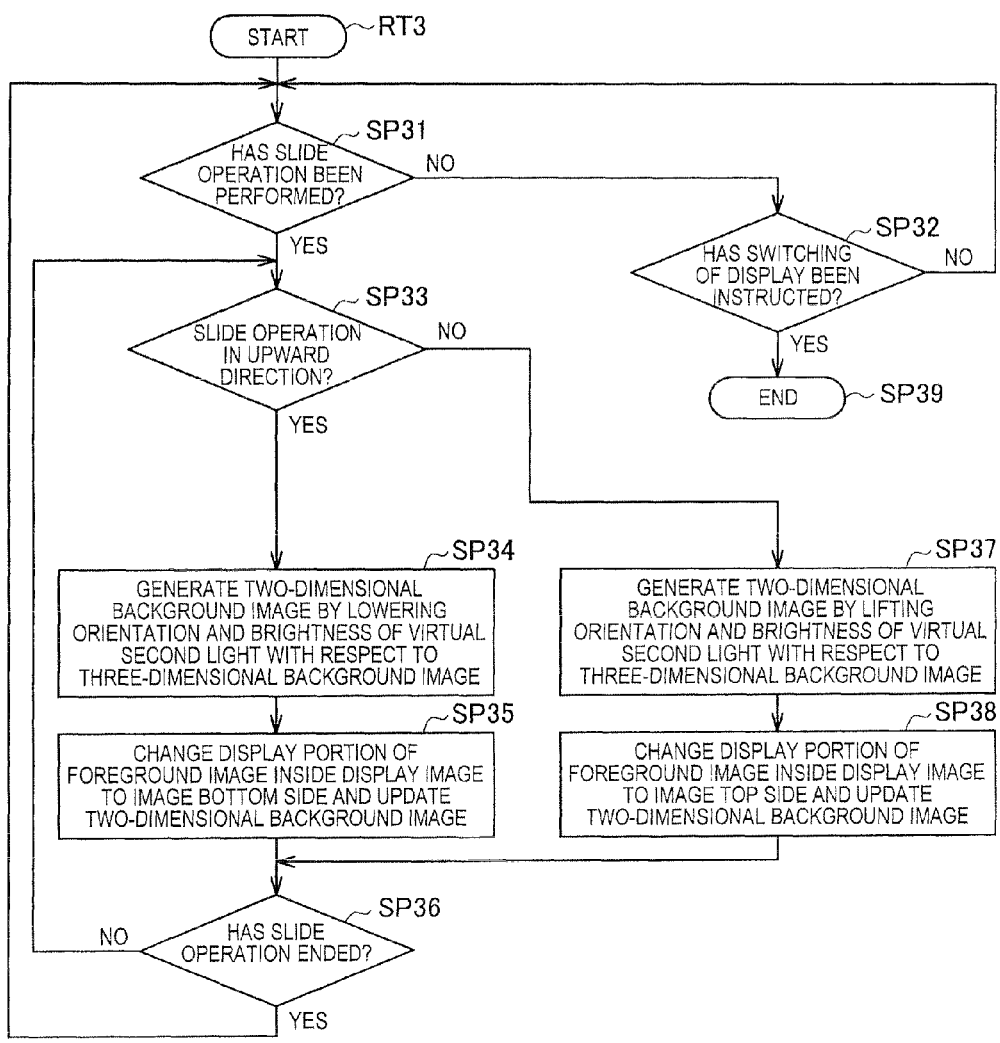
FIG. 27 is a flow chart showing a scroll display processing procedure.

If the display is switched to a lower-level or higher-level display image having a scrollable foreground image in accordance with an instruction to switch the display, the CPU 20 starts the scroll display processing procedure RT3 shown in FIG. 27 according to the display switching program expanded on the RAM 22.

After the scroll display processing procedure RT3 is started, in step SP31, the CPU 20 determines whether a slide operation of the surface of the touch panel 13B in the downward direction or the upward direction is performed by the user.

If a negative result is obtained in step SP31, this means that display content of the display image is being checked by the user or switching of the display to the home image or a lower-level or higher-level display image is instructed. If the negative result is obtained in step SP31, the CPU 20 proceeds to step SP32.

In step SP32, the CPU 20 determines whether switching of the display to the home image or a lower-level or higher-level display image is instructed by the user.

If a negative result is obtained in step SP32, this means that display content of the display image is being checked by the user or scrolling of the foreground image is instructed. If the negative result is obtained in step SP32, the CPU 20 returns to step SP31.

Thus, the CPU 20 subsequently repeats processing in steps SP31 and SP32 cyclically until an affirmative result is obtained in step SP31 or step SP32.

Accordingly, the CPU 20 awaits an instruction to scroll the foreground image or an instruction to switch the display to the home image or another display image by the user.

If an affirmative result is obtained in step SP31, this means that a slide operation on the surface of the touch panel 13B in the upward direction or the downward direction is performed to instruct scrolling of the foreground image. If the affirmative result is obtained in step SP31, the CPU 20 proceeds to the next step SP33.

In step SP33, the CPU 20 determines whether the performed slide operation is a slide operation in the upward direction.

If an affirmative result is obtained in step SP33, this means that a slide operation in the upward direction is performed by the user to view the bottom side that is not yet displayed of the foreground image inside the display image. If the affirmative result is obtained in step SP33, the CPU 20 proceeds to the next step SP34.

In step SP34, the CPU 20 lowers the orientation and brightness of the virtual second light 66 with respect to the three-dimensional background image 30 in response to movement of the fingertip or the like by the slide operation.

Accordingly, the CPU 20 illuminates the upper right portion in the center portion of the three-dimensional background image 30 slightly darker as a whole.

In this state, the CPU 20 generates a two-dimensional background image drawn and represented as if to look squarely at the center portion of the three-dimensional background image 30 from the front side of the image before proceeding to the next step SP35.

Accordingly, in step SP35, the CPU 20 changes the display portion of the foreground image to the bottom end side of the image in response to movement of the fingertip or the like by the slide operation and also updates the two-dimensional background image in the display image currently displayed in the display 13A before proceeding to step SP36.

In step SP36, the CPU 20 determines whether the slide operation performed in the display of the touch panel 13B by the user has completed.

If a negative result is obtained in step SP36, this means that the slide operation is being performed by the user to change the display portion of the foreground image. If the negative result is obtained in step SP36, the CPU 20 returns to step SP33.

If a negative result is obtained in step SP33, this means that a slide operation in the downward direction is performed by the user to view the top side that is not yet displayed of the foreground image inside the display image. If the negative result is obtained in step SP33, the CPU 20 proceeds to step SP37.

In step SP37, the CPU 20 lifts the orientation and brightness of the virtual second light 66 with respect to the three-dimensional background image 30 in response to movement of the fingertip or the like by the slide operation.

Accordingly, the CPU 20 illuminates the upper right portion in the center portion of the three-dimensional background image 30 slightly brighter as a whole.

In this state, the CPU 20 generates a two-dimensional background image drawn and represented as if to look squarely at the center portion of the three-dimensional background image 30 from the front side of the image before proceeding to the next step SP38.

Accordingly, in step SP38, the CPU 20 changes the display portion of the foreground image to the top end side of the image in response to movement of the fingertip or the like by the slide operation and also updates the two-dimensional background image in the display image currently displayed in the display 13A before proceeding to step SP36.

Then, in step SP36, a slide operation is being performed by the user to change the display portion of the foreground image and if a negative result is obtained, the CPU 20 returns to step SP33.

Thus, the CPU 20 subsequently repeats processing in steps SP33 to SP38 cyclically until an affirmative result is obtained in step SP36.

Accordingly, the CPU 20 scrolls the foreground image in the upward direction in response to movement of the fingertip or the like by the slide operation and also updates the two-dimensional background image in the display image currently displayed in the display 13A while a slide operation in the upward direction is performed by the user.

Also, the CPU 20 scrolls the foreground image in the downward direction in response to movement of the fingertip or the like by the slide operation and also updates the two-dimensional background image in the display image currently displayed in the display 13A while a slide operation in the downward direction is performed by the user.

If the affirmative result is obtained in step SP36 with the completion of the slide operation, the CPU 20 proceeds to step SP31.

Thus, the CPU 20 subsequently repeats processing in steps SP31 to SP38 cyclically until an affirmative result is obtained in step SP32.

Accordingly, each time a slide operation in the upward direction is performed by the user, the CPU 20 scrolls the foreground image in the upward direction in response to movement of the fingertip or the like by the slide operation and also updates the two-dimensional background image in the display image currently displayed in the display 13A.

Also, each time a slide operation in the downward direction is performed by the user, the CPU 20 scrolls the foreground image in the downward direction in response to movement of the fingertip or the like by the slide operation and also updates the two-dimensional background image in the display image currently displayed in the display 13A.

Then, if an affirmative result is obtained in step SP32, this means that switching of the display to the home image or a lower-level or higher-level display image is instructed by the user.

If the affirmative result is obtained in step SP32, the CPU 20 proceeds to step SP39 to complete the scroll display processing procedure RT3.

[1-7. Operation and Effect of Embodiment]

In the above configuration, if the display of the home image in the display 13A is instructed to switch to another home image, the mobile terminal 10 switches the display of the home image to the other home image having a two-dimensional background image in a visible state indicating whether the display is switchable.

If the display of a higher-level display image in the display 13A is instructed to switch to a lower-level display image, the mobile terminal 10 switches the display of the higher-level display image to the lower-level display image having a two-dimensional background image in a visible state indicating whether the display is switchable.

Further, if the display of a lower-level display image in the display 13A is instructed to switch to a higher-level display image, the mobile terminal 10 switches the display of the lower-level display image to the higher-level display image having a two-dimensional background image in a visible state indicating whether the display is switchable.

Therefore, if the display of the home image, a lower-level display image, or a higher-level display image in the display 13A is switched, the mobile terminal 10 can cause the user to easily recognize whether the display of the home image, the lower-level display image, or the higher-level display image after the switching is switchable based on the visible state of a two-dimensional background image held by the home image, the lower-level display image, or the higher-level display image after the switching.

According to the above configuration, if the display of a display image in the display 13A is instructed to switch, the mobile terminal 10 switches the display of the display image to a display image having a two-dimensional background image in a visible state indicating whether the display is switchable. Accordingly, if the display of a display image in the display 13A is switched, the mobile terminal 10 can cause the user to easily recognize whether the display of the display image after the switching is switchable based on the visible state of a two-dimensional background image held by the display image after the switching. Thus, the mobile terminal 10 can cause the user to make the most of switching of the display of display images.

If the display of a display image is instructed to switch, the mobile terminal 10 changes the position and orientation of the camera 34 and the position and orientation of the light 35 with respect to a three-dimensional background image to generate a two-dimensional background image in a visible state indicating whether the display is switchable for the display image after the switching.

Therefore, the mobile terminal 10 can cause the user to easily recognize whether the display is switchable without arranging a structural element such as a marker or scroll bar for notification whether the display is switchable.

Thus, the mobile terminal 10 can use a display image effectively for the presentation of functions or information since it is not necessary to arrange a marker or scroll bar indicating whether the display is switchable in the display image.

In addition, if the display of a display image having a two-dimensional background image is switchable depending on a visible state of the two-dimensional background image, that is, the orientation of drawing of the three-dimensional background image or the method of illumination thereof, the mobile terminal 10 can also cause the user to recognize to which extent the display of display images can subsequently be switched to sequentially.

Further, if switching of the display of a display image is instructed, the mobile terminal 10 changes the orientation of the first light 65 and the orientation and brightness of the second light 66 with respect to a three-dimensional background image to generate a two-dimensional background image in a visible state indicating whether the display is switchable for the display image after the switching.

Therefore, the mobile terminal 10 can cause the user to easily recognize whether the display is switchable without arranging a structural element such as a marker or scroll bar to indicate whether the display is switchable.

Thus, the mobile terminal 10 can simplify the configuration of the display image and use a display image effectively for the presentation of functions or information since it is not necessary to arrange a marker or scroll bar indicating whether the display is switchable in the display image.

In addition, if the display of a display image having a two-dimensional background image is switchable depending on a visible state of the two-dimensional background image, that is, the method of illumination of the three-dimensional background image, the mobile terminal 10 can also cause the user to recognize to which extent the display of display images can subsequently be switched to sequentially.

Then, by indicating whether the display is switchable based on the visible state of a two-dimensional background image inside a display image, if, for example, a function is selected as an icon, the mobile terminal 10 can also cause the user to recognize whether the realization of the function involves switching of the display of the display image.

In other words, even if a function is realized without switching the display image when the function is selected as an icon, the mobile terminal 10 can cause the user to easily recognize this and, for example, false recognition of a failure can be prevented by non-switching of the display image.

Further, the mobile terminal 10 uses the three-dimensional background image 30 in common for the generation of two-dimensional background images for various display images and sets the positions and orientations of the virtual camera 34 and light 35 with respect to the three-dimensional background image 30 by a setting method in accordance with the type of display switching to generate a two-dimensional background image in a visible state indicating whether the display of the display image is switchable.

Therefore, based on the visible state of the two-dimensional background image, the mobile terminal 10 can cause the user to easily recognize the type of display switching while causing the user to easily recognize that the display of the display image is switchable.

That is, based on the visible state of the two-dimensional background image, the mobile terminal 10 can cause the user to easily distinguish and recognize the type of display switching such as switching of the display of work areas for the presentation of functions and information and the selection of functions and information treated equally (that is, of the plurality of home images described above), switching of the display for the presentation following a hierarchy of functions and information associated hierarchically, and switching of the display portion such as scrolling of a foreground image.

<2. Modifications>

[2-1. Modification 1]

In the embodiment described above, a case when each time switching of the display of a display image is instructed, a two-dimensional background image in a visible state indicating whether the display is switchable is generated by using the three-dimensional background image 30 described above with reference to FIG. 4 is described.

However, the present technology is not limited to such a case and each time switching of the display of a display image is instructed, a two-dimensional background image in a visible state indicating whether the display is switchable is generated by using other three-dimensional background images configured in various ways.

In addition, according to the present technology, a two-dimensional background image in a visible state indicating whether the display is switchable may be generated by using differently configured three-dimensional background images for each type of display images used for switching of a series of display or each type of display switching.

Further, according to the present technology, a two-dimensional background image in a visible state indicating whether the display is switchable may be generated and stored in the ROM 21 or the storage medium 28 in advance for each display image by using or without using a three-dimensional background image.

Then, according to the present technology, each time switching of the display of a display image is instructed, the two-dimensional background image corresponding to the display image after switching may selectively be used from among stored two-dimensional background images to generate the display image.

According to the above configuration, the present technology can reduce a processing load for display switching for a load spared by eliminating the need to generate a two-dimensional background image each time switching of the display of a display image is instructed.

Figure 28:
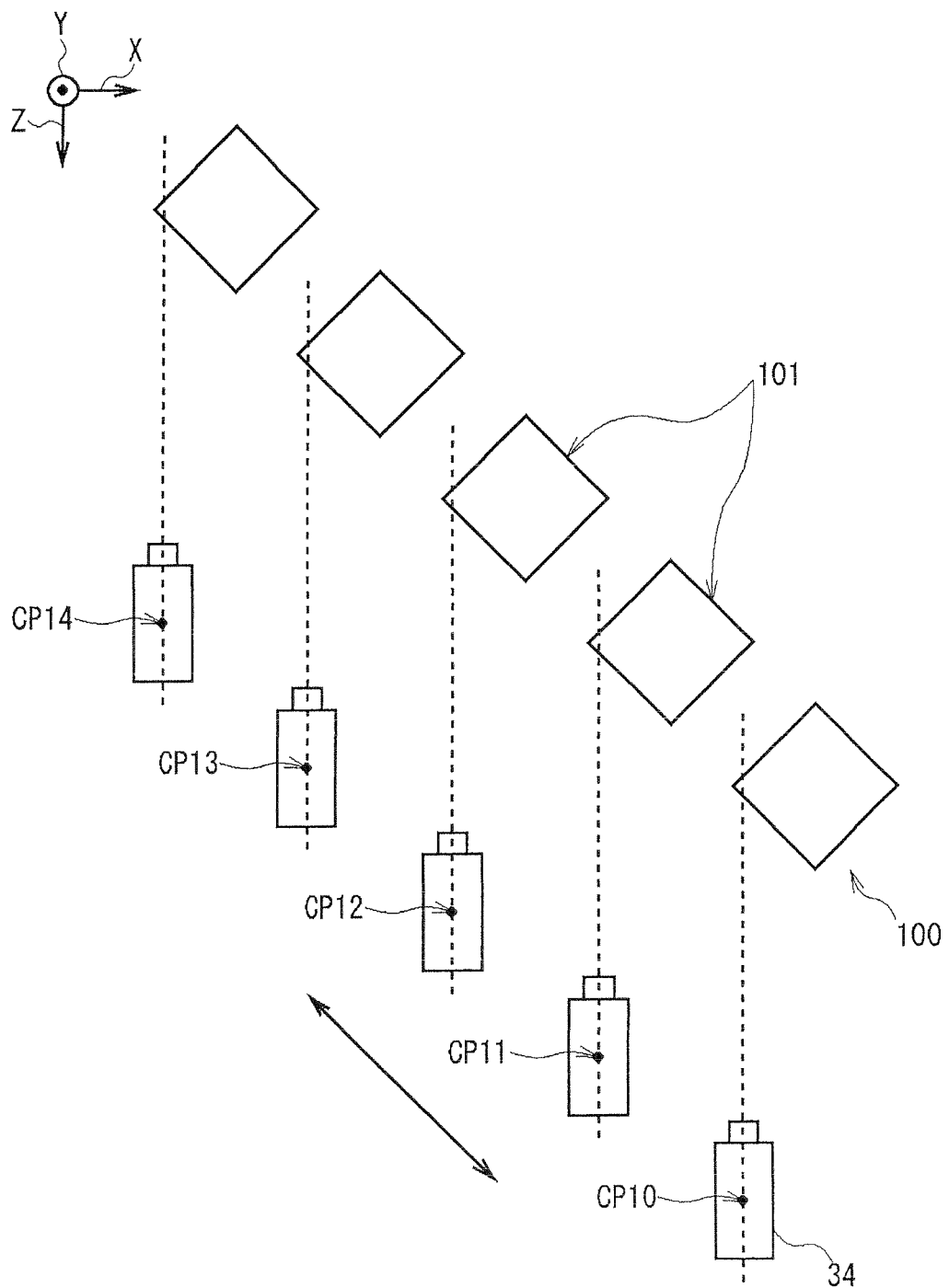
FIG. 28 is an approximate top view offering the description of position settings of virtual cameras for a three-dimensional background image.

Here, the generation of two-dimensional background images using a three-dimensional background image 100 as shown in FIG. 28 when according to the present technology, for example, the display of higher-level display images is sequentially switched to lower-level display images will be described.

In this case, the three-dimensional background image 100 is generated by a plurality of cubic objects 101 as cubic three-dimensional objects being equidistantly arranged in a row on a virtual plane parallel to the ZX plane in a three-dimensional virtual space represented by a three-dimensional virtual space coordinate system from a right front side to a left back side of the image.

Then, for the three-dimensional background image 100, the number of the cubic objects 101 is chosen to be equal to the number of display images whose display is sequentially switched.

As the position of the virtual camera 34 with respect to the three-dimensional background image 100, a plurality of positions CP10 to CP14 opposed to one of the cubic objects 101 along an image depth direction is chosen on a virtual straight line on the left front side of the image parallel to a sequence of the plurality of cubic objects 101.

That is, each of the positions CP10 to CP14 of the virtual camera 34 is chosen so that the distance to one of the cubic objects 101 along the image depth direction becomes equal.

In the description that follows, the plurality of positions CP10 to CP14 chosen for the virtual camera 34 is also called a first camera position CP10, a second camera position CP11, ..., and a fifth camera position CP14, respectively, from the right front side to the left back side of the image.

Further, each of the orientations of the virtual camera 34 in the first to fifth camera positions CP10 to CP14 is chosen as an orientation that makes the respective camera optical axis parallel to the ZX plane and the image depth direction (that is, the Z axis) to reach one of the cubic objects 101 opposed along the image depth direction.

In the description that follows, the orientations of the virtual camera 34 in the first to fifth camera positions CP10 to CP14 are also called a first camera orientation, a second camera orientation, ..., and a fifth camera position from the right front side to the left back side of the image.

Then, according to the present technology, the depth of field of the virtual camera 34 is set to near the arrangement of one of the cubic objects 101 opposed along the image depth direction regardless of to which of the first to fifth camera positions CP10 to CP14 the position of the camera 34 is set.

In this state, according to the present technology, when a highest-level display image is displayed in response to an instruction to switch the display, the position and orientation of the virtual camera 34 with respect to the three-dimensional background image 30 are set to the first camera position CP10 and the first camera orientation, respectively Then, according to the present technology, a two-dimensional background image is generated according to the settings by a perspective projection as if to photograph a predetermined range near the camera optical axis of the virtual camera 34 with respect to the three-dimensional background image 100 from the front side of the image.

Also according to the present technology, when the display of the highest-level display image is switched to a lower-level display image in response to an instruction to switch the display, the position and orientation of the virtual camera 34 with respect to the three-dimensional background image 30 are set to the second camera position CP11 and the second camera orientation, respectively.

Then, according to the present technology, a two-dimensional background image is generated according to the settings by a perspective projection as if to photograph a predetermined range near the camera optical axis of the virtual camera 34 with respect to the three-dimensional background image 100 from the front side of the image.

In this manner, according to the present technology, when the display of a higher-level display image is sequentially switched to a lower-level display image in response to an instruction to switch the display, the position of the virtual camera 34 with respect to the three-dimensional background image 30 is sequentially set from the first camera position CP11 to the fifth camera position CP14.

Also according to the present technology, the orientation of the camera 34 is sequentially set from the first orientation to the fifth orientation in accordance with settings of the position of the virtual camera 34 with respect to the three-dimensional background image 30.

Then, according to the present technology, a two-dimensional background image is generated by a perspective projection as if to photograph the predetermined range near the camera optical axis of the virtual camera 34 with respect to the three-dimensional background image from the front side of the image according to settings of the position and orientation of the camera 34 with respect to the three-dimensional background image 100 and the advance setting of the depth of field.

Figure 29A:
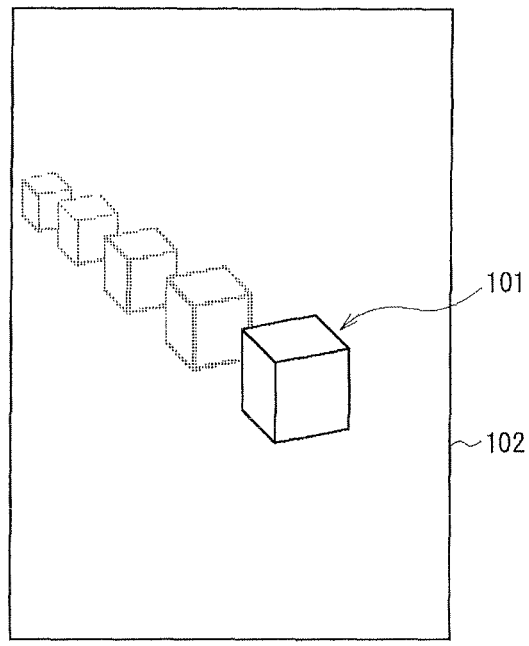
FIG. 29 is an approximate perspective view showing a modification of the two-dimensional background image.
Figure 29B:
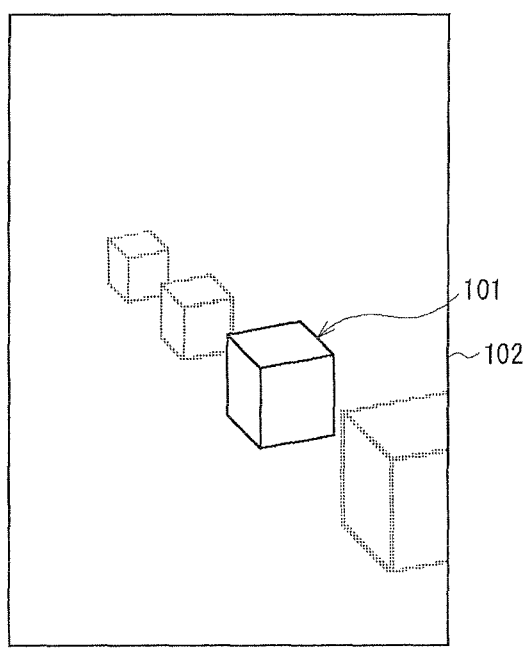

According to the present technology, as shown in FIGS. 29A and 29B, the plurality of cubic objects 101 is shown as being arranged from the center to a left depth side of the image through a two-dimensional background image 102 inside a highest-level display image.

Also according to the present technology, the contour of only one (the first one in the order of arrangement) of the cubic objects 101 positioned in the center of the image can be made clear and the contour of the other cubic objects 101 positioned on the left depth side from the center can be shown in a blurred state by the two-dimensional background image 102.

Then, according to the present technology, each time the display of a higher-level display image is sequentially switched to a lower-level display image, one of the plurality of cubic objects 101 can be shown to move to the right front side of the image to disappear from inside the image through the two-dimensional background image 102 inside the lower-level display image.

Also according to the present technology, the contour of only one of the cubic objects 101 sequentially moved to the center of the image is made clear and the contour of the other cubic objects 101 positioned on the left depth side or the right front side from the center can be shown in a blurred state by the two-dimensional background image 102.

Thus, according to the present technology, even in the above configuration, each time the display of a higher-level display image is sequentially switched to a lower-level display image, the user can be caused to easily recognize whether the display can further be switched based on the visible state of the two-dimensional background image 102 inside the display image after the switching.

Also according to the present technology, each time the display of a higher-level display image is sequentially switched to a lower-level display image, the user can be caused to easily recognize that functions and information are narrowed down for selection by sequentially following from a higher level to a lower level based on the visible state of the two-dimensional background image 102 inside the display image after the switching.

Further, according to the present technology, each time the display of a higher-level display image is sequentially switched to a lower-level display image, the user can be caused to intuitively recognize to which extent the display can subsequently be switched based on the visible state of the two-dimensional background image 102 inside the display image after the switching.

Then, according to the present technology, when the display of a lower-level display image is sequentially switched to a higher-level display image, the two-dimensional background image 102 is generated by following the above procedure in the opposite direction.

Accordingly, according to the present technology, each time the display of a lower-level display image is sequentially switched to a higher-level display image, one of the plurality of cubic objects 101 can be shown to appear inside the image from the right front side of the image to move to the left depth side through the two-dimensional background image 102 inside the higher-level display image.

According to the present technology, also in this case, the contour of only one of the cubic objects 101 sequentially moved to the center of the image is made clear and the contour of the other cubic objects 101 positioned on the left depth side or the right front side from the center can be shown in a blurred state by the two-dimensional background image 102.

Thus, according to the present technology, even in the above configuration, each time the display of a lower-level display image is sequentially switched to a higher-level display image, the user can be caused to easily recognize whether the display can further be switched based on the visible state of the two-dimensional background image 102 inside the display image after the switching.

Also according to the present technology, each time the display of a lower-level display image is sequentially switched to a higher-level display image, the user can be caused to easily recognize the sequential return from a lower level to a higher level based on the visible state of the two-dimensional background image 102 inside the display image after the switching.

Next, a case when the CPU 20 of the mobile terminal 10 actually performs a sequence of the above processing as a hierarchical image display switching processing procedure RT4 will be described by using a flow chart shown in FIG. 30.

Figure 30:
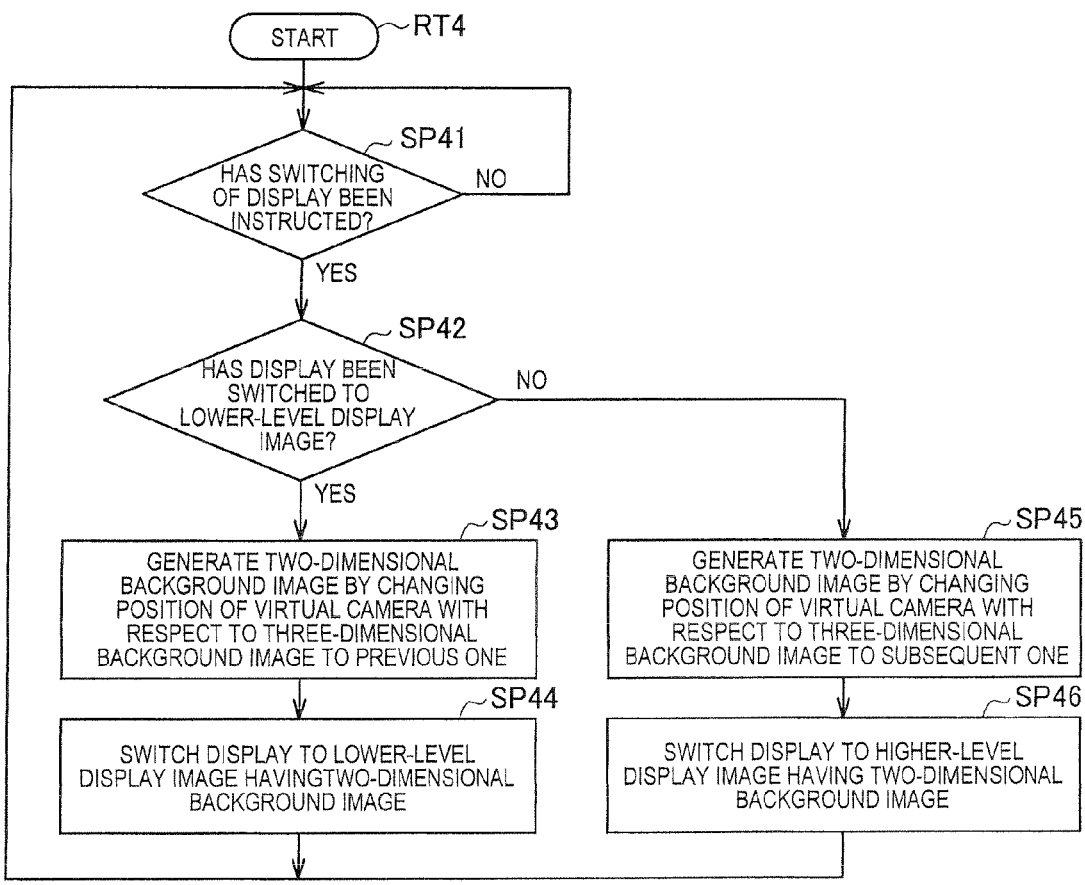
FIG. 30 is a flow chart showing a modification of the hierarchical image display switching processing procedure.

If, for example, a higher-level or lower-level display image is displayed in the display 13A, the CPU 20 starts the hierarchical image display switching processing procedure RT4 shown in FIG. 30 according to the display switching program expanded on the RAM 22.

If the hierarchical image display switching processing procedure RT4 is started, in step SP41, the CPU 20 awaits an instruction to switch the display of the display image.

Then, if an instruction to switch the display by the user is recognized in step SP41, the CPU 20 proceeds to the next step SP42.

In step SP42, the CPU 20 determines whether switching of the display instructed by the user at this point is switching of the display to a lower-level display image.

If an affirmative result is obtained in step SP42, this means that switching of the display image currently displayed in the display 13A to a lower-level display image is instructed. If the affirmative result is obtained in step SP42, the CPU 20 proceeds to the next step SP43.

In step SP43, the CPU 20 changes and sets the position of the virtual camera 34 with respect to the three-dimensional background image 100 to the previous position (that is, the image back side) of the position used when the display image currently displayed is generated.

The CPU 20 also sets the orientation of the virtual camera 34 with respect to the three-dimensional background image 100 to the orientation in the previous position of the position used when the display image currently displayed is generated.

Accordingly, the CPU 20 generates the two-dimensional background image 102 by a perspective projection as if to photograph a predetermined range near the camera optical axis of the virtual camera 34 with respect to the three-dimensional background image 100 from the front side of the image before proceeding to the next step SP44.

Then, in step SP44, the CPU 20 generates a lower-level display image having the two-dimensional background image 102 and switches the display of the display image in the display 13A to the lower-level display image before returning to step SP41.

If a negative result is obtained in step SP42, by contrast, this means that switching of the display image currently displayed in the display 13A to a higher-level display image is instructed. If the negative result is obtained in step SP42, the CPU 20 proceeds to step SP45.

In step SP45, the CPU 20 changes and sets the position of the virtual camera 34 with respect to the three-dimensional background image 100 to the subsequent position (that is, the image front side) of the position used when the display image currently displayed is generated.

The CPU 20 also sets the orientation of the virtual camera 34 with respect to the three-dimensional background image 100 to the orientation in the subsequent position of the position used when the display image currently displayed is generated.

Accordingly, the CPU 20 generates the two-dimensional background image 102 by a perspective projection as if to photograph a predetermined range near the camera optical axis of the virtual camera 34 with respect to the three-dimensional background image 100 from the front side of the image before proceeding to the next step SP46.

Then, in step SP46, the CPU 20 generates a higher-level display image having the two-dimensional background image 102 and switches the display of the display image in the display 13A to the higher-level display image before returning to step SP41.

In this manner, the CPU 20 repeats the processing in steps SP41 to SP46 while a lower-level or higher-level display image is displayed in the display 13A.

Accordingly, each time switching of the display of the display image is instructed by the user, the CPU 20 switches the display of the display image in the display 13A to a lower-level or higher-level display image.

[2-2. Modification 2]

In the above embodiment, a case when the positions of the virtual camera 34 and light 35 with respect to the three-dimensional background image 30 are set to various positions on a virtual arc around the perpendicular PE when the display of the home image is switched is described.

However, the present technology is not limited to such a case and when the display of the home image is switched, one of the positions of the virtual camera 34 and light 35 with respect to the three-dimensional background image 30 may be fixedly set to set only the other position to various positions on a virtual arc around the perpendicular PE.

According to the present technology, even in such a configuration, a two-dimensional background image in a visible state indicating whether the display is switchable can be obtained.

Also according to the present technology, when the display of the home image is switched, the position of the virtual light 35 with respect to the three-dimensional background image 30 is set to various positions on a virtual arc around the perpendicular PE.

Then, according to the present technology, the position of the virtual camera 34 with respect to the three-dimensional background image 30 may be set to various positions on a virtual straight line parallel to the image width direction while maintaining the camera optical axis parallel to the image depth direction.

According to the present technology, even in such a configuration, a two-dimensional background image in a visible state indicating whether the display is switchable can be obtained.

Further, according to the present technology, one object is shown on the deep wall one surface 32A of the three-dimensional background image 30 as a whole, but a different object, for example, a wallpaper of a pattern like the side face of an automobile from the front to the rear may be pasted in each portion along the image width direction.

That is, according to the present technology, a wallpaper of a pattern that allows the user to intuitively recognize to which portion in the whole a portion belongs when each portion is viewed along the image width direction may be pasted on the deep wall one surface 32A of the three-dimensional background image 30.

According to the present technology, even in such a configuration, a two-dimensional background image in a visible state indicating whether the display is switchable can be obtained.

Also according to the present technology, when the above configuration is adopted, the user can be caused to intuitively recognize the positioning of the relevant home image in a series of home images based on a portion of the wallpaper drawn in a two-dimensional background image inside the home image after the switching.

Then, according to the present technology, when the above configuration is adopted, even if the position of the virtual light 35 with respect to the three-dimensional background image 30 is fixedly set, a two-dimensional background image in a visible state indicating whether the display is switchable can be obtained.

Also according to the present technology, when the above configuration is adopted, even if the position of the virtual camera 34 with respect to the three-dimensional background image 30 is set to various positions on a virtual straight line parallel to the image width direction while maintaining the camera optical axis is parallel to the image depth direction, a two-dimensional background image in a visible state indicating whether the display is switchable can be obtained.

[2-3. Modification 3]

Further, in the above embodiment, a case when the position and orientation of the virtual camera 34 with respect to the three-dimensional background image 30 are fixedly set when the display of a display image is switched to a lower-level or higher-level display image is described.

However, the present technology is not limited to such a case and when the display of a display image is switched to a lower-level or higher-level display image, the position and orientation of the virtual camera 34 with respect to the three-dimensional background image 30 may be set to, like when, for example, the display of the home is switched, various positions and orientations.

According to the present technology, even in such a configuration, a two-dimensional background image in a visible state indicating whether the display is switchable can be obtained.

Then, according to the present technology, the configuration of a wallpaper described in Modification 2 may be added to the above configuration and even with such an added configuration, a two-dimensional background image in a visible state indicating whether the display is switchable can be obtained.

Also according to the present technology, when the display of a display image is switched to a lower-level or higher-level display image, the position of the virtual camera 34 with respect to the three-dimensional background image 30 may be set to various positions on a virtual straight line parallel to the image width direction while maintaining the camera optical axis parallel to the image depth direction.

According to the present technology, even in such a configuration, a two-dimensional background image in a visible state indicating whether the display is switchable can be obtained.

Then, according to the present technology, the configuration of a wallpaper described in Modification 2 may be added also to the above configuration and even with such an added configuration, a two-dimensional background image in a visible state indicating whether the display is switchable can be obtained.

Further, according to the present technology, when the display of a display image is switched to a lower-level or higher-level display image, the position and orientation of the first camera 65 with respect to the three-dimensional background image 30 may be set to various positions and orientations in such a way that at least a portion of illumination of a drawing portion of the three-dimensional background image 30 with respect to a two-dimensional background image is changed from illumination of other portions.

According to the present technology, even in such a configuration, a two-dimensional background image in a visible state indicating whether the display is switchable can be obtained.

Also according to the present technology, when the display of a display image is switched to a lower-level or higher-level display image, the brightness of a whole two-dimensional background image may be changed stepwise by setting the position and orientation of the virtual camera 34 and the second light 66 with respect to the three-dimensional background image 30 without using the first light 65.

According to the present technology, even in such a configuration, a two-dimensional background image in a visible state indicating whether the display is switchable can be obtained.

[2-4. Modification 4]

Further, in the above embodiment, a case when the position and orientation of the virtual first light 65 with respect to the three-dimensional background image 30 are fixedly set when the display portion of a foreground image is switched by scrolling is described.

However, the present technology is not limited to such a case and the virtual first light 65 may not be used when the display portion of a foreground image is switched by scrolling.

According to the present technology, even in such a configuration, a two-dimensional background image in a visible state indicating whether the display portion is switchable can be obtained.

[2-5. Modification 5]

Further, in the above embodiment, a case when a display switching apparatus according to the present technology is applied to the display switching apparatus 1 and the mobile terminal 10 described above with reference to FIGS. 1 to 30 is described.

However, the present technology is not limited to such a case and can be applied to other types of display switching apparatuses such as a personal computer, mobile phone, PDA (Personal Digital Assistance), game machine, electronic book reader, and TV set.

[2-6. Modification 6]

Further, in the above embodiment, a case when a display switching program according to the present technology is applied to a display switching program stored in the ROM 21 of the mobile terminal 10 in advance is described.

Then, in the above embodiment, a case when the CPU 20 of the mobile terminal 10 performs the home image display switching processing procedure RT1 described above with reference to FIG. 25 according to a display switching program is described.

In the above embodiment, a case when the CPU 20 of the mobile terminal 10 performs the hierarchical image display switching processing procedures RT2, RT4 described above with reference to FIGS. 26 and 30, respectively, according to a display switching program is also described.

Further, in the above embodiment, a case when the CPU 20 of the mobile terminal 10 performs the scroll display processing procedure RT3 described above with reference to FIG. 27 according to a display switching program is also described.

However, the present technology is not limited to such cases and a display switching program may be installed in the mobile terminal 10 from a computer readable storage medium in which a display switching program is stored.

Then, the CPU 20 may perform the home image display switching processing procedure RT1, the hierarchical image display switching processing procedures RT2, RT4, or the scroll display processing procedure RT3 according to the installed display switching program.

The mobile terminal 10 may also install a display switching program from outside by using a wire or wireless communication medium such as a local area network, the Internet, or digital satellite broadcasting.

The computer readable storage medium that installs a display switching program into the mobile terminal 10 to make the program executable may be realized by, for example, a package medium such as a flexible disk.

Also, the computer readable storage medium that installs a display switching program into the mobile terminal 10 to make the program executable may be realized by, for example, a package medium such as a CD-ROM (Compact Disc-Read Only Memory).

Further, the computer readable storage medium that installs a display switching program into the mobile terminal 10 to make the program executable may be realized by, for example, a package medium such as a DVD (Digital Versatile Disc).

Further, such a computer readable storage medium may be realized by a semiconductor memory or magnetic disk in which various programs are stored temporarily or permanently, as well as a package medium.

As a means for storing a display switching program in such computer readable storage media, a wire or wireless communication medium such as a local area network, the Internet, or digital satellite broadcasting may be used.

Further, a display switching program may be stored in a computer readable storage medium via various communication interfaces such as a router and modem.

[2-7. Modification 7]

Further, in the above embodiment, a case when the display 13A provided in the display unit 3 or the mobile terminal 10 described above with reference to FIGS. 1 to 30 is applied as a display unit that displays a display image having a background image is described.

However, the present technology is not limited to such cases and display units configured in various ways such as an external display connected to the mobile terminal 10 by wire or wirelessly may widely be applied.

[2-8. Modification 8]

Further, in the above embodiment, a case when two-dimensional background images generated from the three-dimensional background image 30 described above with reference to FIGS. 1 to 30 are applied as background images of display images is described.

However, the present technology is not limited to such cases and two-dimensional background images generated from three-dimensional background images configured in various ways such as a three-dimensional background image generated by only a plurality of belt-like three-dimensional objects being arranged and a three-dimensional background image generated by a different three-dimensional object being arranged in each portion along the image width direction can be applied.

Also the present technology may apply various other background images such as a background image generated as a two-dimensional plane image in advance without using any three-dimensional background image.

[2-9. Modification 9 ]

Further, in the above embodiment, a case when the operation unit 2 or the touch panel 13B described above with reference to FIGS. 1 to 30 is applied as an operation unit used to instruct the display unit to switch the display of a display image having a background image is described.

However, the present technology is not limited to such cases and various other operation units such as a pointing device like a mouse, track ball, and joy stick and an operation button provided on the cabinet surface.

[2-10. Modification 10 ]

Further, in the above embodiment, a case when the control unit 4 or the CPU 20 described above with reference to FIGS. 1 to 30 is applied as a control unit that exercises control so that when switching of the display of a display image is instructed via the operation unit, the display of the display image on the display unit is switched to a display image having a background image in a visible state indicating whether the display is switchable is described.

However, the present technology is not limited to such cases and a hardware-configured control circuit that exercises control so that when switching of the display of a display image is instructed via the operation unit, the display of the display image on the display unit is switched to a display image having a background image in a visible state indicating whether the display is switchable may be applied.

Also the present technology may widely apply various other control units such as a DSP (Digital Signal Processor) and microprocessor.

[2-11. Modification 11 ]

Further, in the above embodiment, a case when the CPU 20 described above with reference to FIGS. 1 to 30 is applied as an image generation unit that generates a background image as a two-dimensional plane image by a perspective projection of a three-dimensional background image by setting the position and orientation of a virtual camera and the position and orientation of a virtual light with respect to the three-dimensional background image generated as a three-dimensional space image is described.

However, the present technology is not limited to such eases and a hardware-configured image generator that generates a background image as a two-dimensional plane image by a perspective projection of a three-dimensional background image by setting the position and orientation of a virtual camera and the position and orientation of a virtual light with respect to the three-dimensional background image generated as a three-dimensional space image may be applied.

Also the present technology may widely apply various other image generation units such as a DSP and microprocessor.

[2-12. Modification 12 ]

Incidentally, the present technology may adopt a configuration described below.

(1) A display switching apparatus, including: an operation unit used to instruct a display unit to switch a display of a display image having a background image; and a control unit that, when instructed to switch the display of the display image via the operation unit, exercises control so that the display of the display image on the display unit is switched to the display image having the background image in a visible state indicating whether the display is switchable.

(2) The display switching apparatus according to (1), further including: an image generation unit that generates the background image as a two-dimensional plane image by a perspective projection of a three-dimensional background image by setting a position and an orientation of a virtual camera and a position and an orientation of a virtual light with respect to the three-dimensional background image generated as a three-dimensional space image.

(3) The display switching apparatus according to (1) or (2), wherein, when instructed to switch the display of the display image via the operation unit, the control unit controls the image generation unit so that the background image is generated by the perspective projection of the three-dimensional background image by setting at least one of the position and the orientation of at least one of the virtual camera and the virtual light with respect to the three-dimensional background image to one of a plurality of positions chosen in advance or one of a plurality of orientations chosen in advance.

(4) The display switching apparatus according to any of (1) to (3), wherein the control unit controls the image generation unit so that the background image is generated by the perspective projection of the three-dimensional background image by setting at least one of the position and the orientation of at least one of the virtual camera and the virtual light with respect to the three-dimensional background image to, among the plurality of positions chosen in advance, one position in accordance with the display image after the switching or, among the plurality of orientations chosen in advance, one orientation in accordance with the display image after the switching.

(5) The display switching apparatus according to any of (1) to (4), wherein the control unit controls the image generation unit so that the background image is generated by the perspective projection of the three-dimensional background image by setting at least one of the position and the orientation of at least one of the virtual camera and the virtual light with respect to the three-dimensional background image to, among the plurality of positions chosen in advance, one position in accordance with a type of the switching of the display regarding the display image after the switching or, among the plurality of orientations chosen in advance, one orientation in accordance with the type of the switching of the display regarding the display image after the switching.

The present technology can be used for a display switching apparatus of a smart phone, mobile phone, notebook personal computer and the like.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-131406 filed in the Japan Patent Office on Jun. 13, 2011, the entire content of which is hereby incorporated by reference.

What is claimed is:

1. A display switching apparatus, comprising:
    an operation unit used to instruct a display unit to switch a display content of a foreground display image having a background image in an initial visible state; and
    a control unit that, when instructed to switch the display content of the foreground display image via the operation unit, exercises control so that the background image of the foreground display image on the display unit is switched to one of plural different visible states, wherein the visible state of the background image indicating whether the foreground display image is switchable to a different display content.

2. The display switching apparatus according to claim 1, further comprising:
    an image generation unit that generates the background image as a two-dimensional plane image by a perspective projection of a three-dimensional background image by setting a position and an orientation of a virtual camera and a position and an orientation of a virtual light with respect to the three-dimensional background image generated as a three-dimensional space image.

3. The display switching apparatus according to claim 2, wherein, when instructed to switch the display of the display image via the operation unit, the control unit controls the image generation unit so that the background image is generated by the perspective projection of the three-dimensional background image by setting at least one of the position and the orientation of at least one of the virtual camera and the virtual light with respect to the three-dimensional background image to one of a plurality of positions chosen in advance or one of a plurality of orientations chosen in advance.

4. The display switching apparatus according to claim 3, wherein the control unit controls the image generation unit so that the background image is generated by the perspective projection of the three-dimensional background image by setting at least one of the position and the orientation of at least one of the virtual camera and the virtual light with respect to the three-dimensional background image to, among the plurality of positions chosen in advance, one position in accordance with the display image after the switching or, among the plurality of orientations chosen in advance, one orientation in accordance with the display image after the switching.

5. The display switching apparatus according to claim 4, wherein the control unit controls the image generation unit so that the background image is generated by the perspective projection of the three-dimensional background image by setting at least one of the position and the orientation of at least one of the virtual camera and the virtual light with respect to the three-dimensional background image to, among the plurality of positions chosen in advance, one position in accordance with the switching to one of a higher or lower level of the display regarding the display image after the switching or, among the plurality of orientations chosen in advance, one orientation in accordance with the switching to one of the higher or lower level of the display regarding the display image after the switching.

6. A display switching method, comprising:
    when instructed to switch a display content of a foreground display image via an operation unit, used to instruct a display unit to switch the display content of the foreground display image having a background image in an initial visible state, exercising control so that the background image of the foreground display image on the display unit is switched to one of plural different visible states, wherein the visible state of the background image indicating, whether the foreground display jag e is switchable to a different display content.

7. A display switching program embedded embodied on a non-transitory computer-readable medium for causing a computer to execute:
    when instructed to switch a display content of a foreground display image via an operation unit, used to instruct a display unit to switch the display content of the foreground display image having a background image in an initial visible state, exercising control so that the background image of the foreground display image on the display unit is switched to one of plural different visible states, wherein the visible state of the background image indicating whether the foreground display image is switchable to a different display content.

* * * * *